(12) United States Patent
Maegawa

(10) Patent No.: US 7,715,285 B2
(45) Date of Patent: May 11, 2010

(54) INFORMATION RECORDING MEDIUM HAVING A PLURALITY OF RECORDING LAYERS

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 959 days.

(21) Appl. No.: 10/563,799

(22) PCT Filed: Mar. 15, 2004

(86) PCT No.: PCT/JP2004/003420

§ 371 (c)(1),
(2), (4) Date: Jul. 25, 2006

(87) PCT Pub. No.: WO2005/004118

PCT Pub. Date: Jan. 13, 2005

(65) Prior Publication Data

US 2007/0076548 A1     Apr. 5, 2007

(30) Foreign Application Priority Data

| Jul. 7, 2003 | (JP) | ............................. | 2003-192940 |
| Sep. 5, 2003 | (JP) | ............................. | 2003-313867 |
| Sep. 5, 2003 | (JP) | ............................. | 2003-313868 |
| Sep. 11, 2003 | (JP) | ............................. | 2003-319990 |

(51) Int. Cl.
*G11B 7/00*     (2006.01)
(52) U.S. Cl. ............................................. 369/44.13
(58) Field of Classification Search ................ None
See application file for complete search history.

(56) References Cited

U.S. PATENT DOCUMENTS

| 5,946,279 A | * | 8/1999 | Okada et al. ............. 369/47.45 |
| 6,201,778 B1 | | 3/2001 | Sensyu |
| 2002/0031063 A1 | | 3/2002 | Kojima |
| 2002/0110067 A1 | | 8/2002 | Kondo et al. |
| 2002/0141317 A1 | | 10/2002 | Minamino et al. |
| 2003/0031098 A1 | | 2/2003 | Shoji et al. |
| 2003/0053405 A1 | * | 3/2003 | Kondo ..................... 369/275.4 |
| 2003/0072251 A1 | * | 4/2003 | Kondo ..................... 369/275.3 |
| 2004/0128608 A1 | * | 7/2004 | Kim et al. ................... 714/763 |
| 2004/0174800 A1 | | 9/2004 | Heemskerk et al. |

FOREIGN PATENT DOCUMENTS

| EP | 1 369 851 A1 | 12/2003 |
| JP | 8-147762 | 6/1996 |
| JP | 10-69646 | 3/1998 |
| JP | 10-312542 | 11/1998 |
| JP | 11-96568 | 4/1999 |
| JP | 2001-52342 | 2/2001 |
| JP | 2001-344764 | 12/2001 |
| JP | 2002-074679 | 3/2002 |
| JP | 2002-334448 | 11/2002 |
| JP | 2003-91874 | 3/2003 |

(Continued)

*Primary Examiner*—Peter Vincent Agustin
(74) *Attorney, Agent, or Firm*—Dickstein Shapiro LLP

(57) ABSTRACT

An information recording medium is provided with a plurality of information recordable recording layers, and a spiral or concentric tracks are formed on each of the plurality of recording layers. At least a portion of each track has wobbles corresponding to a wobble signal that includes layer information for discriminating the recording layer formed with the track.

4 Claims, 36 Drawing Sheets

| | FOREIGN PATENT DOCUMENTS | |
|----|----|----|
| JP | 2003-99954 | 4/2003 |
| JP | 2003-123249 | 4/2003 |
| JP | 2003-173542 | 6/2003 |
| JP | 2003-196928 | 7/2003 |
| WO | WO 02/073607 A1 | 9/2002 |

* cited by examiner

FIG.8

| INFO FRAME NO. | SYNC INFO PART | | ADDRESS INFO PART |
|---|---|---|---|
| | WOBBLE NO.0 | WOBBLE NOS.1-3 | WOBBLE NOS.4-7 |
| FRAME 1 | word sync | | |
| FRAME 2 | bit sync | | DATA BIT 1 |
| FRAME 3 | bit sync | | DATA BIT 2 |
| FRAME 4 | bit sync | | DATA BIT 3 |
| FRAME 5 | bit sync | | DATA BIT 4 |
| FRAME 6 | bit sync | | DATA BIT 5 |
| FRAME 7 | bit sync | | DATA BIT 6 |
| FRAME 8 | bit sync | | DATA BIT 7 |
| FRAME 49 | bit sync | | DATA BIT 48 |
| FRAME 50 | bit sync | | DATA BIT 49 |
| FRAME 51 | bit sync | | DATA BIT 50 |
| FRAME 52 | bit sync | | DATA BIT 51 |

FIG.16
MONOTONE WAVE 
PSK MODULATED WAVE 
FSK MODULATED WAVE 
SAWTOOTH MODULATED WAVE 
MSK MODULATED WAVE 
ON-OFF MODULATED WAVE 

FIG.21
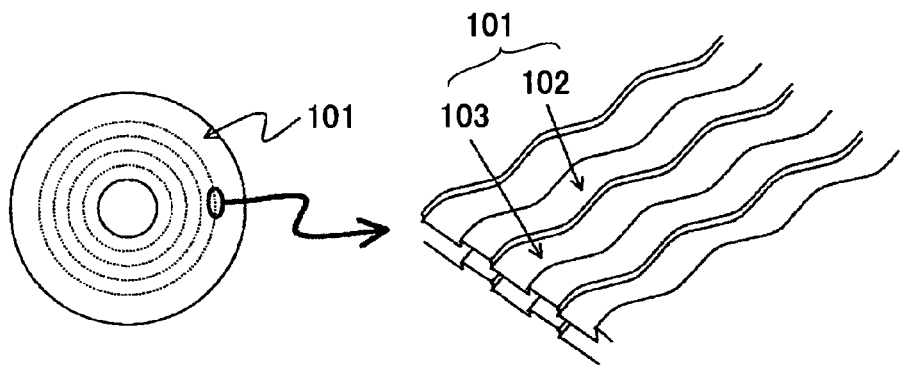
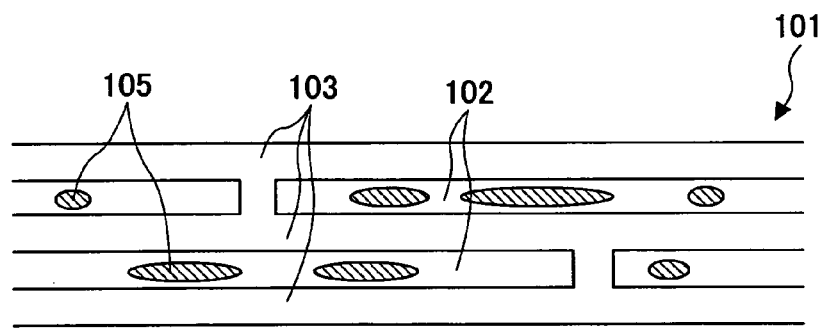
FIG.22A
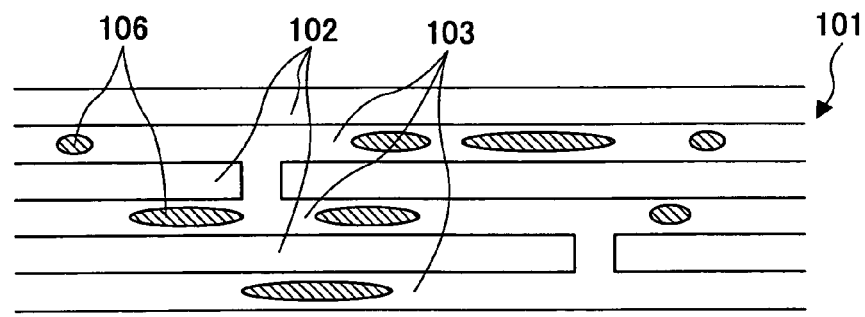
FIG.22B
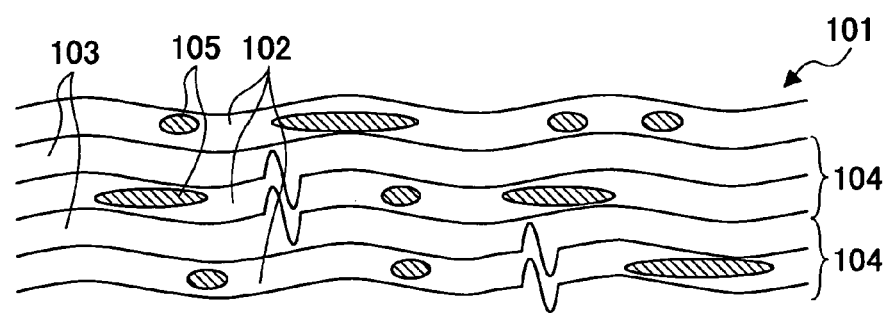
FIG.22C

FIG.25A

| SYNC INFO PART | AD | CARRIER WAVE PART | SYNC INFO PART | AD | CARRIER WAVE PART | SYNC INFO PART | AD | CARRIER WAVE PART |

FIG.25B

| SYNC INFO PART | AD | CARRIER WAVE PART | LAYER INFO PART | CARRIER WAVE PART | SYNC INFO PART | AD | CARRIER WAVE PART | LAYER INFO PART | CARRIER WAVE PART | SYNC INFO PART | AD | CARRIER WAVE PART | LAYER INFO PART | CARRIER WAVE PART |

FIG.25C

| SYNC INFO PART | AD | CARRIER WAVE PART | LAYER INFO PART | CARRIER WAVE PART | SYNC INFO PART | AD | CARRIER WAVE PART | SYNC INFO PART | AD | CARRIER WAVE PART | LAYER INFO PART | CARRIER WAVE PART |

INFORMATION RECORDING MEDIUM HAVING A PLURALITY OF RECORDING LAYERS

TECHNICAL FIELD

The present invention generally relates to information recording media, recording layer discriminating methods, recording layer discriminating apparatuses and optical disk apparatuses, and more particularly to an information recording medium having a plurality of recording layers, and a recording layer discriminating method and a recording layer discriminating apparatus for discriminating a recording layer that is an access target in such an information recording medium, and an optical disk apparatus having such a recording layer discriminating apparatus.

In addition, the present invention also relates more particularly to an information recording medium forming apparatus, an information recording medium forming method, an information detecting method, an information detecting apparatus, and an information recording medium apparatus.

BACKGROUND ART

Recently, due to progresses made in digital techniques and improvements made in data compression techniques, there is much attention on optical disks for storing information (hereinafter also referred to as "contents") such as music, movies, photographs and computer software. The optical disks include compact disks (CDs), digital versatile disks (DVDs) capable of recording approximately 7 times the amount of data recordable on a CD having the same diameter as the DVD. Optical disk apparatuses which use the optical disks as the information recording medium have become popular as the optical disks have become less inexpensive.

The optical disk apparatus records information on or erases information from a spiral track or concentric tracks on the optical disk by irradiating laser light on a recording layer of the optical disk, and reproduces information from the spiral track or concentric tracks based on a reflected light (returned beam) from the recording layer. Hence, the optical disk apparatus is provided with an optical pickup unit that emits the laser light and receives the returned beam.

Generally, the optical pickup unit includes an objective lens, an optical system that guides the laser light emitted from a light source to the recording layer and guides the returned beam to a predetermined light receiving position, and a photodetector that is arranged at the light receiving position. The photodetector outputs signals including not only reproduced information of data recorded in the recording layer, but also information (servo information) necessary to control the position of the objective lens.

The amount of information of the contents is increasing every year, and there are demands to further increase the recording capacity of the optical disk. As one means of increasing the recording capacity of the optical disk, information recording media having a plurality of recording layers and apparatuses which use such information recording media as the access target have been developed. For example, such information recording media and apparatuses which use such information recording media as the access target are proposed in Japanese Laid-Open Patent Applications No. 2001-52342, No. 2002-74679, No. 2003-91874, No. 8-147762, No. 11-96568 and No. 2002-334448.

In order to control the position of the objective lens with respect to the information recording medium having a plurality of recording layers so that a light spot is accurately formed at a target position, it is necessary to accurately discriminate the recording layer on which the light spot is formed. In addition, in order to achieve a high-speed access, the position of the objective lens must be controlled at a high speed. However, according to the information recording media and the apparatuses proposed in the Japanese Laid-Open Patent Applications No. 2001-52342, No. 2002-74679, No. 2003-91874, No. 8-147762, No. 11-96568 and No. 2002-334448 referred above, it sometimes takes time to discriminate the recording layer on which the light spot is formed, and the access time may become long.

DISCLOSURE OF THE INVENTION

It is a general object of the present invention to provide a novel and useful information recording medium, recording layer discriminating method, recording layer discriminating apparatus and optical disk apparatus, in which the problem described above are suppressed.

A first object of the present invention is to provide an information recording medium that enables information for discriminating a recording layer to be acquired quickly and accurately.

A second object of the present invention is to provide a recording layer discriminating method and a recording layer discriminating apparatus that can quickly and accurately discriminate a recording layer on which a light spot is formed of a plurality of recording layers of an information recording medium.

A third object of the present invention is to provide an optical disk apparatus that can make a quick access to an information recording medium having a plurality of recording layers.

A more specific object of the present invention is to provide an information recording medium characterized by a plurality of information recordable recording layers, wherein a spiral or concentric tracks are formed on each of the plurality of recording layers, and at least a portion of each track has wobbles corresponding to a wobble signal that includes layer information for discriminating a recording layer on which the track is formed. According to the information recording medium of the present invention, it is possible to discriminate the recording layer on which a light spot is formed when accessing the information recording medium, by detecting the wobble signal based on reflected light from the wobbles and extracting the layer information from the wobble signal. In other words, it is possible to quickly and accurately acquire the information for discriminating the recording layer.

In this case, at least a portion of each track may have the wobbles corresponding to the wobble signal in which a layer information part including the layer information is modulated according to a predetermined modulation technique.

In this case, at least a portion of each track may have the wobbles corresponding to the wobble signal that further includes a carrier wave part for use in generating a reference clock.

In this case, the layer information part may be arranged between 2 carrier wave parts.

In the above information recording medium, predetermined synchronizing information may be recorded on each track at a predetermined synchronization period.

In this case, at least a portion of each track may have the wobbles corresponding to the wobble signal in which the layer information part is arranged at a period that is an integer multiple of the synchronization period.

In the above information recording medium, the layer information and the synchronizing information may be recorded on the track with mutually different formats.

In this case, the synchronizing information may be recorded on the track as formation of pits.

In the above information recording medium, at least a portion of each track may have the wobbles corresponding to the wobble signal that further includes the synchronizing information modulated according to a modulation technique different from that of the layer information part.

In the above information recording medium, at least a portion of each track may have the wobbles corresponding to the wobble signal that further includes the synchronizing information modulated according to a modulation technique identical to that of the layer information part.

In this case, the layer information part and the synchronizing information part may have mutually different signal waveforms.

In the above information recording medium, the modulation technique may be a phase modulation technique.

In this case, the 1 period of a reference clock generated from the carrier wave part may amount to 1 wobble, the synchronization period may amount to 93 wobbles, and the layer information part may exist between a 12th wobble and an 88th wobble when the synchronizing information part starts from a 0th wobble.

In the above information recording medium, at least a portion of each track may have the wobbles corresponding to the wobble signal that further includes address information.

A further object of the present invention is to provide a recording layer discriminating method for discriminating a recording layer on which a light spot is formed when accessing the information recording medium described above, characterized in that the method comprises a first step acquiring the layer information from the wobble signal that is detected based on reflected light from the information recording medium; and a second step discriminating the recording layer on which the light spot is formed based on the layer information. According to the recording layer discriminating method of the present invention, the layer information is acquired solely from the wobble signal, and the layer information can be acquired more accurately and within a shorter time compared to the conventional method. As a result, with respect to the information recording medium having the plurality of recording layers, it is possible to quickly and accurately discriminate the recording layer on which the light spot is formed.

Another object of the present invention is to provide a recording layer discriminating method for discriminating a recording layer on which a light spot is formed when accessing the information recording medium described above, characterized in that the method comprises a first step acquiring the layer information and the address information based on reflected light from the information recording medium; and a second step discriminating the recording layer on which the light spot is formed based on the layer information and the address information. According to the recording layer discriminating method of the present invention, the layer information and the address information are acquired solely from the wobble signal, and the recording layer is discriminated based on the layer information and the address information. Hence, the recording layer can be discriminated more accurately and within a shorter time compared to the conventional method. In other words, with respect to the information recording medium having the plurality of recording layers, it is possible to quickly and accurately discriminate the recording layer on which the light spot is formed.

Still another object of the present invention is to provide a recording layer discriminating apparatus for discriminating a recording layer on which a light spot is formed when accessing the information recording medium described above, characterized in that the apparatus comprises demodulating means for demodulating the wobble signal that is detected based on reflected light from the information recording medium; and layer information detection means for detecting the layer information from the wobble signal that is demodulated. According to the recording layer discriminating apparatus of the present invention, the layer information is acquired solely from the wobble signal, and the layer information can be acquired more accurately and within a shorter time compared to the conventional method. As a result, with respect to the information recording medium having the plurality of recording layers, it is possible to quickly and accurately discriminate the recording layer on which the light spot is formed.

A further object of the present invention is to provide a recording layer discriminating apparatus for discriminating a recording layer on which a light spot is formed when accessing the information recording medium described above, characterized in that the apparatus comprises demodulating means for demodulating the wobble signal that is detected based on reflected light from the information recording medium; layer information detection means for detecting the layer information from the wobble signal that is demodulated; address information detection means for detecting the address information from the wobble signal that is demodulated; and discriminating means for discriminating the recording layer on which the light spot is formed based on the layer information and the address information. According to the recording layer discriminating apparatus of the present invention, the layer information and the address information are acquired solely from the wobble signal, and the recording layer is discriminated based on the layer information and the address information. Hence, the recording layer can be discriminated more accurately and within a shorter time compared to the conventional method. In other words, with respect to the information recording medium having the plurality of recording layers, it is possible to quickly and accurately discriminate the recording layer on which the light spot is formed.

In the above recording layer discriminating apparatus, the demodulating means may comprise a clock generating circuit generating a reference clock from the wobble signal; and a demodulating circuit demodulating the wobble signal based on the reference clock, and the layer information detection means may comprise a synchronizing information detection circuit detecting the synchronizing information; a counter counting a number of reference clocks using the synchronizing information as a starting point; and a layer information detection circuit detecting the layer information based on a counted value of the counter.

Another object of the present invention is to provide an optical disk apparatus for carrying out at least one of recording, reproduction and erasure of information with respect to an information recording medium, characterized in that the apparatus comprises a optical pickup unit forming a light spot on one of a plurality of recording layers via an objective lens, and receiving reflected light from said one of the plurality of recording layers; a recording layer discriminating apparatus described above, discriminating the recording layer on which the light spot is formed, based on the wobble signal that is detected from an output signal of the optical pickup unit; a servo control unit controlling a position of the objective lens based on the output signal of the optical pickup unit and an output signal of the recording layer discriminating apparatus; and a processing unit carrying out at least one of recording, reproduction and erasure of information via the optical pickup unit. According to the optical disk apparatus of the present invention, it is possible to accurately discriminate within a short time the recording layer on which the light spot is formed by the recording layer discriminating apparatus, and thus, it is possible to quickly and accurately control the position of the objective lens by the servo control unit. Consequently, the access, including at least reproduction, of the recording, reproduction and erasure of information with respect to the information recording medium having the plurality of recording layers, can be carried out at a high speed.

It is also a general object of the present invention to provide an information recording medium forming apparatus, information recording medium forming method, information detecting method, information detecting apparatus and information recording medium apparatus, which are suited for the information recording medium described above.

Other objects and further features of the present invention will be apparent from the following detailed description when read in conjunction with the accompanying drawings.

BRIEF DESCRIPTION OF THE DRAWINGS

FIG. 8 is a diagram for explaining data bits of an address information part;

FIG. 16 is a diagram for explaining a modulation technique for a wobble signal;

FIG. 21 is a diagram for explaining a structure of an optical disk recordable with information and to which a second embodiment of the present invention is applicable;

FIGS. 22A through 22C respectively are diagrams for explaining a structure of the recordable optical disk;

FIGS. 25A through 25C respectively are diagrams showing an example of the entire format when recording position information by wobble modulation;

BEST MODE FOR CARRYING OUT THE INVENTION

Figure 1:
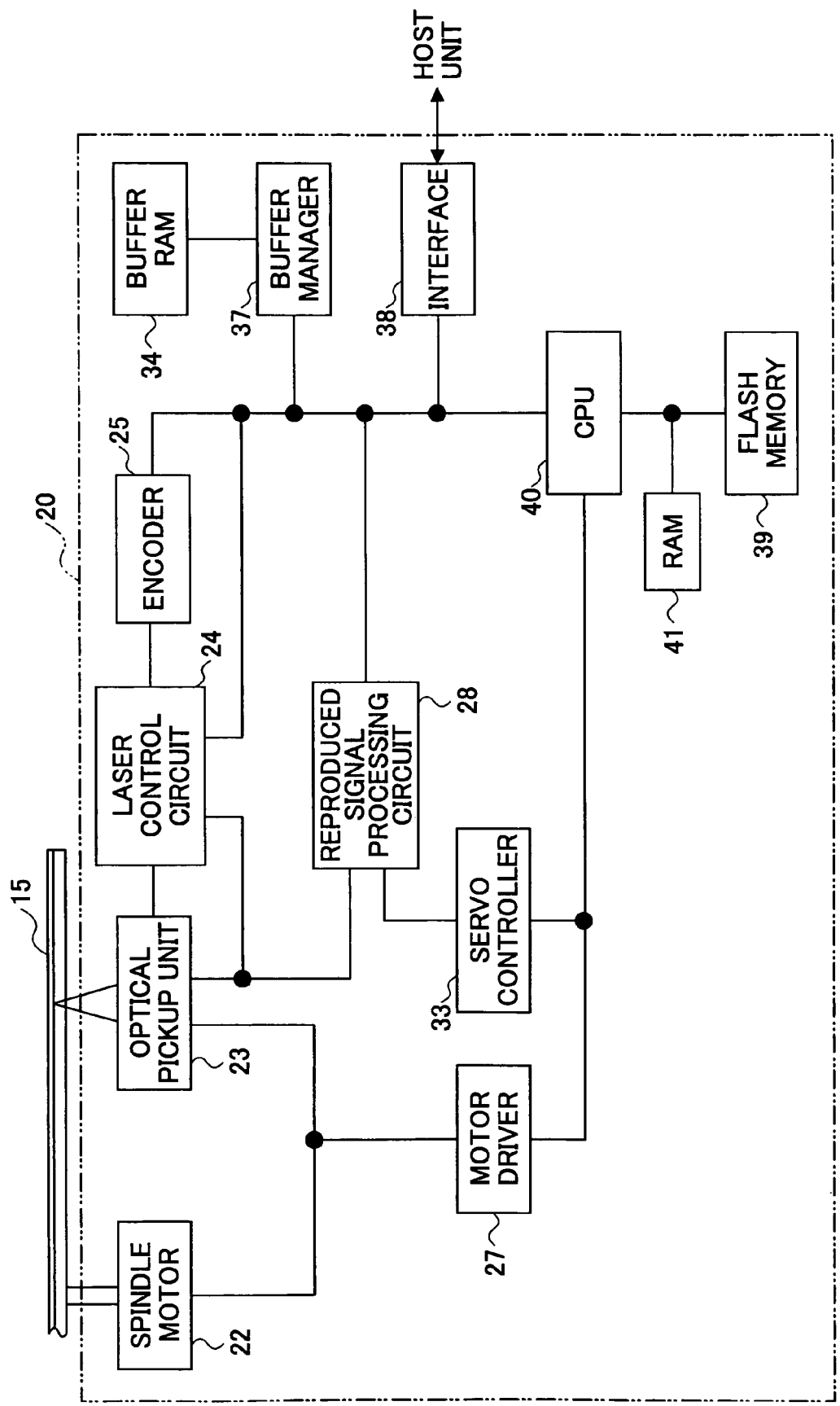
FIG. 1 is a block diagram showing a structure of a first embodiment of an optical disk apparatus according to the present invention.

A description will be given of various embodiments of the present invention, by referring to the drawings.

First Embodiment

First, a description will be given of an embodiment of the information recording medium, the recording layer discriminating method, the recording layer discriminating apparatus and the optical disk apparatus according to the present invention, by referring to FIGS. 1 through 15. FIG. 1 shows a general structure of an optical disk apparatus 20 as an embodiment of the present invention.

The optical disk apparatus 20 shown in FIG. 1 includes a spindle motor 22 for driving and rotating an optical disk 15 that is used as an information recording medium in this embodiment, an optical pickup unit 23, a laser control circuit 24, an encoder 25, a motor driver 27, a reproduced signal processing circuit 28, a servo controller 33, a buffer RAM 34, a buffer manager 37, an interface 38, a flash memory 39, a CPU 40, a RAM 41 and the like. Connection lines connecting the blocks in FIG. 1 are merely shown to indicate the flow of representative signals and information, and not all connection relationships of the blocks are shown in FIG. 1.

Figure 2A:
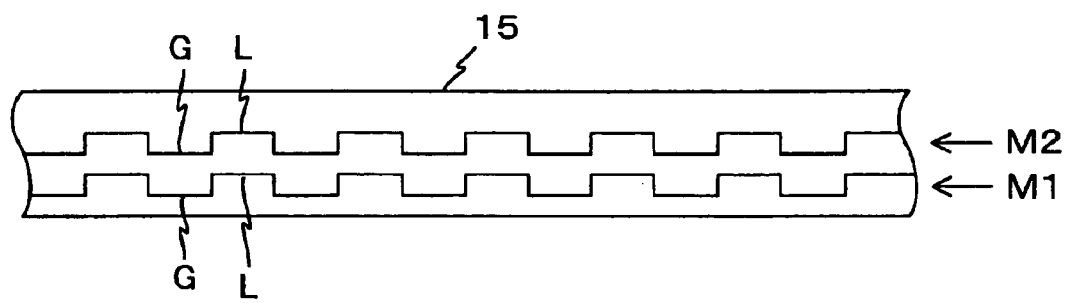
FIGS. 2A and 2B respectively are diagrams for explaining recording layers of the optical disk shown in FIG. 1.
Figure 2B:
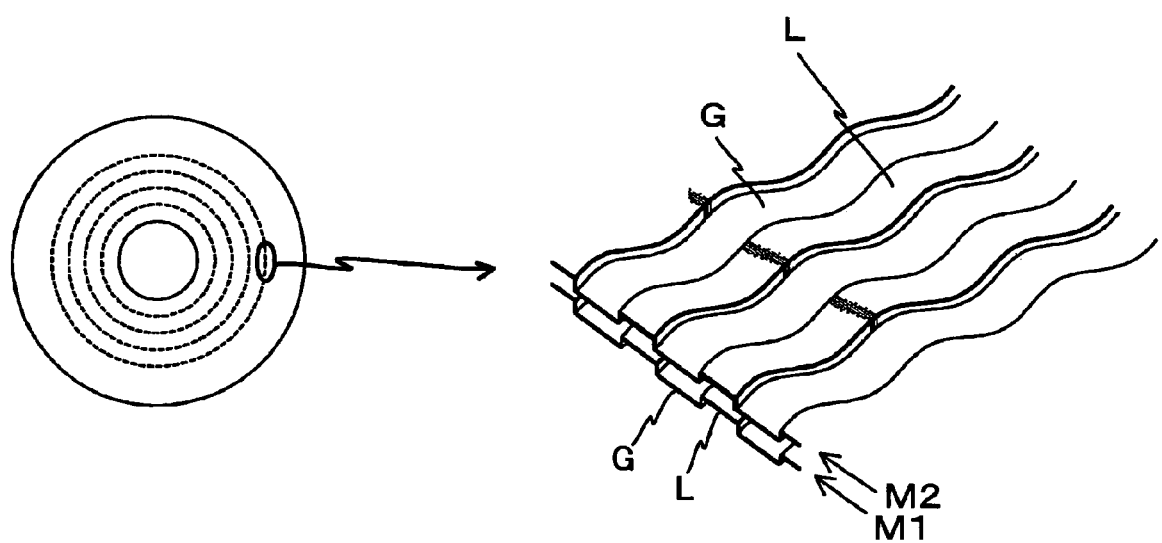

For example, the optical disk 15 includes 2 recording layers (M1 and M2) on which information is recordable, as shown in FIGS. 2A and 2B, for example, and a spiral track or concentric tracks made up of a spiral or concentric grooves G and lands L are formed on each recording layer. At least a portion of each track has wobbles corresponding to a wobble signal that includes synchronizing information, address information and layer information.

The synchronizing information is the information that is used to detect recorded positions of the address information and the layer information. The address information is the information related to a physical address of the track. The layer information is the information that distinguishes whether the track is a track on the recording layer M1 or a track on the recording layer M2. For example, the optical disk 15 in this embodiment is adapted to laser light having a wavelength of approximately 660 nm.

Figure 3:
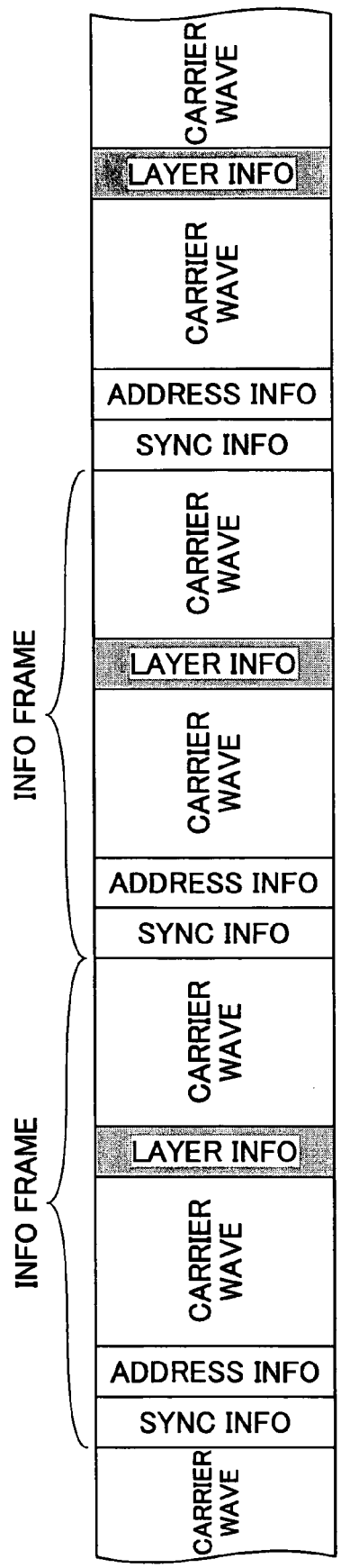
FIG. 3 is a diagram for explaining an information frame format of a wobble signal of the optical disk shown in FIG. 2.
Figure 4:
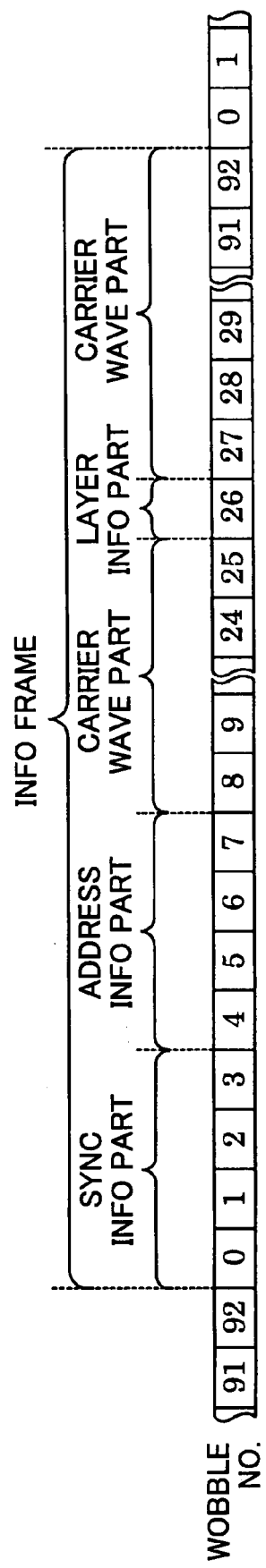
FIG. 4 is a diagram for explaining a number of wobbles in the information frame shown in FIG. 3 and at each part of the information frame.

For example, the wobble signal in this embodiment has a format in which 1 information frame is formed by a synchronizing information part that includes the synchronizing information, an address information part that includes the address information, a carrier wave part for reference clock formation, a layer information part that includes the layer information, and a carrier wave part for reference clock formation, as shown in FIG. 3. If 1 period of the reference clock generated from the carrier wave is regarded as 1 wobble, the information frame has a size amounting to 93 wobbles (wobble numbers 0 through 92) as shown in FIG. 4, for example. In other words, a synchronization period of the synchronizing information part amounts to 93 wobbles. The wobble numbers 0 through 3 correspond to the synchronizing information part, the wobble numbers 4 through 7 correspond to the address information part, the wobble numbers 8 through 25 correspond to the carrier wave part, the wobble number 26 corresponds to the layer information part, and the wobble numbers 27 through 92 correspond to the carrier wave part. That is, the synchronizing information part amounts to 4 wobbles, the address information part amounts to 4 wobbles, the layer information part amounts to 1 wobble, and the carrier wave part is provided before and after the layer information part. Each of the information parts described above is modulated according to a phase modulation technique (PSK: Phase Shift Keying). Since the synchronizing information part must be clearly distinguished from the other information parts, the synchronizing information part has a signal waveform having an appearing frequency that is extremely low in the other information parts.

Figure 5A:
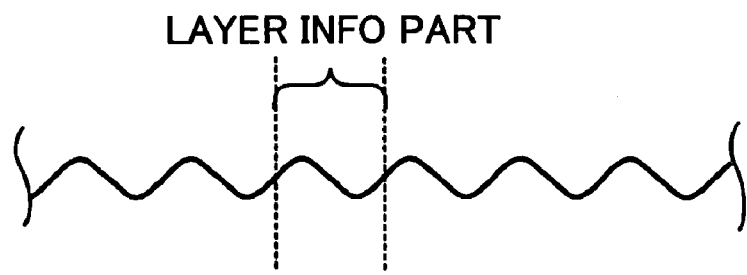
FIGS. 5A and 5B respectively are diagrams for explaining signal waveforms at a layer information part.
Figure 5B:
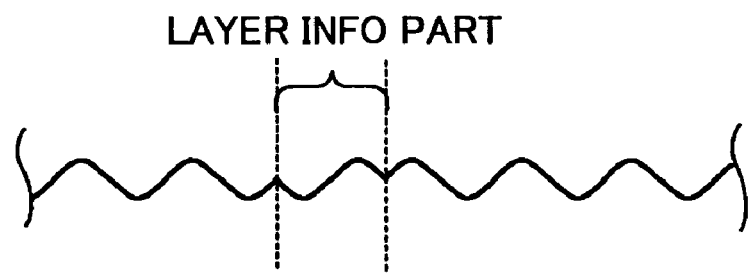

For example, the layer information part in this embodiment has a phase that is the same as that of the carrier wave part in the recording layer M1 as shown in FIG. 5A, and has a phase that is inverted with respect to that of the carrier wave part in the recording layer M2 as shown in FIG. 5B.

Figure 6A:
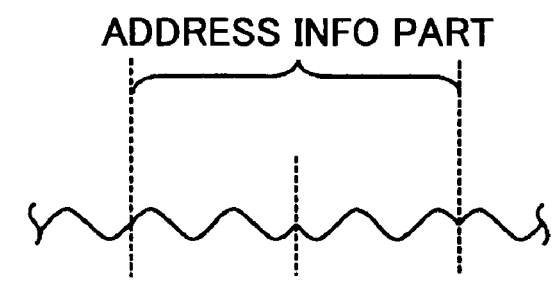
FIGS. 6A and 6B respectively are diagrams for explaining signal waveforms at an address information part.
Figure 6B:
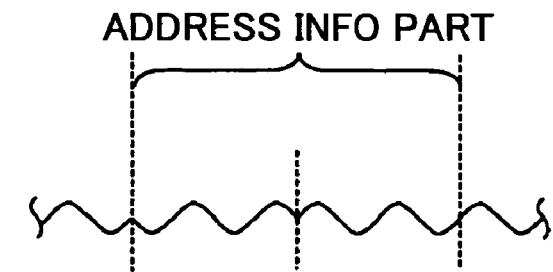

For example, the address information part represents 1 bit of data by 4 wobbles, similarly as in the case of the DVD. If the bit data is "0", for example, the preceding 2 wobbles are made to be the same phase as the carrier wave part and the subsequent 2 wobbles are made to be the inverted phase of the carrier wave part as shown in FIG. 6A. On the other hand, if the bit data is "1", the preceding 2 wobbles are made to be the inverted phase of the carrier wave part and the subsequent 2 wobbles are made to be the same phase as the carrier wave part as shown in FIG. 6B. 51 bits are required as address data.

Figure 7A:
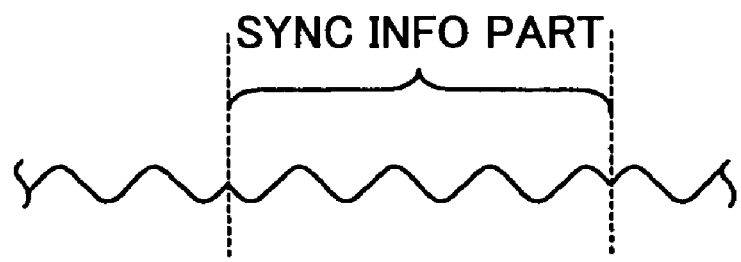
FIGS. 7A and 7B respectively are diagrams for explaining signal waveforms at a synchronizing information part.
Figure 7B:
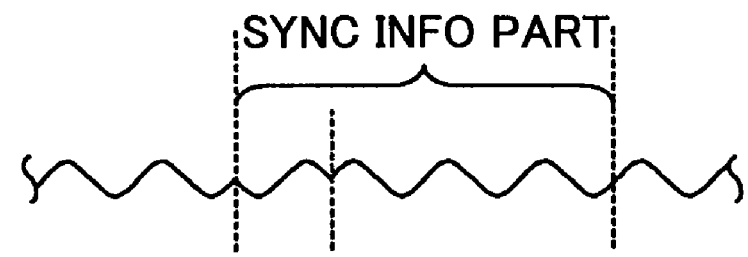

In the synchronizing information part, if the address information part of the next information frame is the starting bit of the address data, a word synchronizing signal, that is, all 4 wobbles are made to be the inverted phase of the carrier wave part as shown in FIG. 7A, for example. In addition, if the address information part includes the bit data, a bit synchronizing signal, that is, 1 starting wobble is made to be the inverted phase of the carrier wave part and the remaining 3 wobbles are made to be the same phase as the carrier wave part.

Accordingly, in this embodiment, 1 address information is obtained from 52 information frames, as shown in FIG. 8. As one example, the address following the last address of the track on the recording layer M1 is the first address of the track on the recording layer M2 in this embodiment. More particularly, addresses 00000H through 10000H are allocated to the tracks of the recording layer M1, and addresses 10001H through 20000H are allocated to the tracks of the recording layer M2.

Figure 9:
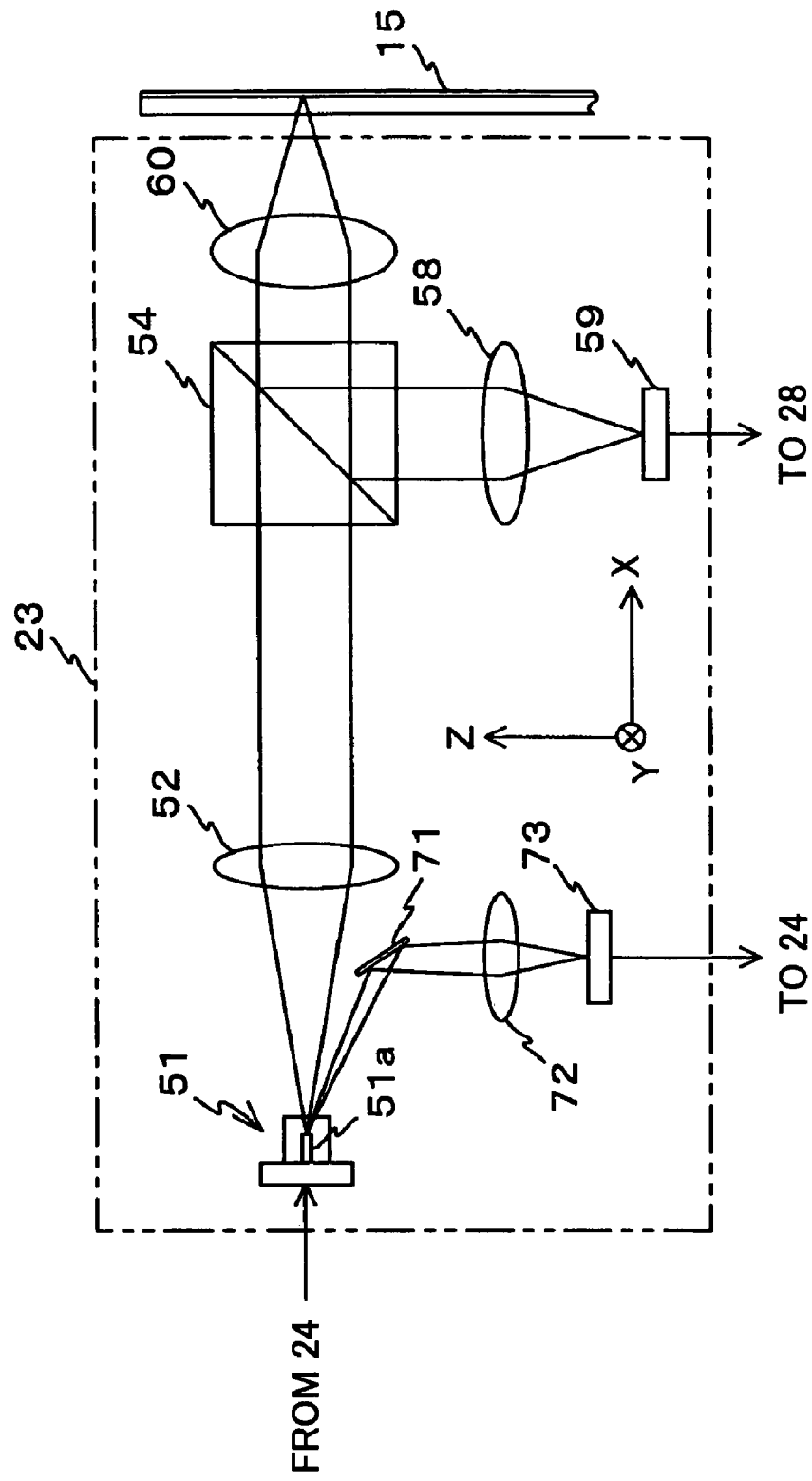
FIG. 9 is a diagram for explaining a structure of an optical pickup unit shown in FIG. 1.

The optical pickup unit 23 irradiates laser light on a recording surface of the optical disk 51 having the spiral or concentric tracks formed thereon, and receives reflected light from the recording surface. As shown in FIG. 9, for example, the optical pickup unit 23 includes a light source unit 51, a collimator lens 52, a beam splitter 54, an objective lens 60, 2 detection lenses 58 and 72, 2 light receivers 59 and 73, a reflecting mirror 71, a driving system (not shown) and the like. The driving system includes a focusing actuator, a tracking actuator and a seek motor.

The light source unit 51 includes a semiconductor laser 51a that is used as a light source and emits the laser light having a wavelength of 660 nm. In this embodiment, a maximum intensity emission direction of a bundle of rays of the laser light (hereinafter simply referred to as a "beam") emitted from the light source unit 51 is regarded as being a +X direction. The collimator lens 52 is arranged on the +X side of the light source unit 51, and forms the laser beam from the light source unit 51 into approximately parallel light. The reflecting mirror 71 is arranged in a vicinity of the collimator lens 52, and reflects a portion of the laser beam emitted from the light source unit 51 in a −Z direction as a monitoring beam.

The beam splitter 54 is arranged on the +X side of the collimator lens 52, and transmits as it is the beam that is formed into the approximate parallel light by the collimator lens 52. In addition, the beam splitter 54 deflects the beam (return beam) that is reflected by the optical disk 15 and is received via the objective lens 60 in the −Z direction. The objective lens 60 is arranged on the +X side of the beam splitter 54, and converges the beam transmitted through the beam splitter 54 on the recording surface of the optical disk 15. The detection lens 58 is arranged on the −Z side of the beam splitter 54, and converges the return beam that is deflected in the −Z direction by the beam splitter 54 on a light receiving surface of the light receiver 59.

Figure 10:
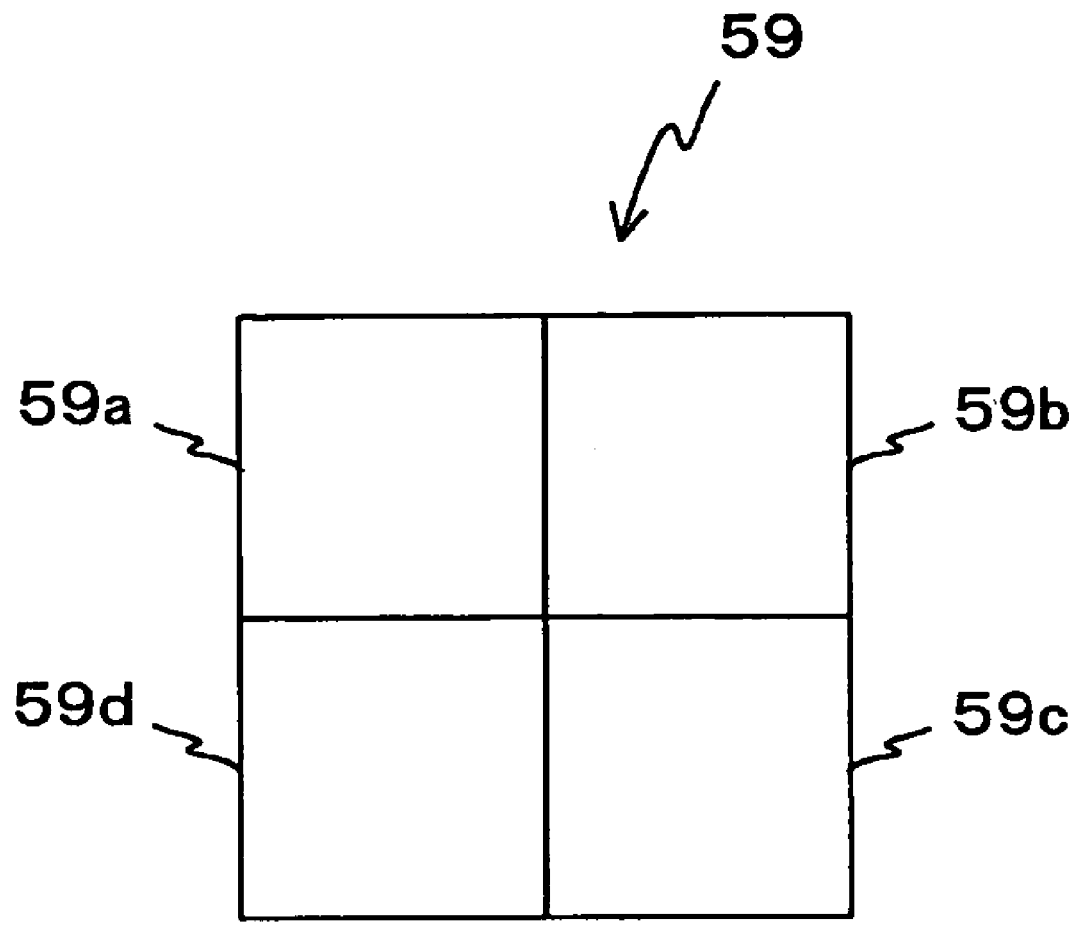
FIG. 10 is a diagram for explaining a light receiver for a returned beam shown in FIG. 9.

Similarly to a normal optical disk apparatus, a 4-part light receiving element shown in FIG. 10 made up of 4 light detecting parts 59a, 59b, 59c and 59d may be used as the light receiver 59. In this case, a Y direction approximately matches a tangential direction to the track on the optical disk 15. Each of the light detecting parts 59a, 59b, 59c and 59d generates a current signal according to an amount of light received by making a photoelectric conversion, and outputs the generated current signal to the reproduced signal processing circuit 28.

The detection lens 72 is arranged on the −Z side of the reflecting mirror 71, and converges the monitoring beam that is reflected in the −Z direction by the reflecting mirror 71 on a light receiving surface of the light receiver 73. The light receiver 73 generates a current signal depending on an amount of light received by making a photoelectric conversion, and outputs the generated current signal to the laser control circuit 24 as a power monitor signal.

Figure 11:
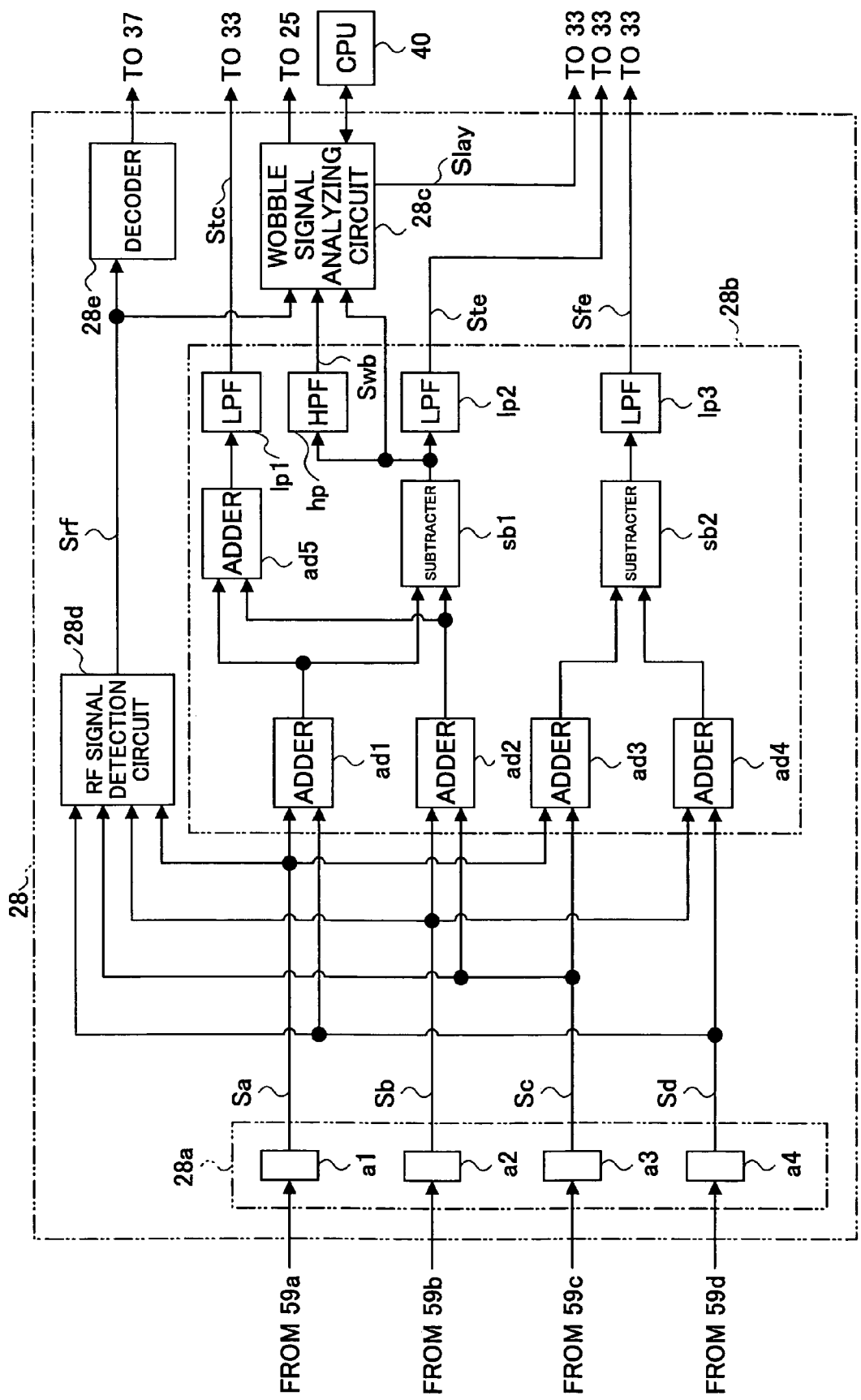
FIG. 11 is a block diagram for explaining a structure of a reproduced signal processing circuit shown in FIG. 1.

The reproduced signal processing circuit 28 includes an I/V amplifier 28a, a servo and wobble signal detection circuit 28b, a wobble signal analyzing circuit 28c, an RF signal detection circuit 28d, a decoder 28e and the like, as shown in FIG. 11.

The I/V amplifier 28a includes an amplifier a1 for converting the current signal from the light receiving part 59a into a voltage signal Sa, an amplifier a2 for converting the current signal from the light receiving part 59b into a voltage signal Sb, an amplifier a3 for converting the current signal from the light receiving part 59c into a voltage signal Sc, and an amplifier a4 for converting the current signal from the light receiving part 59d into a voltage signal Sd.

The servo and wobble signal detection circuit 28b includes 5 adders ad1, ad2, ad3, ad4 and ad5, 2 subtractors sb1 and sb2, 3 lowpass filters lp1, lp2 and lp3, and a highpass filter hp.

The adder ad1 adds the signals Sa and Sd, and the adder ad2 adds the signals Sb and Sc. The adder ad3 ads the signals Sa and Sc, and the adder ad4 adds the signals Sb and Sd. In other words, an output signal Sa+Sd is obtained from the adder ad1, and an output signal Sb+Sc is obtained from the adder ad2. In addition, an output signal Sa+Sc is obtained from the adder ad3, and an output signal Sb+Sd is obtained from the adder ad4.

The adder ad5 adds the output signal of the adder ad1 and the output signal of the adder ad2. In other words, an output signal Sa+Sb+Sc+Sd is obtained from the adder ad5. This output signal of the adder ad5 is supplied to the lowpass filter lp1.

The subtractor sb1 subtracts the output signal of the adder ad2 from the output signal of the adder ad1. In other words, an output signal {(Sa+Sd)−(Sb+Sc)} is obtained from the subtractor sb1. This output signal of the subtractor sb1 is supplied to the wobble signal analyzing circuit 28c, the lowpass filter lp2 and the highpass filter hp.

The subtractor sb2 subtracts the output signal of the adder ad4 from the output signal of the adder ad3. In other words, an output signal {(Sa+Sc)−(Sb+Sd)} is obtained from the subtractor sb2. This output signal of the subtractor sb2 is supplied to the lowpass filter lp3.

The lowpass filter lp1 is arranged in a stage subsequent to the adder ad5, and eliminates a high-frequency component that is included in the output signal of the adder ad5. An output signal of the lowpass filter lp1 is supplied to the servo controller 33 as a track cross signal Stc.

The lowpass filter lp2 is arranged in a stage subsequent to the subtractor sb1, and eliminates a high-frequency component that is included in the output signal of the subtractor sb1. An output signal of the lowpass filter lp2 is supplied to the servo controller 33 as a track error signal Ste.

The highpass filter hp is arranged in a stage subsequent to the subtractor sb1, and eliminates a low-frequency component that is included in the output signal of the subtractor sb1. An output signal of the highpass filter hp is supplied to the wobble signal analyzing circuit 28c as a wobble signal Swb.

The lowpass filter lp3 is arranged in a stage subsequent to the subtractor sb2, and eliminates a high-frequency component that is included in the output signal of the subtractor sb2. An output signal of the lowpass filter lp3 is supplied to the servo controller 33 as a focus error signal Sfe.

The RF signal detection circuit 28d is a high band circuit, and detects an RF signal Srf by adding the signals Sa, Sb, Sc and Sd. The detected RF signal Srf is supplied to the decoder 28e and the wobble signal analyzing circuit 28c.

The decoder 28e carries out a decoding process, an error detection process and the like with respect to the RF signal Srf, and stores the processed data in the buffer RAM 34 via the buffer manager 37 as reproduced data. The decoder 28e also carries out a predetermined error correction process when an error is detected by the error detection process.

Figure 12:
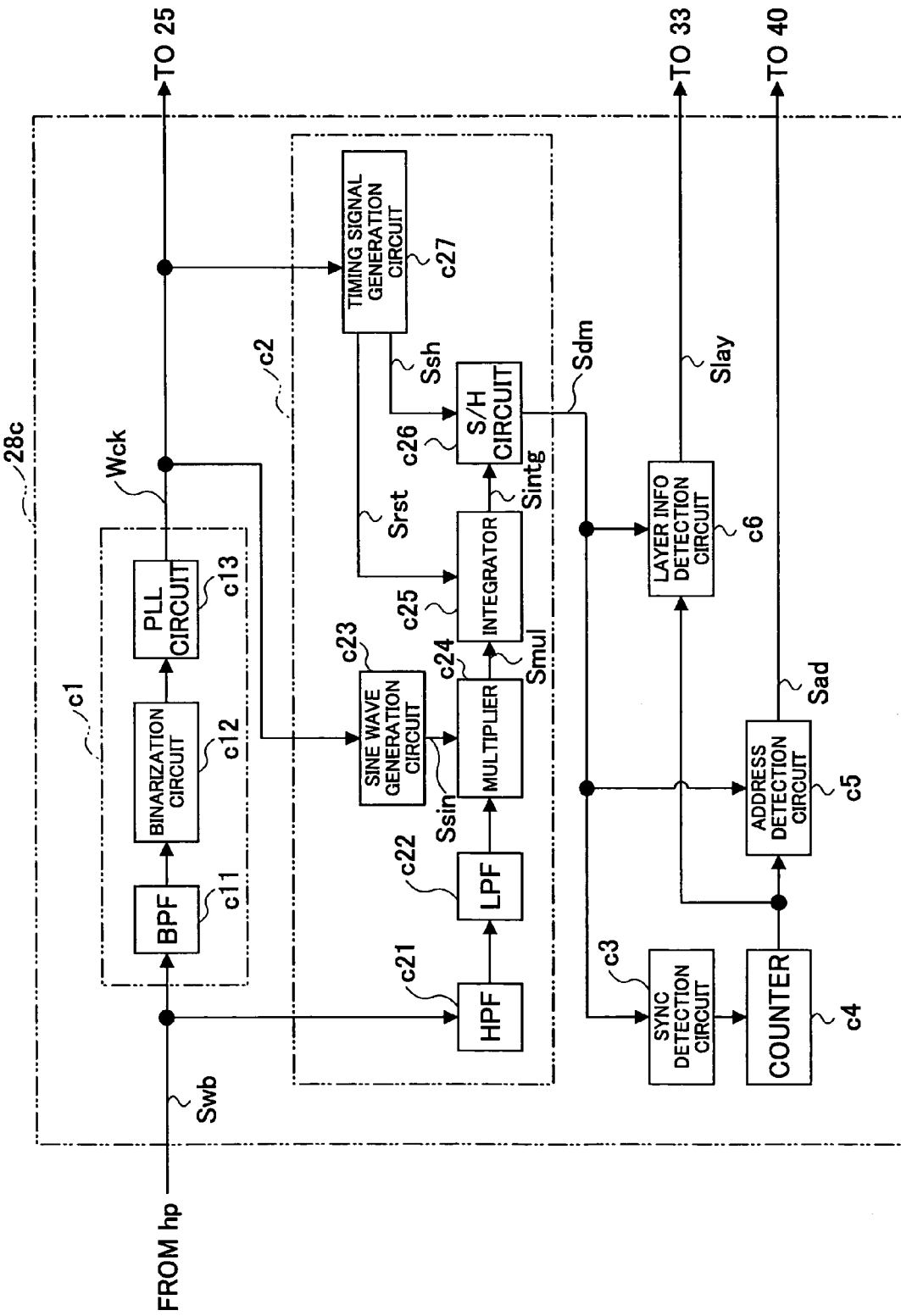
FIG. 12 is a block diagram for explaining a structure of a wobble signal analyzing circuit shown in FIG. 11.

The wobble signal analyzing circuit 28c includes a clock generating circuit c1, a demodulating circuit c2, a synchronization detection circuit c3, a counter c4, an address detection circuit c5, a layer information detection circuit c6 and the like, as shown in FIG. 12.

The clock generating circuit c1 includes a bandpass filter c11 for extracting a carrier wave component that is included in the wobble signal Swb, a binarization circuit c12 for binarizing an output signal of the bandpass filter c11, a phase locked loop (PLL) circuit c13 for stabilizing the period of an output signal of the binarization circuit c12 and the like. An output signal of the PLL circuit c13 is supplied to the encoder 25, the demodulating circuit c2 and the like as a reference clock signal Wck shown in FIG. 13.

The demodulating circuit c2 includes a highpass filter c21, a lowpass filter c22, a sinusoidal wave generating circuit c23, a multiplier c24, an integration circuit c25, a sample and hold (S/H) circuit c26, a timing signal generating circuit c27 and the like.

Figure 13:
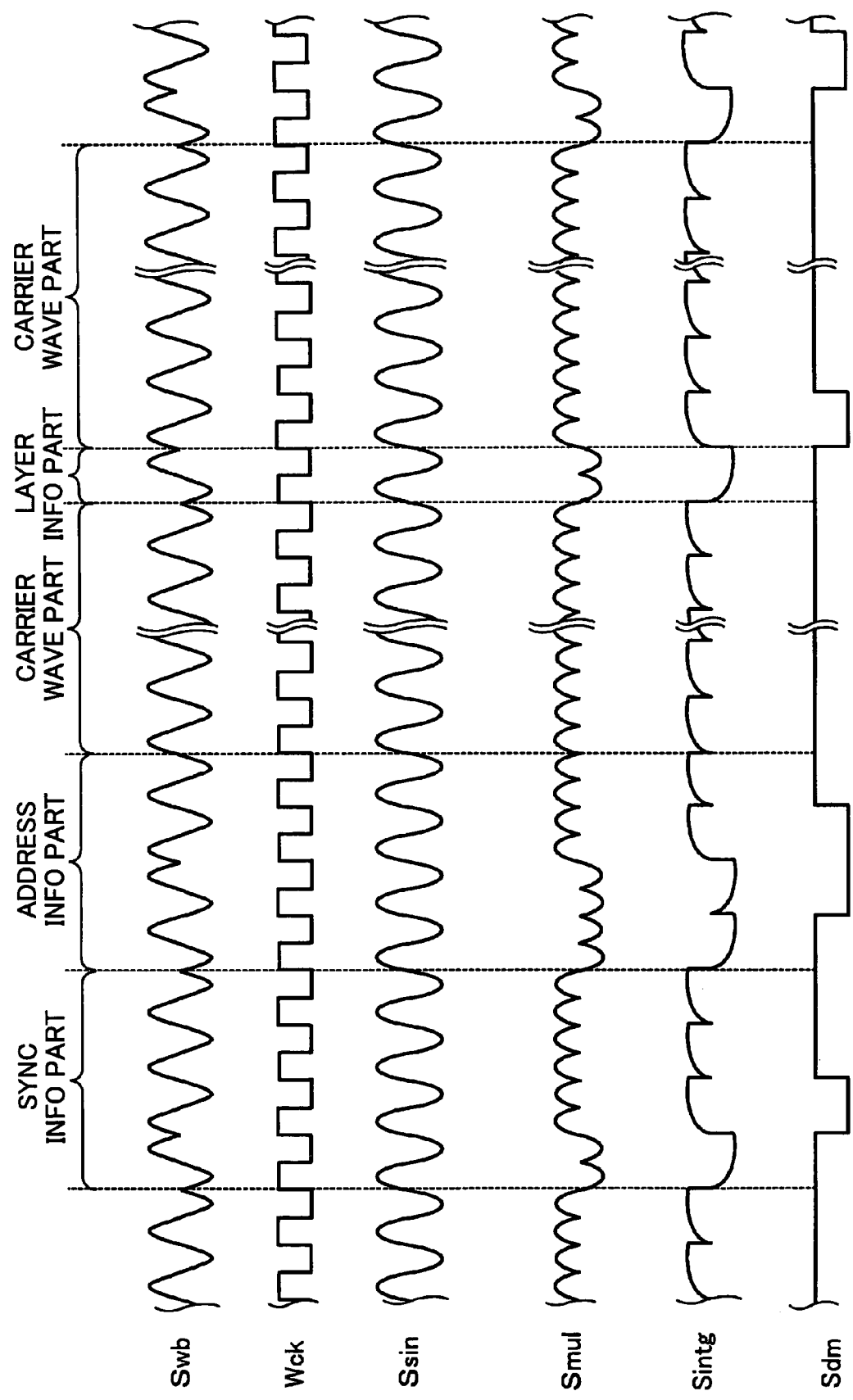
FIG. 13 is a timing chart for explaining functions of the wobble signal analyzing circuit.

The highpass filter c21 eliminates low-frequency noise that is included in the wobble signal Swb. The lowpass filter c22 eliminates high-frequency noise that is included in an output signal of the highpass filter c21. As shown in FIG. 13, for example, the sinusoidal wave generating circuit c23 generates a sinusoidal wave Ssin having the reference clock frequency based on the reference clock signal Wck from the clock generating circuit c1. The multiplier c24 multiplies an output signal of the lowpass filter c22 and the sinusoidal wave Ssin that is generated by the sinusoidal wave generating circuit c23. Hence, a phase-modulated wave component is extracted.

As shown in FIG. 13, for example, the integration circuit c25 integrates an output signal Smul of the multiplier c24 for every period of the reference clock signal Wck. This integration circuit c25 is reset by a reset signal Srst from the timing signal generating circuit c27. As shown in FIG. 13, for example, the S/H circuit c26 performs a sample and hold with respect to an output signal Sintg of the integration circuit c25 in synchronism with a timing signal Ssh from the timing signal generating circuit c27. In this particular case, the signal Sintg is sampled at a rise timing of the reference clock signal Wck. An output signal of the S/H circuit c26 is supplied to the synchronization detection circuit c3, the address detection circuit c5 and the layer information detection circuit c6 as a demodulated signal Sdm.

The synchronization detection circuit c3 judges whether or not the demodulated signal Sdm corresponds to the synchronizing information part. If the demodulated signal Sdm corresponds to the starting part of the synchronizing information part, the synchronization detection circuit c3 sets "0" to a counted value of the counter c4. In addition, if the demodulated signal Sdm does not correspond to the starting part of the synchronizing information part, the synchronization detection circuit c3 increments the counted value of the counter c4 by +1. In other words, a value that indicates the place or position of the demodulated signal Sdm in terms of the period of the reference clock signal Wck (for example, nth period of the reference clock signal Wck) using the starting part of the synchronizing information part as a starting point.

The address detection circuit c5 refers to the counted value of the counter c4, and extracts the demodulated signal Sdm when the address detection circuit c5 judges that the demodulated signal Sdm corresponds to the address information part. In this particular case, the demodulated signal Sdm is extracted when the counted value of the counter c4 is "4" to "7". When the demodulated signal Sdm extracted by the address detection circuit c5 reaches a predetermined amount (that is, amounts to 52 data bits in this particular case), the address detection circuit c5 acquires address data from the extracted demodulated signal Sdm. The acquired address data is output to the CPU 40 as an address signal Sad.

The layer information detection circuit c6 refers to the counted value of the counter c4, and extracts the demodulated signal Sdm when the layer information detection circuit c6 judges that the demodulated signal Sdm corresponds to the layer information part. In this particular case, the demodulated signal Sdm is extracted when the counted value of the counter c4 is "26". The layer information detection circuit c6 generates a layer signal Slay based on the extracted demodulated signal Sdm, and outputs this layer signal Slay to the servo controller 33. In this particular case, the layer signal Slay indicates the recording layer M1 when the extracted demodulated signal Sdm has a high level, and indicates the recording layer M2 when the extracted demodulated signal Sdm has a low level.

Returning now to the description of FIG. 1, the servo controller 33 generates a focus control signal for correcting the focus error, based on the focus error signal Sfe from the servo and wobble signal detection circuit 28b and the layer signal Slay from the wobble signal analyzing circuit 28c. In addition, the servo controller 33 generates a tracking control signal for correcting the tracking error, based on the track error signal Ste from the servo and wobble signal detection circuit 28b. The control signals generated by the servo controller 33 are output to the motor driver 27 when the servo is ON, and is not output when the servo is OFF. The servo ON state and the servo OFF state are set by the CPU 40.

The motor driver 27 outputs a driving signal for the focusing actuator to the optical pickup unit 23 based on the focus control signal described above, and outputs a driving signal for the tracking actuator to the optical pickup unit 23 based on the tracking control signal described above. In other words, the tracking control and the focus control are carried out by the servo and wobble signal detection circuit 28b, the servo controller 33 and the motor driver 27. In addition, the motor driver 27 outputs driving signals for the spindle motor 22 and the seek motor based on the control signals from the CPU 40.

The buffer RAM 34 includes a buffer region and a variable region. The buffer region temporarily stores the data to be recorded on the optical disk 15 (recording data), the data reproduced from the optical disk 15 (reproduced data) and the like. The variable region stores various program variables and the like. The buffer manager 37 manages the data input to and the data output from the buffer RAM 34, and notifies the CPU 40 when the amount of data stored in the buffer region reaches a predetermined amount.

The encoder 25 obtains the recording data recorded in the buffer RAM 34 via the buffer manager 37 based on an instruction from the CPU 40, carries out a data modulation, addition of an error correction code and the like, to generate a write signal that is to be written on the optical disk 15. The generated write signal is output to the laser control circuit 24 together with the reference clock signal described above.

The laser control circuit 24 generates a driving signal for the semiconductor laser 51a based on a light emission characteristic of the semiconductor laser 51a, the power monitor signal described above, the write signal from the encoder 25, the reference clock signal and the like. The interface 38 forms a bidirectional or two-way communication interface between the optical disk apparatus 20 and a host unit. For example, the interface 38 is in conformance with the AT Attachment Packet Interface (ATAPI) standards.

The flash memory 39 includes a program region and a data region. The program region stores programs that are written in codes decodable by the CPU 40. The data region stores information related to the light emission characteristic of the semiconductor laser 51a, information related to a seek operation (hereinafter referred to as "seek information"), recording strategy information and the like.

The CPU 40 controls the operation of various parts of the optical disk apparatus 20 according to the programs stored in the program region of the flash memory 39. In addition, the CPU 40 stores data necessary for the control and the like to the variable region of the buffer RAM 34 and the RAM 41.

Figure 14:
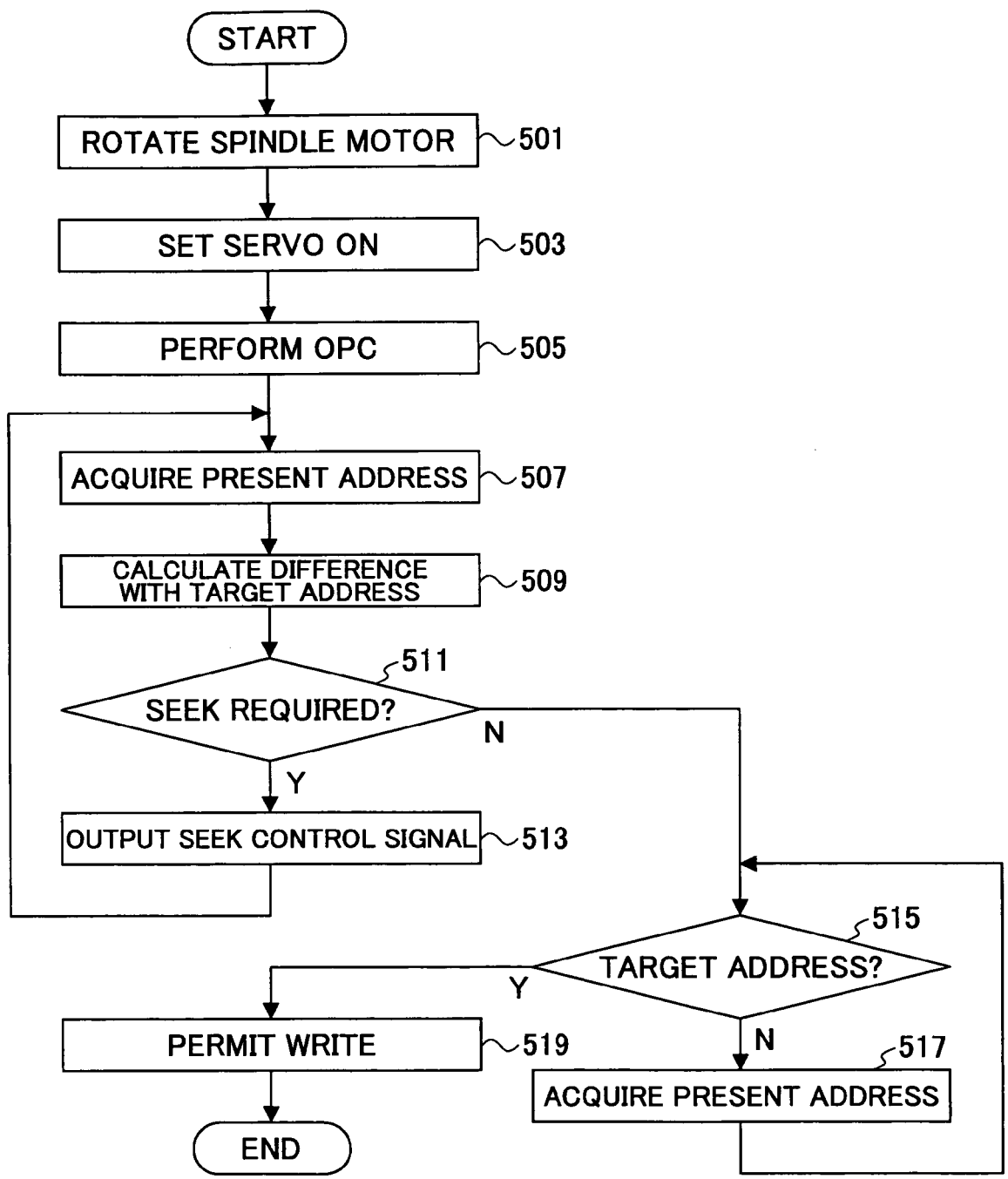
FIG. 14 is a flow chart for explaining a recording process of the optical disk apparatus that is carried out in response to a recording request command from a host unit.

Next, a description will be given of a process (recording process) of the optical disk apparatus 20 when a recording request command is received from the host unit, by referring to FIG. 14. A flow chart shown in FIG. 14 corresponds to a series of processing algorithms executed by the CPU 40. When the recording request command is received from the host unit, a starting address of the program corresponding to the flow chart shown in FIG. 14 is set in a program counter of the CPU 40, and the recording process starts.

In a first step 501, a control signal for rotating the spindle motor 22 is output to the motor driver 27 based on a recording velocity, and a notification indicating that the recording request command was received from the host unit is made to the reproduced signal processing circuit 28. In addition, the buffer manager 37 is instructed to store the data (recording data) received from the host unit into the buffer RAM 34.

In a step 503, the servo ON state is set with respect to the servo controller 33 when it is confirmed that the rotation of the optical disk 15 has reached a predetermined linear velocity. As a result, the tracking control and the focus control are carried out as described above. The tracking control and the focus control are carried out at all times until the recording process ends.

In a step 505, an optimum power control (OPC) is carried out based on the recording velocity, so as to acquire an optimum recording power. In other words, the recording power is varied in steps, while a test write of predetermined data is made in a test write region that is referred to as a power calibration area (PCA), and the data is successively reproduced. For example, in a case where an asymmetry value detected from the RF signal approximately matches a target value that is obtained in advance by experiments or the like, it is judged that the recording quality is the highest in this case, and the recording power for this case is regarded as the optimum recording power.

In a step 507, a present address is acquired based on the address signal Sad. In a next step 509, a difference (address difference) between the present address and a target address that is extracted from the recording request command is calculated. In a step 511, a judgement is made based on the address difference to determine whether or not a seek is necessary. In this particular case, a reference is made to a threshold value that is stored in the flash memory 39, as the seek information described above, and the judgement result in the step 511 becomes YES and the process advances to a step 513 if the address difference exceeds the threshold value.

In the step 513, a control signal for the seek motor, according to the address difference, is output to the motor driver 27. Accordingly, the seek motor is driven, the seek operation is carried out, and the process returns to the step 507.

If the address difference does not exceed the threshold value and the judgement result in the step 511 is NO, the process advances to a step 515.

In the step 515, a judgement is made to determine whether or not the present address matches the target address. If the present address and the target address do not match and the judgment result in the step 515 is NO, the process advances to a step 517. In the step 517, the present address is acquired based on the address signal Sad, and the process returns to the step 515.

The processes of the steps 515 through 517 are repeated until the judgement result in the step 515 becomes YES.

If the present address and the target address match and the judgement result in the step 515 is YES, the process advances to a step 519. In the step 519, the encoder 25 is permitted to write. Hence, the recording data is written on the optical disk 15 via the encoder 25, the laser control circuit 24 and the optical pickup unit 23. When all of the recording data are written, the recording process ends after carrying out a predetermined ending process.

Figure 15:
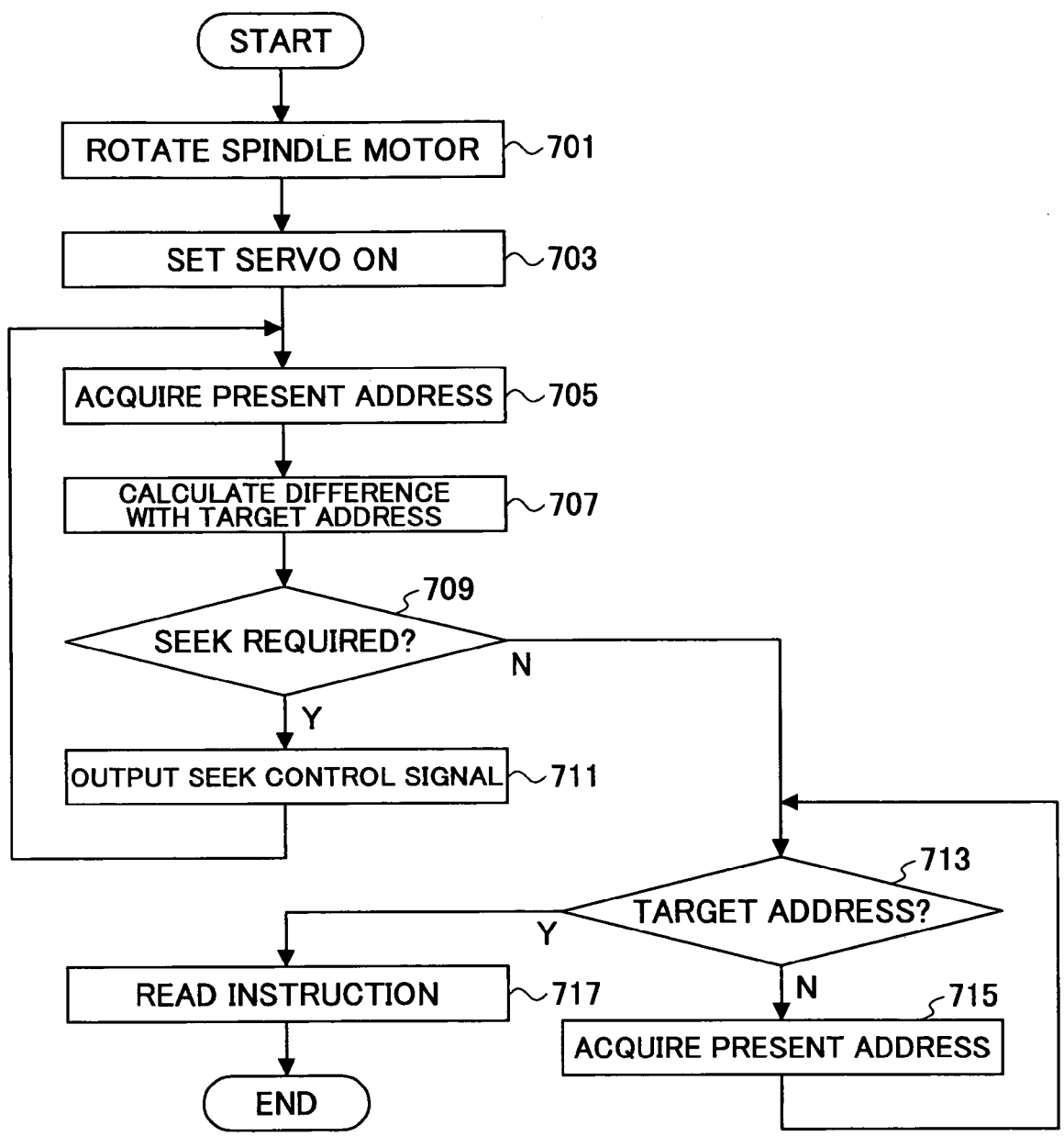
FIG. 15 is a flow chart for explaining a reproduction process of the optical disk apparatus that is carried out in response to a reproduction request command from the host unit.

A description will be given of a process (reproduction process) of the optical disk apparatus 20 when a reproduction request command is received from the host unit, by referring to FIG. 15. A flow chart shown in FIG. 15 corresponds to a series of processing algorithms executed by the CPU 40. When the reproduction request command is received from the host unit, a starting address of the program corresponding to the flow chart shown in FIG. 15 is set in a program counter of the CPU 40, and the reproduction process starts.

In a first step 701, a control signal for rotating the spindle motor 22 is output to the motor driver 27 based on a reproducing velocity, and a notification indicating that the reproduction request command was received from the host unit is made to the reproduced signal processing circuit 28.

In a step 703, the servo ON state is set with respect to the servo controller 33 when it is confirmed that the rotation of the optical disk 15 has reached a predetermined linear velocity. As a result, the tracking control and the focus control are carried out as described above. The tracking control and the focus control are carried out at all times until the reproduction process ends.

In a step 705, a present address is acquired based on the address signal Sad. In a step 707, a difference (address difference) between the present address and a target address that is extracted from the reproduction request command is calculated. In a step 709, a judgement is made based on the address difference to determine whether or not a seek is necessary, similarly to the step 511. The judgement result in the step 709 becomes YES and the process advances to a step 711 if the seek is necessary. In the step 711, a control signal for the seek motor, according to the address difference, is output to the motor driver 27, and the process returns to the step 705. On the other hand, the judgement result in the step 709 becomes NO and the process advances to a step 713 if the seek is not necessary.

In the step 713, a judgement is made to determine whether or not the present address matches the target address. If the present address and the target address do not match and the judgment result in the step 713 is NO, the process advances to a step 715. In the step 715, the present address is acquired based on the address signal Sad, and the process returns to the step 713.

The processes of the steps 713 through 715 are repeated until the judgement result in the step 713 becomes YES.

If the present address and the target address match and the judgement result in the step 713 is YES, the process advances to a step 717. In the step 717, the reproduced signal processing circuit 28 is instructed to read. Hence, the reproduced data is acquired by the reproduced signal processing circuit 28 and stored in the buffer RAM 34. The reproduced data is transferred to the host unit via the buffer manager 37 and the interface 38 in units of sectors. When the reproduction of all of the data instructed from the host unit ends, the reproduction process ends after carrying out a predetermined ending process.

As may be seen from the description above, in the optical disk apparatus 20 according to this embodiment, the recording layer discriminating apparatus is formed by the wobble signal analyzing circuit 28c, and the servo control apparatus is formed by the servo controller 33 and the motor driver 27.

In addition, the processing apparatus is realized by the CPU 40 and the program executed by the CPU 40. However, the present invention is of course not limited to such. In other words, the embodiment described above is only one example, and at least a portion of the processing apparatus that is realized by the CPU 40 and the program executed by the CPU 40 may be formed by hardware or, the processing apparatus in its entirety may be formed by hardware.

The recording layer discriminating method according to this embodiment is realized by the processing operation of the wobble signal analyzing circuit 28c.

As described above, according to the optical disk 15 according to this embodiment, 2 information recordable recording layers are provided, and the spiral or concentric tracks are formed on each of the recording layers. In addition, at least a portion of each track has wobbles corresponding to the wobble signal that includes the layer information for discriminating the recording layer on which the track is formed. Hence, when accessing the optical disk 15, the wobble signal is detected based on the reflected light from the wobble portion, and the recording layer on which the light spot is formed can be discriminated by extracting the layer information from the wobble signal. In other words, it is possible to quickly and accurately acquire the information for discriminating the recording layer.

Since the wobble signal includes the carrier wave part for the reference clock generation, it is easy to demodulate the wobble signal.

Because the layer information part and the synchronizing information part have mutually different signal waveforms, the synchronizing information part can be detected accurately.

The wobble signal includes the carrier wave part before and after the layer information part. For this reason, it is possible to prevent the generating accuracy from deteriorating when generating the reference clock signal.

If 1 period of the reference clock generated from the carrier wave part corresponds to 1 wobble, the synchronizing period is 93 wobbles. If the starting part of the synchronizing information part is regarded as the 0th wobble, the layer information part exists between the 12th wobble and the 88th wobble, and it is possible to prevent the generating accuracy from deteriorating when generating the reference clock signal.

According to the wobble signal analyzing circuit 28c of this embodiment, the wobble signal that is detected based on the reflected light from the optical disk 15 is demodulated in the clock generating circuit c1 and the demodulating circuit c2, and the layer information is detected from the demodulated wobble signal in the synchronization detection circuit c3, the counter c4 and the layer information detection circuit c6. In other words, because the layer information is acquired solely from the wobble signal, it is possible to more accurately acquire the layer information within a shorter time compared to the conventional method. As a result, in the information recording medium having a plurality of recording layers, it is possible to quickly and accurately discriminate the recording layer on which the light spot is formed.

According to the optical disk apparatus 20 of this embodiment, it is possible to quickly and accurately control the position of the objective lens because the recording layer on which the light spot is formed can be discriminated by the wobble signal analyzing circuit 28c within a short time. As a result, it is possible to quickly access the information recording medium having the plurality of recording layers, at least for the reproduction of the information from the information recording medium, of the recording of information on, reproduction of the information from and erasure of the information from the information recording medium.

In the embodiment described above, each information part of the wobble signal is phase-modulated, but the present invention is not limited to such. For example, it is possible to employ the Frequency Shift Keying (FSK) modulation, the sawtooth modulation, Minimum Shift Keying (MSK) modulation, ON-OFF modulation or the like as shown in FIG. 16. In this case, the wobble signal analyzing circuit 28c must employ a detection method suited for the modulation technique that is employed. In addition, from the point of view of the stability of the reference clock signal, it is preferable also in this case to provide the carrier wave part between the address information part and the layer information part.

In the embodiment described above, the modulation technique used for the synchronizing information part and the modulation technique used for the layer information part are the same. However, the present invention is not limited to such, and the modulation technique used for the synchronizing information part and the modulation technique used for the layer information part may be different.

Moreover, in the embodiment described above, the layer information part and the synchronizing information part have mutually different signal waveforms. However, the layer information part and the synchronizing information part may have the same signal waveform provided that it is possible to positively separate the layer information part and the synchronizing information part.

Figure 17:
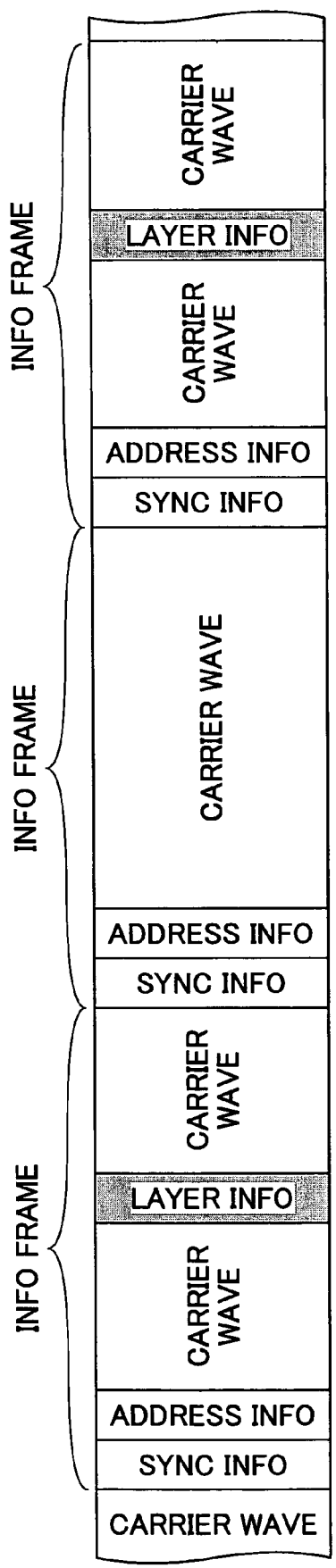
FIG. 17 is a diagram for explaining a modification of the wobble signal information format shown in FIG. 3.

Furthermore in the embodiment described above, layer information part is provided for every information frame, but the present invention is not limited to such. For example, the layer information part may be provided in one of n consecutive information frames, where n is greater than or equal to 2. FIG. 17 shows a case where n=2. In other words, the layer information part may be arranged at a period that is an integer multiple of the synchronization period of the synchronizing information part.

In the embodiment described above, the carrier wave part is provided between the address information part and the layer information part. However, the layer information part may be provided following the address information part if it is clear that the accuracy of the reference clock will not be deteriorated thereby.

Figure 18:
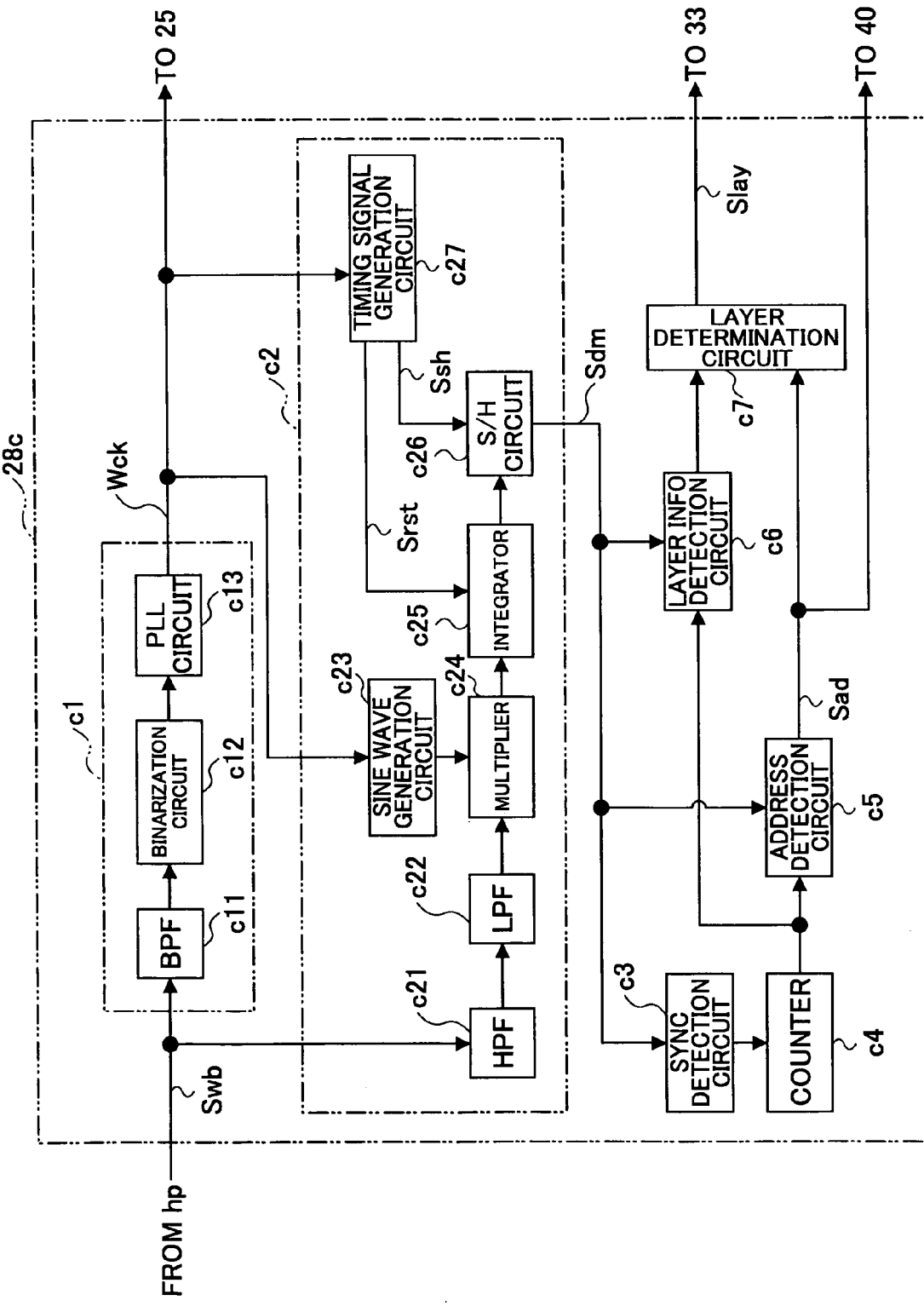
FIG. 18 is a block diagram for explaining a modification of the wobble signal analyzing circuit shown in FIG. 11.

In the embodiment described above, the recording layer is discriminated solely from the detection result in the layer information detection circuit c6, however, the present invention is not limited to such. For example, the recording layer may be discriminated from the detection result in the layer information detection circuit c6 and the address signal Sad from the address detection circuit c5. In this case, as shown in FIG. 18, for example, a layer determination circuit c7 is additionally provided to determine the recording layer from the output signal of the layer information detection circuit c6 and the address signal Sad of the address detection circuit c5. This layer determination circuit c7 checks whether the address of the address signal Sad is an address (00000H to 10000H in this case) allocated to the track on the recording layer M1 or an address (10001H to 20000H in this case) allocated to the track on the recording layer M2, and judges the recording layer on which the light spot is formed. If the judgement result in the layer determination circuit c7 and the detection result in the layer information detection circuit c6 match, the layer determination circuit c7 determines the recording layer on which the light spot is formed and notifies a determination result to the servo controller 33 as the layer signal Slay. If the judgement result in the layer determination circuit c7 and the detection result in the layer information detection circuit c6 do not match, the layer determination circuit c7 does not determine the recording layer, and waits for the next detection result of the layer information detection circuit c6 or the input of the next address signal Sad from the address detection circuit c5.

Further, in the embodiment described above, the layer information part is provided at a position corresponding to the wobble number 26, but the present invention is not limited to such. The layer information part may be provided at any position from the wobble number 12 to the wobble number 88. According to a general bandpass filter characteristic, the output signal of the bandpass filter becomes normal if the layer information part is separated by 5 wobbles from the phase modulating part, and for this reason, the layer information part is provided at any position from the wobble number 12 to the wobble number 88.

Although the synchronizing information part is formed by 4 wobbles in the embodiment described above, the present invention is of course not limited to such.

In addition, although the address information part is formed by 4 wobbles in the embodiment described above, the present invention is of course not limited to such.

Moreover, although the address data is formed by 51 bits in the embodiment described above, the present invention is of course not limited to such.

In the embodiment described above, the layer information part is formed by 1 wobble, but the present invention is not limited to such. For example, the layer information part may be formed by 2 or more wobbles. In addition, the number of wobbles forming the layer information part may be set depending on the number of recording layers. If 4 recording layers are provided, for example, the recording layer can be indicated by 2-bit information "00", "01", "10" and "11", and in this case, the layer information part may be formed by 2 wobbles.

The address information part is provided following the synchronizing information part in the embodiment described above, but the carrier wave part may be provided between the synchronizing information part and the address information part.

Although the address information part is provided before the layer information part in the information frame according to the embodiment described above, the address information part may be provided after the layer information part. In other words, the address information part may be provided at any position as long as the position (number of wobbles) relative to the synchronizing information part is clear.

The information frame has a size amounting to 93 wobbles in the embodiment described above, however, the present invention is not limited to such.

In the embodiment described above, the binarization circuit c12 of the clock generating circuit c1 may be omitted.

Figure 19A:
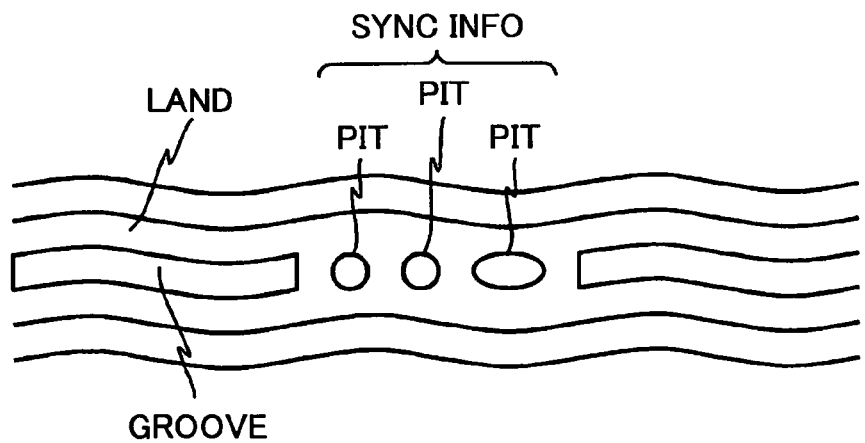
FIGS. 19A and 19B respectively are diagrams for explaining an optical disk recorded with synchronizing information by formation of pits.
Figure 19B:
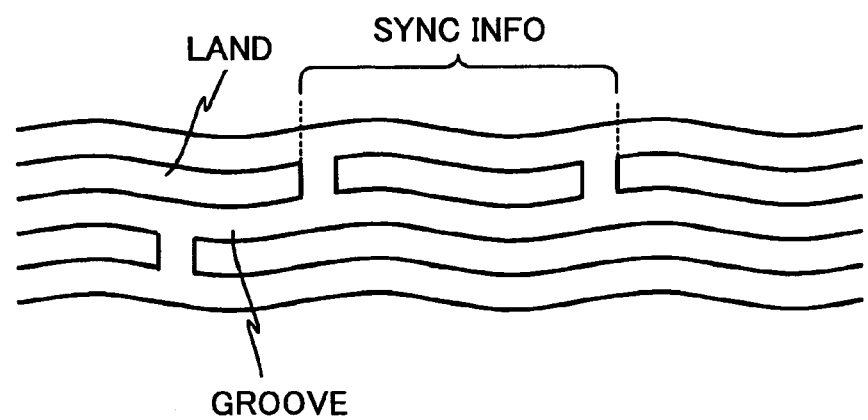
Figure 20:
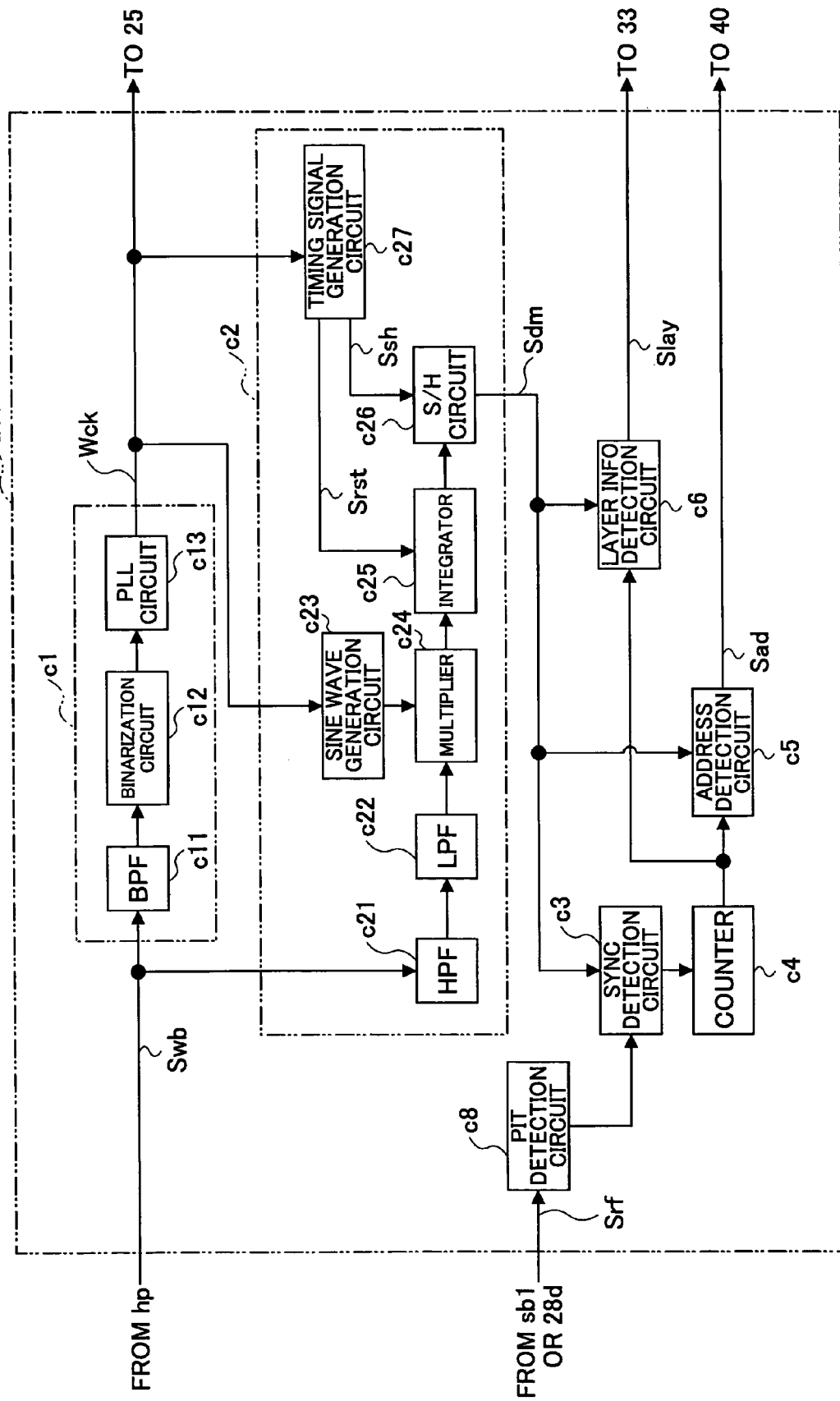
FIG. 20 is a block diagram for explaining a structure of the wobble signal analyzing circuit corresponding to the optical disk shown in FIG. 19A or 19B.

The synchronizing information is recorded as the wobble signal in the embodiment described above, but the present invention is not limited to such. As shown in FIGS. 19A and 19B, for example, the synchronizing information may be recorded in the form of pits. FIG. 19A shows a case where predetermined pits are formed as the synchronizing information in a region where the wobble state is discontinued. On the other hand, FIG. 19B shows a case where predetermined pits are formed as the synchronizing information in a land portion. In these cases, a pit detection circuit c8 is additionally provided in the wobble signal analyzing circuit 28c as shown in FIG. 20, for example. In the case shown in FIG. 19A, the pit detection circuit c8 detects the pits of the synchronizing information based on the RF signal Srf that is received from the RF signal detection circuit 28d. On the other hand, in the case shown in FIG. 19B, the pit detection circuit c8 detects the pits of the synchronizing information based on the output signal of the subtractor sb1. A detection result of the pit detection circuit c8 is notified to the synchronization detection circuit c3.

In the embodiment described above, the 4-part light receiving element is used as the light receiver 59, but the present invention is not limited to such. For example, the light receiver 59 may be formed by 2 2-part light receiving elements or, by 4 light receiving elements.

In addition, only one side of the track may have the wobble. Moreover, the wobble of the track may be intermittently discontinued or broken. What is required is for the wobble to be applicable to an information recording medium having a plurality of recording layers, and for a wobble signal having a predetermined signal to be obtainable based on the return beam from each recording layer.

The optical disk of the embodiment described above has 2 information recordable recording layers, but the present invention is not limited to such, and 3 or more recording layers may be provided. In this case, if at least 2 information recordable recording layers exist, the remaining recording layers may be the so-called ROM layer which is prerecorded with information and to which information cannot be additionally recorded.

In the embodiment described above, the track error signal is obtained by the so-called push-pull method, but the present invention is not limited to such. For example, it is possible to use a phase difference (DPD: Differential Phase Detection) method that utilizes the return beam from a single light spot formed on the recording surface, similarly to the push-pull method. According to this phase difference method, the track error signal is detected based on a rotational change of an intensity pattern of the return beam. In other words, the return beam is detected by a 4-part light receiving element, and the amounts of phase advance and phase lag are obtained based on 2 sum signals each corresponding to a sum of the amounts of light detected by the light receiving parts that are arranged at mutually diagonal positions, so as to detect the track error signal.

The so-called 3 light spot method, the differential push-pull (DPP) method and the like may be used as a method of utilizing the return beams from 3 light spots formed on the recording surface. According to the 3 light spot method, the beam emitted from the light source is split into 1 main beam and 2 sub beams, and the main and sub beams are irradiated on the recording surface so that the main beam and the sub beam on the recording surface are shifted by ¼ track pitch in a tracking direction (direction perpendicular to a tangential direction of the track). The return beams of the 2 sub beams reflected by the recording surface are detected by 2 light receiving elements, and the track error signal is detected from a difference between the amounts of light detected by the 2 light receiving elements. On the other hand, according to the differential push-pull method, the beam emitted from the light source is split into 1 main beam and 2 sub beams, and the main and sub beams are irradiated on the recording surface so that the main beam and the sub beam on the recording surface are shifted by ½ track pitch in the tracking direction. The return beams of the 1 main beam and the 2 sub beams reflected by the recording surface are detected by 3 2-part light receiving elements, and a push-pull signal is obtained at each 2-part light receiving element. The track error signal is detected from a difference between the push-pull signal of the main beam and a sum signal of the push-pull signals of the 2 sub beams.

The number and the arrangement of light receiving elements or light receiving parts forming the light receiver 59 are set to suit the detection method used to detect the track error signal. In addition, the servo and wobble signal detection circuit 28b has a circuit structure suited the detection method used to detect the track error signal. Of course, the light receiving element for detecting the track error signal and the light receiving element for detecting the focus error signal may be provided independently.

In the embodiment described above, the circuit for detecting the wobble signal and the circuit for detecting the servo signals may be provided independently, as long as the wobble signal and the servo signals can be detected accurately.

The detection lens 72, the light receiver 73 and the reflecting mirror 71 of the embodiment described above may be integrated into the light source unit 51. In this case, it is possible to further reduce the size of the optical pickup unit 23.

In the embodiment described above, the optical disk 15 is designed for the laser light with the wavelength of 660 nm, but the present invention is not limited to such, and for example, the optical disk 15 may be designed for other laser lights such as a laser light with a wavelength of approximately 405 nm.

Moreover, in the embodiment described above, the optical disk apparatus 20 can record information on and reproduce information from the optical disk 15. However, the present invention is not limited to such, and of the optical disk apparatuses that can record information on, reproduced information from and erase information from the optical disk, the present invention is applicable to the optical disk apparatuses that can at least reproduce information from the optical disk.

In the embodiment described above, the optical pickup unit 23 is provided with a single semiconductor laser. However, the present invention is not limited to such, and for example, the optical pickup unit 23 may be provided with a plurality of semiconductor lasers that emit beams with mutually different wavelengths. In this case, the plurality of semiconductor lasers may include at least one of a semiconductor laser that emits a beam with a wavelength of approximately 405 nm, a semiconductor laser that emits a beam with a wavelength of approximately 660 nm, and a semiconductor laser that emits a beam with a wavelength of approximately 780 nm. In other words, the optical disk apparatus 20 may be compatible with a plurality of kinds of optical disks in conformance with mutually different standards.

The interface 38 in the embodiment described above is in conformance with the ATAPI standards, but the present invention is of course not limited to such. For example, the interface 38 may be in conformance with any of the standards selected from AT Attachment (ATA), Small Computer System Interface (SCSI), Universal Serial Bus (USB) 1.0, USB 2.0, IEEE 1394, IEEE 802.3, serial ATA, and serial ATAPI.

Therefore, according to the information recording medium of this embodiment, it is possible to obtain the effect of quickly and accurately obtaining the information for discriminating the recording layer. In addition, according to the recording layer discriminating method and the recording layer discriminating apparatus of this embodiment, it is possible to obtain the effect of quickly and accurately discriminating the recording layer on which the light spot is formed in the information recording medium having a plurality of recording layers. Furthermore, according to the optical disk of this embodiment, it is possible to obtain the effect of making a quick access to the information recording medium having a plurality of recording layers.

Second Embodiment

Next, a description will be given of an embodiment of the information recording medium such as the optical disk, the information recording medium forming apparatus and the information recording medium forming method for forming such an information recording medium, the information detecting method, the information detecting apparatus and the information recording medium apparatus according to the present invention, by referring to FIGS. 21 through 38.

For example, a Japanese Laid-Open Patent Application No. 10-69646 proposes a method using the phase modulation (PSK: Phase Shift Keying) technique for storing the information.

In addition, the Japanese Laid-Open Patent Application No. 2001-52342 proposes a method of forming the wobbles in each recording layer of a multi-layer recording medium having 2 or more recording layers.

Furthermore, the Japanese Laid-Open Patent Application No. 2002-74679 proposes a method of changing a wobble frequency or the modulation technique for each recording layer of a multi-layer recording medium.

The CD-R/RW and DVD+R/RW are popularly used as external storage units for personal computers (PCs). There are increased demands to further increase the recording capacity of the information recordable information recording media, and it is expected that 2 or more recording layers will be used for the information recordable information recording media.

The information recordable information recording medium has tracks made up of lands and grooves that enable tracking of the light spot, and wobbles storing the rotation information and address information. In the DVD+R/RW, the phase modulation (PSK: Phase Shift Keying) technique is used (refer to the Japanese Laid-Open Patent Application No. 10-69646). The PSK technique generally has a high demodulated signal versus noise ratio (S/N ratio), and is extremely advantageous with respect to external disturbances in other frequency bands. For example, the PSK technique is an extremely superior format in a case where large amounts of external disturbances in the frequency bands other than the wobble signal exist such as when reproducing information in the recorded region. However, in the case of the optical disk, the edge of the light spot overlaps the adjacent track, and the wobble signal of the adjacent track leaks into the wobble signal that is detected from the desired or target track, to thereby cause an amplitude of phase deviation. Since the frequencies of the wobble signal of the adjacent track that leaks are mostly the same as those of the wobble signals of the desired or target track, the leak signal cannot be eliminated according to the PSK technique.

It is conceivable to use a wobble modulation technique that combines the FSK (Frequency Shift Keying) technique and the PSK technique. The use of the FSK technique enables the external disturbances from the adjacent track to be eliminated, and the combination with the PSK technique improves the demodulated S/N ratio, to achieve a satisfactory demodulation performance.

On the other hand, as the multi-layer recording medium having 2 or more recording layers, the Japanese Laid-Open Patent Application No. 2001-52342 proposes forming the wobble in each recording layer of the multi-layer recording medium.

In addition, the Japanese Laid-Open Patent Application No. 2002-74679 proposes a method of changing the frequency and the modulation technique for the wobble for each of the plurality of recording layers. In this case, as a method of quickly finding the recording layer that is the access target, it is conceivable to change the frequency and the modulation technique for each recording layer, but this will result in the following problems.

First, if the frequency of the wobble differs for each recording layer, the wobble signal frequency may differ from a desired value because of a deviation of the rotational speed of the recording medium from a desired rotational speed. In addition, if a jump is made to a different radial position from one recording layer to another recording layer, since a frequency change by two times or more occurs from the inner periphery to the outer periphery of the recording medium, it is difficult to judge whether the radial position reached is incorrect or the recording layer on which the focusing is made is incorrect. Furthermore, because a bandpass filter (BPF) is normally used to pass only a narrow band in order to detect the carrier wave component with a high quality, a slight deviation of the wobble frequency will result in the wobble signal to be blocked and be undetected. Hence, the bandpass filter cannot be used to make the judgement at the different frequencies, and for this reason, it is expected that the quality of the detected wobble signal will not be high.

In addition, in the case where the modulation technique used is completely different for each recording layer, it is necessary to provide a plurality of detection circuits. This may not only increase the cost, but also increase the time required to make the design, evaluation and the like. Moreover, if the wobble frequency is set the same for each recording layer and the modulation technique used is made greatly different for each recording layer, the information density will change for each recording layer. Because the number of wobbles required to store a unit information differs depending on the modulation technique, it is impossible to employ a common address information sequence among the recording layers. If a common address information sequence were to be employed, the information density would inevitably be limited to a low density by a modulation technique that has a large redundancy and low density.

Generally, when carrying out a clock lock to extract the carrier wave component from the wobble signal or a synchronization lock at the time of demodulating the information, a retry is made when the locking for coping with the external disturbances and low-quality products is unsuccessful. It is difficult to judge whether the locking is unsuccessful because the wobble frequency or the modulation technique is different from that of the target recording layer or, the locking is unsuccessful due to poor signal quality. For this reason, it is necessary to wait until a predetermined number of retries end, and it will take an extremely long time to make the judgement if the wobble frequency or the modulation technique is different for each recording layer.

Therefore, it is not appropriate to greatly change the frequency or the modulation technique for the wobble signal for each recording layer. These problems, however, do not apply to the PSK technique, the FSK technique and the FSK+PSK technique which is the combination of the FSK and PSK techniques, because a large circuit portion can be used in common for the modulation and demodulation circuits.

In the multi-layer information recording medium having the plurality of recording layers, it is important to discriminate the recording layer (that is, carry out the layer discrimination), but no suitable method has been found at the present.

Accordingly, it is desirable to provide a disk format that enables the layer discrimination or the like, using the information recording medium that employs the FSK or PSK technique having a high demodulation performance as the wobble modulation technique and enabling a circuit portion to be used in common among the demodulation circuits. At the same time, it is desirable to positively carry out the layer discrimination without greatly increasing the circuit scale and without requiring a long wait time for the retries.

One object of the embodiment of the present invention which will be described next is to provide a disk format that enables the layer discrimination or the like, using the information recording medium that employs the FSK or PSK technique having a high demodulation performance as the wobble modulation technique and enabling a circuit portion to be used in common among the demodulation circuits, and at the same time, positively carry out the layer discrimination without greatly increasing the circuit scale and without requiring a long wait time for the retries. This embodiment is applicable to recording media such as write-once optical disks, rewritable type optical disks and magneto-optical disks, and also to optical disks such as CD-R disks, CD-RW disks, DVD-R disks, DVD+R disks, DVD-RW disks and DVD+RW disks.

In order to achieve the object described above, this embodiment provides recording media described below under (1) through (12) and optical disks described below under (13) through (48).

(1) A recording medium comprising a plurality of recording layers, and wobbles formed on a track of each of the recording layers, wherein the wobbles include a carrier wave part for use in detecting a carrier wave having a constant frequency, and a layer information part for use in detecting a frequency modulated wave that indicates a place or position of each recording layer.

(2) The recording medium of (1) above, wherein a frequency of the frequency modulated wave is ½ a frequency of the carrier wave.

(3) The recording medium of (2) above, wherein a length of the frequency modulated wave amounts to 2 periods of the carrier wave.

(4) The recording medium of (1) above, wherein a frequency of the frequency modulated wave is 2 times a frequency of the carrier wave.

(5) The recording medium of (4) above, wherein a length of the frequency modulated wave amounts to 1 period of the carrier wave.

(6) A recording medium comprising a plurality of recording layers, and wobbles formed on a track of each of the recording layers, wherein the wobbles include a carrier wave part for use in detecting a carrier wave having a constant frequency, and a layer information part for use in detecting a phase modulated wave that indicates a place or position of each recording layer.

(7) A recording medium comprising a plurality of recording layers, and wobbles formed on a track of each of the recording layers, wherein the wobbles include a carrier wave part for use in detecting a carrier wave having a constant frequency, and a layer information part for use in detecting a phase modulated wave that indicates a place or position of each recording layer and has a period different from that of the carrier wave.

(8) The recording medium of (7) above, wherein a frequency of the phase modulated wave having the period different from that of the carrier wave is ½ a frequency of the carrier wave.

(9) The recording medium of (8) above, wherein a length of the phase modulated wave having the period different from that of the carrier wave amounts to 2 periods of the carrier wave.

(10) The recording medium of (7) above, wherein a frequency of the phase modulated wave having the period different from that of the carrier wave is 2 times a frequency of the carrier wave.

(11) The recording medium of (10) above, wherein a length of the phase modulated wave having the period different from that of the carrier wave amounts to 1 period of the carrier wave.

(12) The recording medium of any one of (1) to (11) above, wherein the layer information part is arranged at a position between carrier wave parts.

The following optical disks (13) through (48) are also provided.

(13) An optical disk in which a track has wobbles, and the wobbles include an FSK modulation part based on an FSK modulated waveform of first information, a PSK modulation part based on a PSK modulated waveform of second information, and a carrier wave part based on a waveform of a constant frequency.

(14) The optical disk of (13) above, wherein a frequency used for the FSK modulation is ½ that of a carrier wave of the carrier wave part.

(15) The optical disk of (14) above, wherein a length of a unit information recorded by the FSK modulation amounts to 2 periods of the carrier wave of the carrier wave part.

(16) The optical disk of (13) above, wherein a frequency used for the FSK modulation is 2 times that of a carrier wave of the carrier wave part.

(17) The optical disk of (16) above, wherein a length of a unit information recorded by the FSK modulation amounts to 1 period of the carrier wave of the carrier wave part.

(18) The optical disk of (13) above, wherein a length of a unit information recorded by the PSK modulation amounts to 1 period of the carrier wave of the carrier wave part.

(19) The optical disk of (13) above, wherein the PSK modulation part is arranged between carrier wave parts.

(20) The optical disk of any one of (13) to (19) above, wherein the first information is address information, and the second information is layer information indicating a place or position of each recording layer.

(21) An optical disk in which a track has wobbles, and the wobbles include an FSK modulation part based on an FSK modulated waveform of address information, a first PSK modulation part based on a PSK modulated waveform of layer information, a carrier wave part based on a waveform of a constant frequency, and a second PSK modulation part based on a PSK modulated waveform of periodic synchronizing information.

(22) An optical disk in which a track has wobbles, and the wobbles include an FSK modulation part based on an FSK modulated waveform of address information, a PSK modulation part based on a PSK modulated waveform of layer information, and a carrier wave part based on a waveform of a constant frequency, and periodic synchronizing information is formed by pits.

(23) The optical disk of any one of (20) to (22) above, wherein a relationship of the address information and a radial position on the optical disk is common to each recording layer.

(24) The optical disk of any one of (20) to (23) above, wherein the layer information is included in recorded information of a recorded region.

(25) An optical disk in which a track has wobbles, and the wobbles include a carrier wave part based on a waveform of a constant frequency, an FSK+PSK modulation part based on an PSK modulated waveform of first information with a period different from that of the carrier wave part, and a PSK modulation part based on a PSK modulated waveform of second information.

(26) The optical disk of (25) above, wherein a frequency used for the FSK+PSK modulation of the FSK+PSK modulation part is ½ that of the carrier wave of the carrier wave part.

(27) The optical disk of (26) above, wherein a length of a unit information recorded by the FSK+PSK modulation amounts to 2 periods of the carrier wave of the carrier wave part.

(28) The optical disk of (25) above, wherein a frequency used for the FSK+PSK modulation of the FSK+PSK modulation part is 2 times a frequency of the carrier wave of the carrier wave part.

(29) The optical disk of (28) above, wherein a length of a unit information recorded by the FSK+PSK modulation amounts to 1 period of the carrier wave of the carrier wave part.

(30) The optical disk of (25) above, wherein a length of unit information recorded by the PSK modulation amounts to 1 period of the carrier wave of the carrier wave part.

(31) The optical disk of (25) above, wherein the PSK modulation part is arranged between carrier wave parts.

(32) The optical disk of any one of (25) to (31), wherein the first information is address information, and the second information is layer information indicating a place or position of each recording layer.

(33) An optical disk in which a track has wobbles, and the wobbles include a carrier wave part based on a waveform of a constant frequency, an FSK+PSK modulation part based on an PSK modulated waveform of address information with a period different from that of the carrier wave part, a first PSK modulation part based on a PSK modulated waveform of layer information, and a second PSK modulation part based on a PSK modulated waveform of periodic synchronizing information.

(34) An optical disk in which a track has wobbles, and the wobbles include a carrier wave part based on a waveform of a constant frequency, an FSK+PSK modulation part based on an PSK modulated waveform of address information with a period different from that of the carrier wave part, and a PSK modulation part based on a PSK modulated waveform of layer information, and periodic synchronizing information is formed by pits.

(35) The optical disk of any one of (32) to (34) above, wherein a relationship of the address information and a radial position on the optical disk is common to each recording layer.

(36) The optical disk of any one of (32) to (35) above, wherein the layer information is included in recorded information of a recorded region.

(37) An optical disk in which a track has wobbles, and the wobbles include a carrier wave part based on a waveform of a constant frequency, and an FSK modulation part based on an FSK modulated waveform of layer information.

(38) The optical disk of (37) above, wherein a frequency used for the FSK modulation is ½ a frequency of the carrier wave of the carrier wave part.

(39) The optical disk of (38) above, wherein a length of unit information recorded by the FSK modulation amounts to 2 periods of the carrier wave of the carrier wave part.

(40) The optical disk of (37) above, wherein a frequency used for the FSK modulation is 2 times a frequency of the carrier wave of the carrier wave part.

(41) The optical disk of (40) above, wherein a length of unit information recorded by the FSK modulation amounts to 1 period of the carrier wave of the carrier wave part.

(42) The optical disk of any one of (37) to (41) above, wherein the FSK modulation part is arranged between carrier wave parts.

(43) An optical disk in which a track has wobbles, and the wobbles include a carrier wave part based on a waveform of a constant frequency, and an FSK+PSK modulation part based on an PSK modulated waveform of layer information with a period different from that of the carrier wave part.

(44) The optical disk of (43) above, wherein a frequency used for the FSK+PSK modulation of the FSK+PSK modulation part is ½ a frequency of the carrier wave of the carrier wave part.

(45) The optical disk of (44) above, wherein a length of unit information recorded by the FSK+PSK modulation amounts to 2 periods of the carrier wave of the carrier wave part.

(46) The optical disk of (43) above, wherein a frequency used for the FSK+PSK modulation of the FSK+PSK modulation part is 2 times a frequency of the carrier wave of the carrier wave part.

(47) The optical disk of (46) above, wherein a length of unit information recorded by the FSK+PSK modulation amounts to 1 period of the carrier wave of the carrier wave part.

(48) The optical disk of any one of (43) to (47) above, wherein the PSK modulation part is arranged between carrier wave parts.

According to the recording medium and the optical disk of this embodiment, the disk format enables the layer discrimination or the like, employs the FSK or PSK technique having a high demodulation performance as the wobble modulation technique and enables a circuit portion to be used in common among the demodulation circuits, and at the same time, positively carry out the layer discrimination without greatly increasing the circuit scale and without requiring a long wait time for the retries.

Another object of this embodiment is to accurately form on the information recording medium the wobbles obtained by the modulation techniques such as the FSK technique, the PSK technique and the FSK+PSK technique which is a combination of the FSK and PSK techniques.

This embodiment provides an information recording medium forming apparatus for forming a track with wobbles on an information recording medium by irradiating a light spot on the information recording medium, characterized by a recording unit that irradiates the light spot on the information recording medium, an irradiating position changing unit that generates the wobbles of the track by changing the irradiating position of the light spot on the information recording medium, a signal generator that generates a plurality of signals having different frequencies or having the same frequency but inverted phases, and a selection unit that selectively outputs the plurality of generated signals based on a predetermined signal, wherein the irradiating position changing unit generates the wobbles based on the signals that are selectively output from the selection unit.

From another aspect, this embodiment provides an information recording medium forming method for forming a track with wobbles on an information recording medium by irradiating a light spot on the information recording medium, characterized by generating a plurality of signals having different frequencies or having the same frequency but inverted phases, selectively outputting the plurality of generated signals based on a predetermined signal, and generates the wobbles of the track by changing the irradiating position of the light spot on the information recording medium based on the signals that are selectively output.

According to this embodiment, a wobble signal is generated by combining the plurality of signals having the different frequency or having the same frequency but inverted phases, and the wobbles can be formed on the information recording medium using this wobble signal. Hence, even if the modulation technique or the like that is used has a frequency difference of 2 times or more, the frequency shift can be made smoothly when modulating the wobble signal, and it is possible to accurately form on the information recording medium the wobble signal that is modulated by the FSK technique, the PSK technique or the FSK+PSK technique which combines the FSK and PSK techniques, based on the predetermined signal.

Still another object of this embodiment is to store layer information of a multi-layer information recording medium having a plurality of recording layers by modulation technique that is uneasily affected by crosstalk, such as the FSK technique, the PSK technique and the FSK+PSK which is a combination of the FSK and PSK techniques, and to make the layer information detectable, so that it is possible to quickly and accurately discriminate the recording layer that is being accessed.

This embodiment provides an information detection apparatus for reading, from an information recording medium that has wobbles of modulated information formed on a track, information recorded in the wobbles, characterized by a clock generating means for generating a reference clock signal from a wobble signal obtained from the wobbles, a demodulating means for detecting FSK modulated information, PSK modulated information or FSK+PSK modulated information from the wobbles based on the reference clock signal, a synchronization detection means for outputting a timing signal that indicates a place or position of each recording layer when data is recordable on each recording layer of the information recording medium having the multi-layer structure, and a layer information detection means for holding an output of the demodulating means in response to the timing signal and detecting the layer information.

From another aspect, this embodiment provides an information detecting method for reading, from an information recording medium that has wobbles of modulated information formed on a track, information recorded in the wobbles, characterized by generating a reference clock signal from a wobble signal obtained from the wobbles, detecting FSK modulated information, PSK modulated information or FSK+PSK modulated information from the wobbles based on the reference clock signal, and holding the information detected from the wobble signal and detecting the layer information in response to a timing signal that indicates a place or position of each recording layer when data is recordable on each recording layer of the information recording medium having the multi-layer structure.

From still another aspect, this embodiment provides an information recording medium in which data is recordable on each of a plurality of recording layers having a multi-layer structure by irradiating light and a track has wobbles of modulated information formed on a track, characterized in that layer information indicating a place or position of each recording layer is recorded in the wobbles as FSK modulated information, PSK modulated information or FSK+PSK modulated information.

According to this embodiment, it is possible to store the layer information of the multi-layer information recording medium having the plurality of recording layers by the modulation technique that is uneasily affected by the crosstalk, such as the FSK technique, the PSK technique and the FSK+PSK which is a combination of the FSK and PSK techniques, and to make the layer information detectable, so that it is possible to quickly and accurately discriminate the recording layer that is being accessed. Consequently, it is possible to appropriately record and reproduce the information.

FIG. 21 is a diagram showing a structure of an optical disk (medium) 101, which is an information recordable recording medium to which this embodiment may be applied. In FIG. 21, a left portion shows a plan view of the disk 101, and a right portion shows a perspective view of a portion of the disk 101 on an enlarged scale. The optical disk may be formed by a recording medium such as a write-once optical disk, a rewritable type optical disk and a magneto-optical disk, or optical disks such as a CD-R disk, a CD-RW disk, a DVD-R disk, a DVD+R disk, a DVD-RW disk and a DVD+RW disk. A spiral track 104 or concentric tracks 104 made up of grooves 102 and lands 103 are formed on the disk 101. The track 104 is formed in advance by a disk forming apparatus, and the information (recording and reproducing) apparatus records information and reproduces information along the track 104. In addition, the track 104 has wobbles as rotation information, so that a signal having a constant frequency (or period) is detectable when the disk 101 is rotated at a constant linear velocity or a constant angular velocity. In the case of the CD-RW or DVD+R/RW disk, the wobbles have an approximately constant frequency, but parts with slightly changed frequency or phase are provided, so as to record the synchronizing information and the address information by the so-called wobbles or wobbling. Other forms of the wobbles include a case where the wobbles are only provided on one side of the track 104, and a case where the wobbles are intermittently discontinued or broken.

As another method of representing an absolute position on the disk 101, it is possible to form pits of Fine Clock Marks (FCMs) on the disk 101. FIGS. 22A through 22C show such disks 101. The pit may exist in the groove 102 or in the land 103. Although FIGS. 22A through 22C show the disks 101 that record the information in the grooves 102, it is of course possible to record the information on the lands 103. When a pit in the groove 102 is taken into consideration, a groove pit 105 becomes a discontinuity of the groove as shown in FIG. 22A. The groove pit 105 may be detected as a change in intensity of the reflected light or, as a change in amplitude of the RF signal, for example. In a case where the recorded information is recorded as a change other than the change in amplitude of the reflected light or signal, as in the case of the magneto-optical disk 101, it is possible to easily detect the groove pit 105 from the amplitude of the RF signal. However, in a case where the recorded information is recorded as a change in the amplitude of the reflected light or signal, as in the case of the pigment (R: Recordable) or phase change (RW: Rewritable) disk 101, the same detection method will be used for both the pit information and the recorded information. Hence, it is desirable that the pit information and the recorded information are distinguishable by segmenting the region and the like.

When a pit in the land is taken into consideration, a land pit 106 becomes a hole, having approximately the same depth as the groove 102, in the land 103. The land pit 106 may be detected as an amplitude of a push-pull signal (a difference signal obtained from a light receiving element that is divided along a tangential direction to the track 104). In a case where the light spot accurately tracks the center of the track 104, the recorded information component hardly remains in the push-pull signal, and the land pit 106 can be detected with ease. When the light spot is tracking a specific groove 102, the pits of the lands 103 on both sides of this specific groove 102 can be detected, and the information may be obtained from a combination of the pits on both sides or, the information sequence may be obtained from the pit sequence from only one side. In the case of the FCMs, the wobbles of the track 104 locally have a high frequency and a large amplitude, as shown in FIG. 22C. The FCMs may be detected similarly to the wobbles. In addition, the FCMs may be formed in combination with the wobbles.

Therefore, it is possible to specify the absolute position on the disk 101 by using the information signal that is embedded at the stage when the disk 101 is formed. For example, if the information signal is used as a synchronizing signal that is required to demodulate the wobble signal, it is possible to position the light spot with a high accuracy.

In a case where the disk 101 has the multi-layer structure including a plurality of recording layers and the information is recordable on each recording layer, the wobbles exist in each recording layer. It is desirable that the wobbles have the same frequency at least between two mutually adjacent recording layers. It takes time for the clock or synchronization lock if the wobble frequencies of the recording layers are different, and the access can be made more quickly if the wobble frequency is the same for the recording layers particularly when the access frequently shifts among the recording layers. In addition, the spiral direction of the track 104 may be the same for a plurality of recording layers or, reversed for each recording layer. For example, the following advantages are obtained when the spiral direction of the track 104 is reversed for the first and second recording layers. That is, if a tracking to an inner periphery of the first recording layer is made in a state where the disk 101 is rotated in a constant direction, the light spot moves along the spiral towards the outer periphery of the disk 101. When the tracking is made by jumping to the second recording layer at a certain radial position on the first recording layer, the light spot then moves along the reverse spiral towards the inner periphery of the disk 101 even though the rotating direction of the disk 101 remains the same. Hence, when reproducing continuous information such as dynamic image information from 2 recording layers, it is possible to continuously reproduce the information of the 2 recording layers by simply jumping between the 2 recording layers at the same radial position without changing the rotating direction of the disk 101. On the other hand, the following advantages are obtained when the spiral direction of the track 104 is the same for the recording layers. That is, when the information recording and reproduction are made at a constant rotational speed of the disk 101, the linear velocity on the outer periphery of the disk 101 becomes faster than that on the inner periphery, thereby making the information transfer rate higher on the outer periphery. For this reason, if the spiral is tracked from the outer periphery towards the inner periphery for all of the recording layers so that the outer periphery of the disk 101 is preferentially used, the maximum information transfer rate is obtained from the start of the recording.

Normally, the wobbles are formed in the groove 102 in most cases, but the wobbles may of course be formed on the land 103. There is not much difference between the two cases, except that the signal polarity needs to be inverted between the two cases when generating the signals. If there are a plurality of information recordable recording layers, one or more ROM recording layers to which the information cannot be written may coexist with the information recordable recording layers. In the following example, the recording principle, the kind of recording groove, and the number of recording layers of the disk 101 are not limited, and this embodiment is applicable to any disk 101 that stores information at least by the wobbles.

Figure 23:
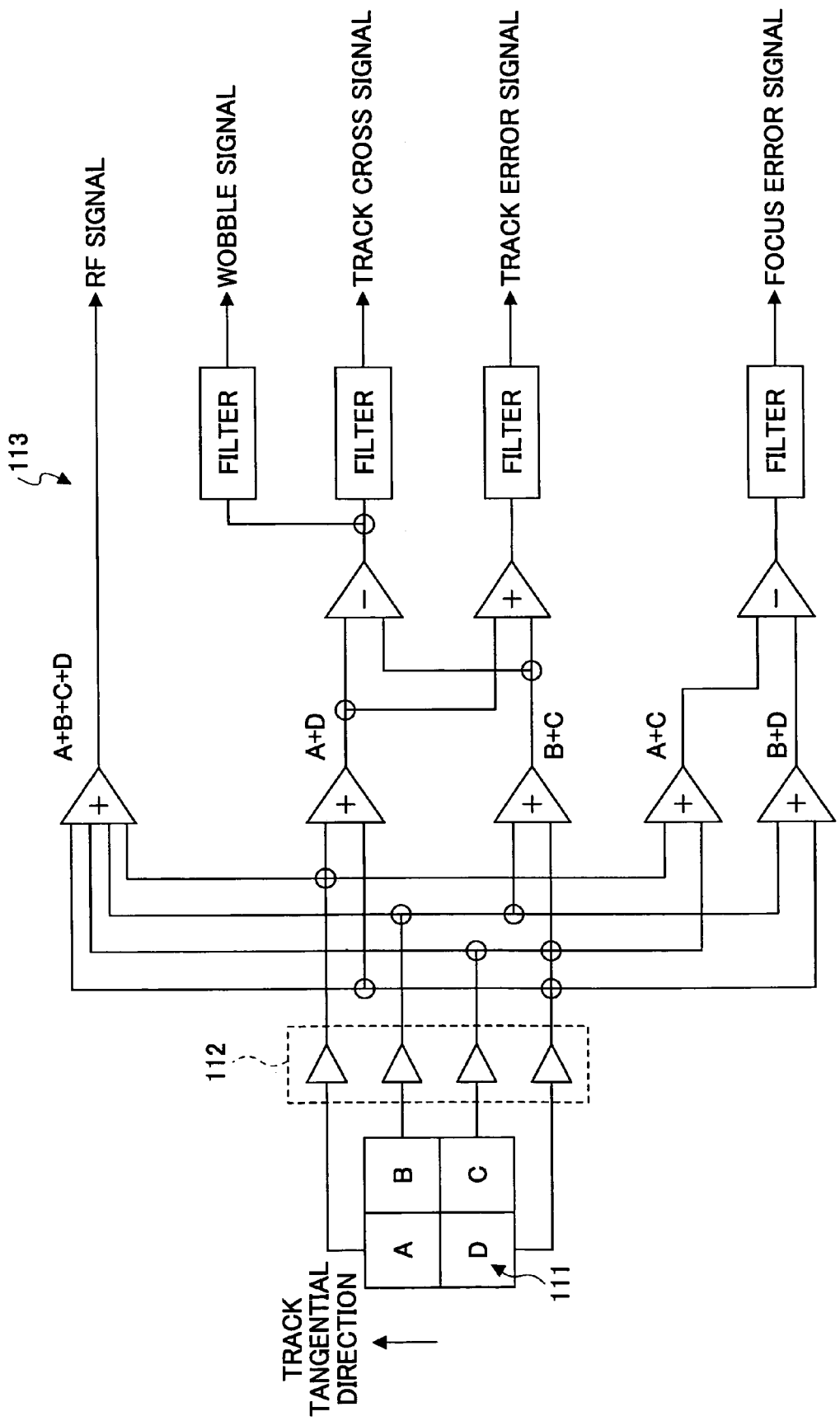
FIG. 23 is a diagram for explaining a light receiving element and a signal processing circuit that detect various signals from recorded information on the optical disk.

FIG. 23 shows an example of a signal processing block in a vicinity of the light receiving element that receives the light beam that is irradiated on and reflected from the disk 101 and extracts various signals. The reflected light from the disk 101 is received by a 4-part photodetector (PD) 111. The 4-part photodetector 111 is optically divided into 4 light receiving parts by division lines respectively corresponding to a tangential direction to the track 104 on the surface of the disk 101 and a direction perpendicular to the tangential direction. For the sake of convenience, the 4 light receiving parts of the 4-part photodetector 111 are labeled A through D in a clockwise direction starting from the upper left light receiving part. Outputs of the light receiving parts A through D are also indicated by A through D. Current signals are output from the 4-part photodetector 111, and thus, each current signal is converted into a voltage signal by an I/V circuit 112. The voltage signals are subjected to various addition and subtraction in an operation circuit 113 provided at the subsequent stage, so as to extract various kinds of signals. A track cross signal is a low-frequency signal obtained by an operation "(A+D)−(B+C)". A track error signal or a push-pull signal is a low-frequency signal obtained by an operation "(A+D)−(B+C)". A focus error is a low-frequency signal obtained by an operation "(A+C)−(B+D)" in the case of the astigmatism method. These signals are called servo signals, and are used for the tracking of the light beam. A wobble signal is a high-frequency signal obtained by an operation "(A+D)−(B+C)". Although the wobble signal is obtained by the same circuit as the track cross signal, the wobble signal may of course be obtained by other circuits, and various correction circuits may be inserted before subtracting amplifiers forming the operation circuit 113. In addition, since it is desirable to compute the reproduced (RF) signal by a separate circuit in the high band, the 4 signals are directly added in the stage subsequent to the I/V circuit 112.

A simplest computing method is shown for the various signals in FIG. 23, but the division of the 4-part photodetector 111 is not limited to this example, and may be divided into more light receiving parts depending on the number of light beams and optical paths, and may also be divided into a smaller number of light receiving parts such as 2 or 3. The computing method for the various signals may be optimized depending on the manner of light reception. Furthermore, the various signals may be detected from a plurality of light beams including main and sub light beams. For example, the track error signal may be computed according to the 3 beam method of the differential push-pull (DPP) method by receiving 3 light beams. The track cross signal may also be computed using 3 light beams. The track error signal may also be computed according to the DPD (Differential Phase Detection) method. Moreover, the focus error signal may be computed from signals of another light receiving element according to the knife edge method or the like.

In other words, the method of computing the various signals may be appropriately selected depending on the signal detection method, and the method or means for extracting the various signals from the disk 101 is not limited to a particular method or means.

Figure 24:
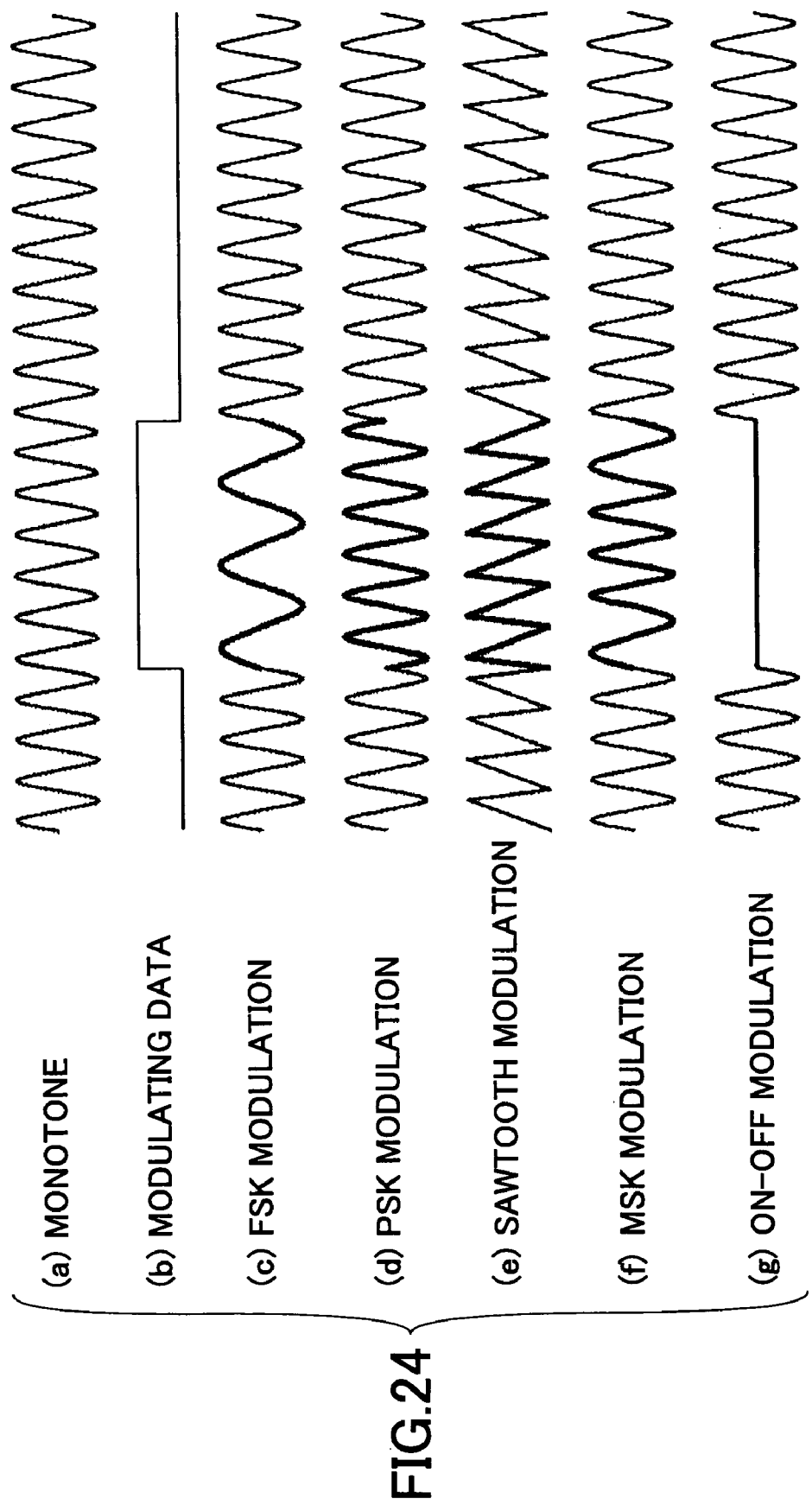
FIG. 24 is a diagram for explaining an example of a wobble signal waveform employing a general wobble modulation technique.

FIG. 24 is a diagram showing waveforms of wobble signals employing the general wobble modulation techniques. FIG. 24(a) shows a monotone which is a continuous sinusoidal wave without modulation, and is used in the carrier wave part or the like. FIG. 24(b) shows modulating data, and the subsequent modulated wobble signals correspond to this data. FIG. 24(c) shows a wobble waveform superimposed with the FSK (FM) modulation, for a case where ½ the frequency of the monotone is used. FIG. 24(d), FIG. 24(e), FIG. 24(f) and FIG. 24(g) respectively show wobble waveforms superimposed with the PSK (PM) modulation, sawtooth modulation, MSK modulation and ON-OFF modulation. Since each modulation technique has advantages and disadvantages, the disk 101 in this embodiment may combine two or more of these modulation techniques in part. The modulation is carried out to insert information such as the address information.

FIGS. 25A through 25C show an example of the entire format when recording the position information by the wobble modulation. As shown in FIG. 25A, a general format includes a carrier wave part (carrier wave) which occupies a large portion, a synchronizing information (synchronization) part, and address information (AD) part. A reference clock is generated from a carrier wave component that is obtained from the carrier wave part, and the position of the synchronizing information part that periodically appears is specified based on the reference clock. The address information is read from a demodulated result of the address information part that is located at a position separated by a predetermined distance (predetermined number of wobbles) from the synchronizing information part, so as to detect the position on the disk 101. The modulation format used for the synchronizing information part is set so that this modulation format generally does not occur or very seldom occurs in the address information part or other regions such as the layer information part, and is distinguishable because it occurs periodically.

In the disk 101 of this embodiment, the layer information that indicates the place or position of the recording layer that is presently being accessed is stored as shown in FIG. 25B or FIG. 25C. In FIG. 25B, the synchronizing information part and the address information part are continuous, and the layer information part is arranged at a position between the carrier wave parts. The address information can be read even if the synchronizing information part and the address information part are arranged at positions separated from each other, but an erroneous detection will occur if a clock error (an error in the counted number of wobbles with reference to the synchronizing information part) is generated between the synchronizing information part and the address information part due to external disturbances or the like. The address information must be read frequently, such as when moving the access position, and must also be read at a high speed. For this reason, an accurate and highly reliable address information detection is desired, and thus, it is desirable to arrange the address information part as close as possible to the synchronizing information part. Similarly, the layer information part may be arranged close to the synchronizing information part and the address information part, but the carrier wave component for generating the reference clock cannot be extracted for a long time if the modulation part becomes long, and the reference clock may become unstable. Since the output of the bandpass filter for extracting the carrier wave becomes distorted at the wobble modulation part, it is desirable to avoid consecutive modulation parts as much as possible. This distortion in the output of the bandpass filter does not become large for the modulation amounting to 1 to 2 periods of the carrier wave, but the waveform (or period) of the output of the bandpass filter becomes distorted when the modulation part becomes long, to thereby cause undesirable effects on the generation of the reference clock. Of course, this distortion is caused by the characteristic of the bandpass filter, and if no problem is introduced in extracting the reference clock, the layer information part may of course be arranged adjacent to the synchronizing information part or the address information part.

Basically, the layer information is read only when the recording layer being accessed is changed. In other words, since the layer information is not read frequently and the amount of information of the layer information is on the order of several bits and small which makes it possible to read the layer information in a short time, it is easy to check the layer information a plurality of times. Even if the clock error is generated, an error can be found by this check, and a retry can be made to correctly read the layer information. For this reason, virtually no problem is introduced by arranging the layer information part at a position separated from the synchronizing information part and the address information part, and it is desirable to avoid the undesirable effects on the generation of the reference clock.

In FIG. 25C, the layer information part is arranged intermittently. Although a large number of bits (large mount of information) is required to represent the address information, it is undesirable to avoid consecutive modulation parts. Hence, only a portion of the address information, such as 1 to 2 bits, is stored in 1 address information part, and the address information is stored by a plurality of address information parts. In other words, when the synchronizing information part, the address information part and the carrier wave part are regarded as being 1 set, the information from a plurality of sets are gathered to complete 1 address information. On the other hand, the layer information only requires 1 bit to discriminate the recording layer between 2 recording layers and 2 bits to discriminate the recording layer among 4 recording layers, and thus, the layer information does not necessarily have to be stored in each set, and it is sufficient to store the layer information for every plurality of sets. The layer information part may be provided in each set, so that the layer information and other information can be alternately stored in the layer information parts. Of course, if the layer information is stored in each set, the reliability is improved by the repeated storing of the layer information, and the recording layer can be discriminated quickly from the layer information.

When the layer information is stored by the method similar to that used to store the address information so that the complete layer information is obtained by gathering the information portions stored in a plurality of sets, it takes a long time to read the modulated information of the wobbles in order to discriminate the recording layer. However, the recording layer can be discriminated in a short time if the layer information can be detected by merely detecting the layer information part arranged at a specific position of the wobble. It is desirable that not only the modulation part of the layer information but all modulation parts store the information in a time that is as short as possible.

Of the wobble waveforms shown in FIG. 24, this embodiment uses the wobble waveforms superimposed with the PSK modulation, FSK modulation and the FSK+PSK (combination of FSK and PSK) modulation with respect to the disk

Figure 26:
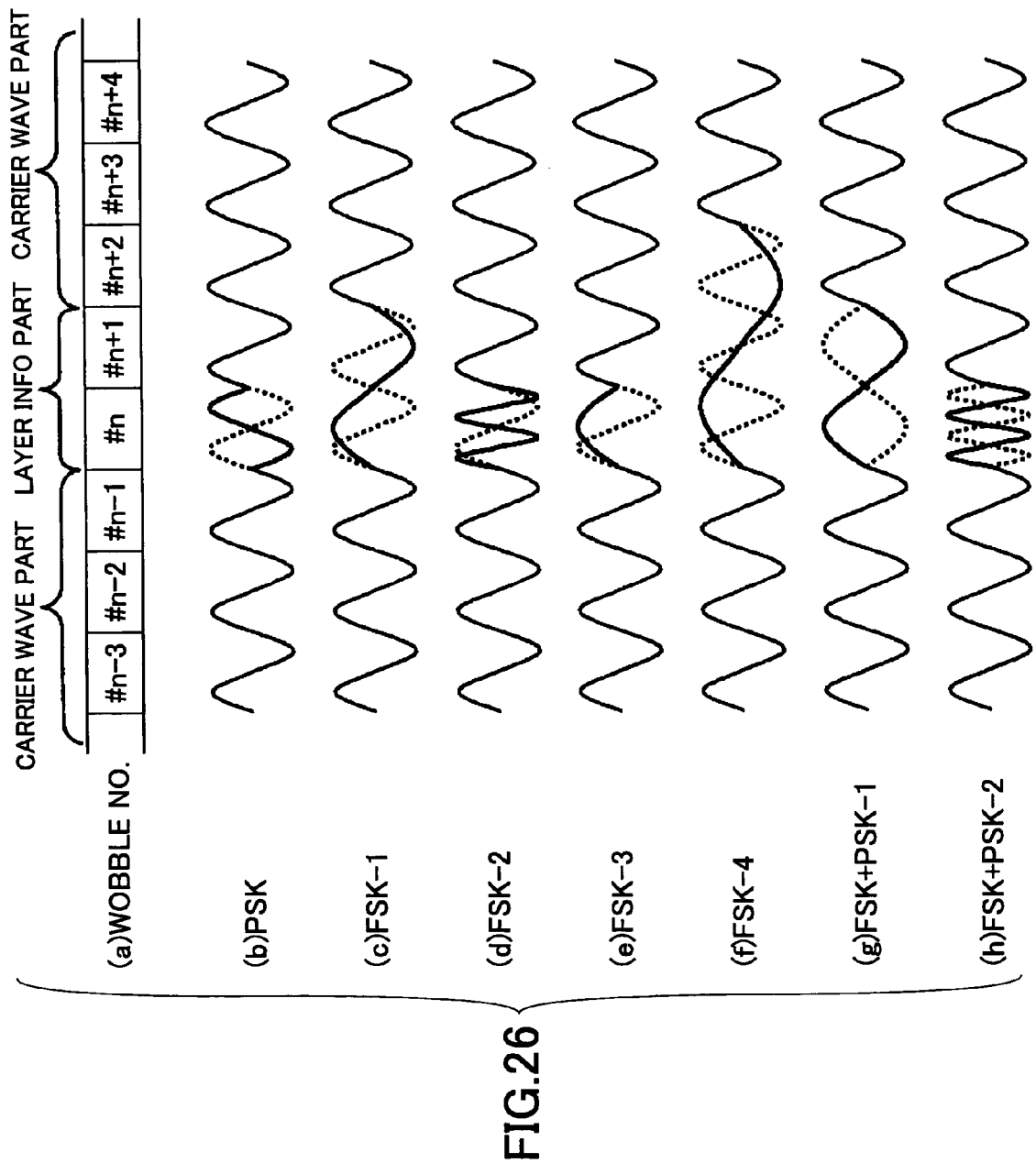
FIG. 26 is a diagram for explaining particular wobble waveforms employing PSK, FSK and FSK+PSK modulations for the wobble waveform.

101. FIG. 26 shows the particular wobble waveforms for this case. In FIG. 26(*a*), a numeral #x (x=n−3, n−2, n−1, n, n+1, n+2, n+3, n+4) indicates the number of wobbles counted from the first wobble of the modulation part for each carrier wave period by regarding this first wobble as the nth wobble. As shown in FIG. 26(*b*), the PSK stores the information in the wobble #n by changing the phase between 0 degree and 180 degrees at the carrier wave period. As shown in FIG. 26(*c*), the FSK-1 stores the information in the wobbles #n and #n+1 by whether the wobble waveform has 2 times the carrier wave period (½ the carrier wave frequency) or the carrier wave period. As shown in FIG. 26(*d*), the FSK-2 stores the information in the wobble #n by whether the wobble waveform has ½ the carrier wave period (2 times the carrier wave frequency or the carrier wave period. As shown in FIG. 26(*e*), the FSK-3 stores the information in only 1 period of the carrier wave of the FSK-1. As shown in FIG. 26(*f*), the FSK-4 stores the information in the wobbles #n, #n+1 and #n+2 by whether the wobble waveform has 3 times the carrier wave period (⅓ the carrier wave frequency) or the carrier wave period. As shown in FIG. 26(*g*), the FSK+PSK-1 stores the information in the wobbles #n and #n+1 by the wobble waveform having 2 times the carrier wave period (½ the carrier wave frequency) and changing the phase between 0 degree and 180 degrees. In addition, as shown in FIG. 26(*h*), the FSK+PSK-2 stores the information in the wobble #n by the wobble waveform having ½ the carrier wave period (2 times the carrier wave frequency) and changing the phase between 0 degree and 180 degrees. Although only typical examples are shown in FIG. 26, there are the FSK that changes the period, the PSK that changes the phase, and the FSK+PSK that combines the FSK and PSK, and the period or the carrier wave length required to indicate 1 bit of information does not need to be restricted.

Figure 27:
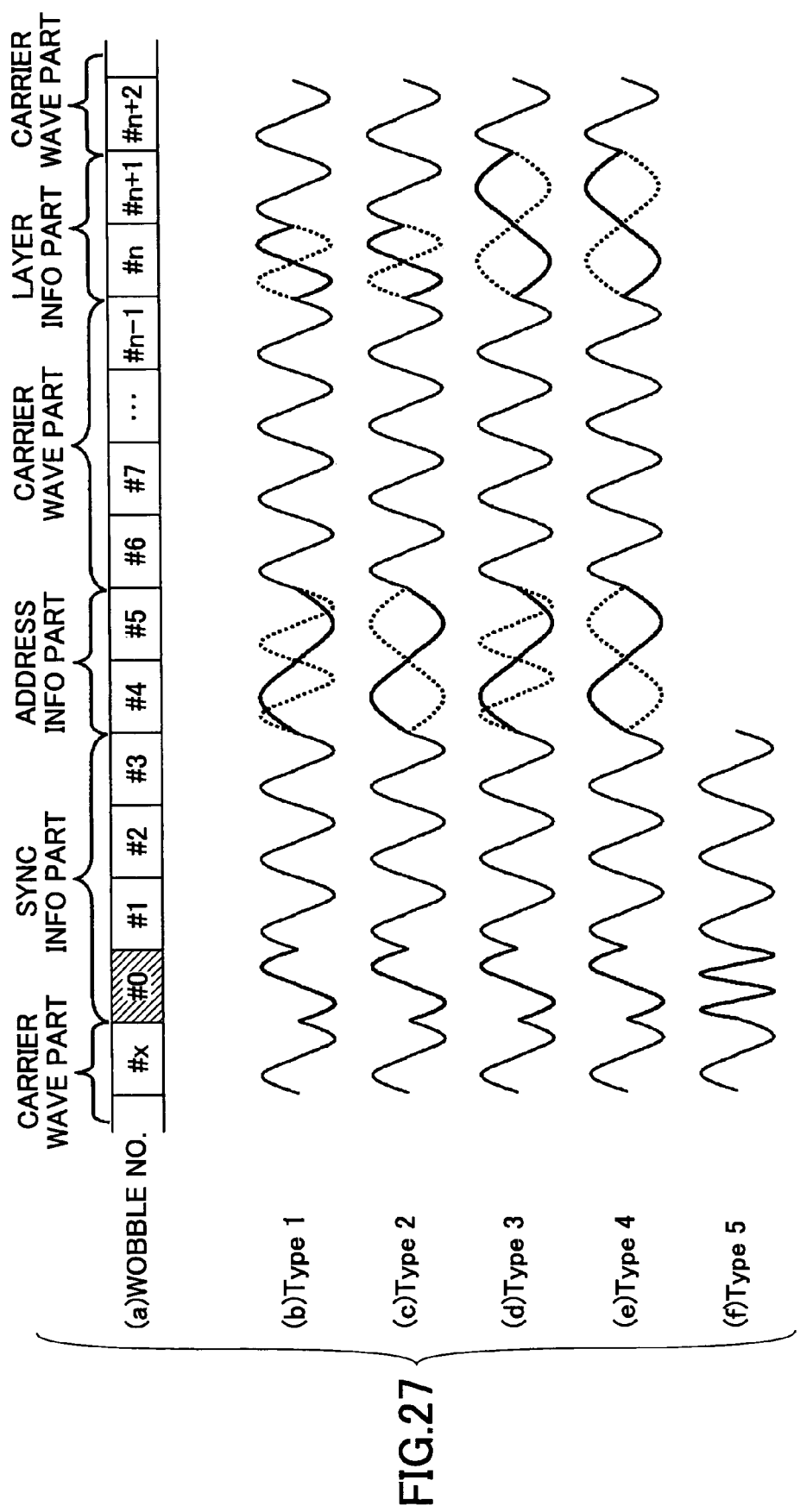
FIG. 27 is a diagram showing the wobble waveforms shown in FIG. 26 in relation to the entire format.

FIG. 27 shows the wobble waveforms shown in FIG. 26 in correspondence with the entire format. As shown in FIG. 27(*a*), the wobbles #0 through #3 form the synchronizing information part, the wobbles #4 and #5 form the address information part, the wobbles #n and #n+1 form the layer information part, and the other wobbles form the carrier wave parts. Of course, the length and arrangement of each part or region are not limited to those shown. The position of the wobble #n of the layer information part is suitably, approximately one-half the interval of the synchronizing information parts. However, the wobble #n of the layer information part may be positioned anywhere excluding the part or region where the reference clock temporarily becomes unstable for an interval of approximately several wobbles due to disturbance of the period of the wobble binarization signal at the modulation part of the address information part.

As shown in FIG. 27(*b*), the address information part of Type 1 indicates the FSK modulation at 2 times the carrier wave period, and the layer information part indicates the PSK modulation at the carrier wave period. As shown in FIG. 27(*c*), the address information part of Type 2 indicates the FSK+PSK modulation at 2 times the carrier wave period, and the layer information part indicates the PSK modulation at the carrier wave period. As shown in FIG. 27(*d*), the address information of Type 3 indicates the FSK modulation at 2 times the carrier wave period, and the layer information part indicates the FSK+PSK modulation at 2 times the carrier wave period. As shown in FIG. 27(*e*), the address information of Type 4 indicates the FSK+PSK modulation at 2 times the carrier wave period, and the layer information part indicates the FSK+PSK modulation at 2 times the carrier wave period. FIG. 27(*f*) shows the address information of Type 5 which will be described later. If the modulation techniques for the address information part and the layer information part are different, the two information parts will not be confused. But even if the modulation technique is the same for the address information part and the layer information part, the two information parts will not be confused by knowing the position from the synchronizing information part.

In FIG. 27, 2 carrier wave periods are allocated for the layer information part. The length of the layer information part may be set appropriately depending on the modulation technique, but when the undesirable effects on the clock generation and the resistance against the crosstalk are taken into consideration, it is desirable that the layer information part stores the information in a small number of carrier wave periods as possible. In addition, the length of the layer information part is desirably an integer multiple of the carrier wave period in the case of the FSK modulation. For example, a 1-bit information that takes a value "0" or "1" is required to indicate each recording layer of the disk 101 having 2 recording layers, and this 1-bit information may be stored in 1 carrier wave period. A 2-bit information is required to indicate each recording layer of the disk 101 having 4 recording layers, and this 2-bit information may be stored in 2 carrier wave periods. More particularly, it is preferable to use the type of modulation technique that completes in 1 carrier wave period, such as the PSK, FSK-2, FSK-3 and FSK+PSK-2 shown in FIG. 26. Of rouse, it is possible to represent 1 bit by 2 carrier wave periods as in the case of the FSK-1, but as the number recording layers becomes larger, it will result in longer intervals in which the clock generation is unstable.

The PSK modulation is shown for the synchronizing information part with respect to the Type 1 through Type 4 shown in FIG. 27(*b*) through FIG. 27(*e*). Since a high demodulated S/N ratio can be obtained in the case of the PSK modulation, it is easy to distinguish the synchronizing information part from the carrier wave part, and it is desirable to use the PSK modulation for the synchronizing information part for this reason. If a wobble component of the same frequency as the information in the information part leaks from the adjacent track as crosstalk, the amplitude or phase deviates to deteriorate the demodulated S/N ratio. But in the case of the synchronizing signal that is periodic, an error which rarely occurs can be corrected when detected, and there is an advantage in using the PSK modulation for the synchronizing information part. Of course, other modulation techniques, such as the FSK modulation, may be used for the synchronizing information part in place of the PSK modulation.

The synchronizing information part of the Type 5 shown in FIG. 27(*f*) indicates the FSK modulation at ½ the period in 1 carrier wave interval. In this case, the synchronizing signal can be detected similarly to the Type 1 through Type 4 shown in FIG. 27(*b*) through FIG. 27(*e*). Although the demodulated S/N ratio slightly deteriorates for the FSK modulation when compared to the PSK modulation, the wobble component of the adjacent track has a frequency different from the information of the information part, and the case of the FSK modulation is uneasily affected by the crosstalk. Therefore, it is more advantageous to use the FSK modulation than the PSK modulation if the crosstalk is large. The FSK modulation at 2 times the carrier wave period may be used. On the other hand, the synchronizing information part may be formed by the pit signal or the FCM as shown in FIGS. 22A through 22C. When using the groove pit 105 as the synchronizing signal, a timing correction becomes necessary because the detection system for the groove pit 105 and the wobble detection system are different. The groove pit 105 is detected by a sum signal processing system (for example, RF processing system), but the wobble is detected by a difference signal processing system (wobble processing system). For this reason, it is necessary to adjust a delay time difference between the sum signal processing system and the difference signal processing system, and accurately indicate the positions of the wobble in the address information part and the layer information part. Even when the synchronizing information part is formed by other than the groove pit 105, it is necessary to match the timings by adjusting the difference between the demodulating process delays of the system which detects the synchronizing information part and the system which detects the address information part or the layer information part if the 2 systems are different.

Therefore, when the layer information is recorded on the disk 101 having the plurality of stacked recording layers in the manner described above, it is possible to accurately and quickly discriminate the layer information. In order to achieve compatibility between the multi-layer disk having multiple recording layers and the single-layer disk having a single recording layer, it is necessary to similarly record the layer information also with respect to the single-layer disk.

Next, the access speed and the compatibility with disks exclusively for reproduction or read-only, will be considered. When making a seek by moving to a different radial position on the disk, a moving distance is calculated based on the present address and the target address, and a movable part such as the pickup is moved by the calculated distance. Generally, the information is recorded on the disk 101 at a constant linear velocity, and the amount of recorded information per revolution is larger towards the outer periphery, and the radial position and the address information do not have a linear correspondence with each other. Of course, the radial position can be obtained from the address information by making slightly complex calculations, but in order to make the access time short, it is desirable to make a reference to a table or the like that stores the correspondence between the address information and the radial position on the disk.

For example, in the 2-layer DVD-ROM that has already been reduced to practice, the recording layer can be discriminated by changing the address information for each recording layer. Unlike the 1-layer DVD-ROM, the optical reflection level of the 2-layer DVD-ROM is low, and for this reason, although a first discrimination is possible using the reflectivity, the signal level and the like, the dispersion factor is large, and the recording layer must finally be discriminated using the address information. However, if the table described above is prepared for each recording layer, it is necessary to double the memory capacity compared to the case where only a single recording layer is provided. In order to avoid doubling the memory capacity, the address information at the same radial position of the DVD-ROM is made to have an interlayer relationship or layer correlation. More particularly, the address information at the same radial position is made to have a complementary relationship, a table of the radial position with respect to the address information of the first recording layer is prepared, and the address information of the second recording layer is obtained by converting the address information of the first recording layer by a complementary calculation, so as to obtain the radial position of each recording layer. The complementary calculation can be made with ease since the complementary calculation merely inverts the bits. However, if 3 or more recording layers are provided, it is difficult to apply this complementary relationship to the recording layers, and it is inefficient in that the amount of information must be increased to change the address information (so as not to overlap) for each of the recording layers. Therefore, in the ROM disk having 3 or more recording layers, it is desirable to store the layer information within the recorded information, without changing the arrangement of the address information for each recording layer. Of course, in the read-only DVD-ROM, the wobbles of the track do not exist, and the address information and the layer information may be stored similarly to the other recorded information. The address information is completed in units of sectors (relatively small segments of data), and the format used should enable reading of the address information in a relatively short time.

The recording layer that is being accessed can be detected from the layer information stored by the wobbles in the recordable disk 101. However, since the read-only disk 101 has no wobbles, the layer information must be detected from the recorded information. The format of the information to be recorded on the recordable disk 101 does not necessarily have to be the same as the format of the information recorded on the read-only disk 101. However, by using the same storage method for the layer information of the recorded information for the read-only disk 101 and the recordable disk 101, it becomes possible to quickly discriminate the recording layer even when reproducing the information from the disk 101 recorded with the layer information on an apparatus which is exclusively for information reproduction and is not provided with a function of detecting the wobbles of the layer information.

Figure 28:
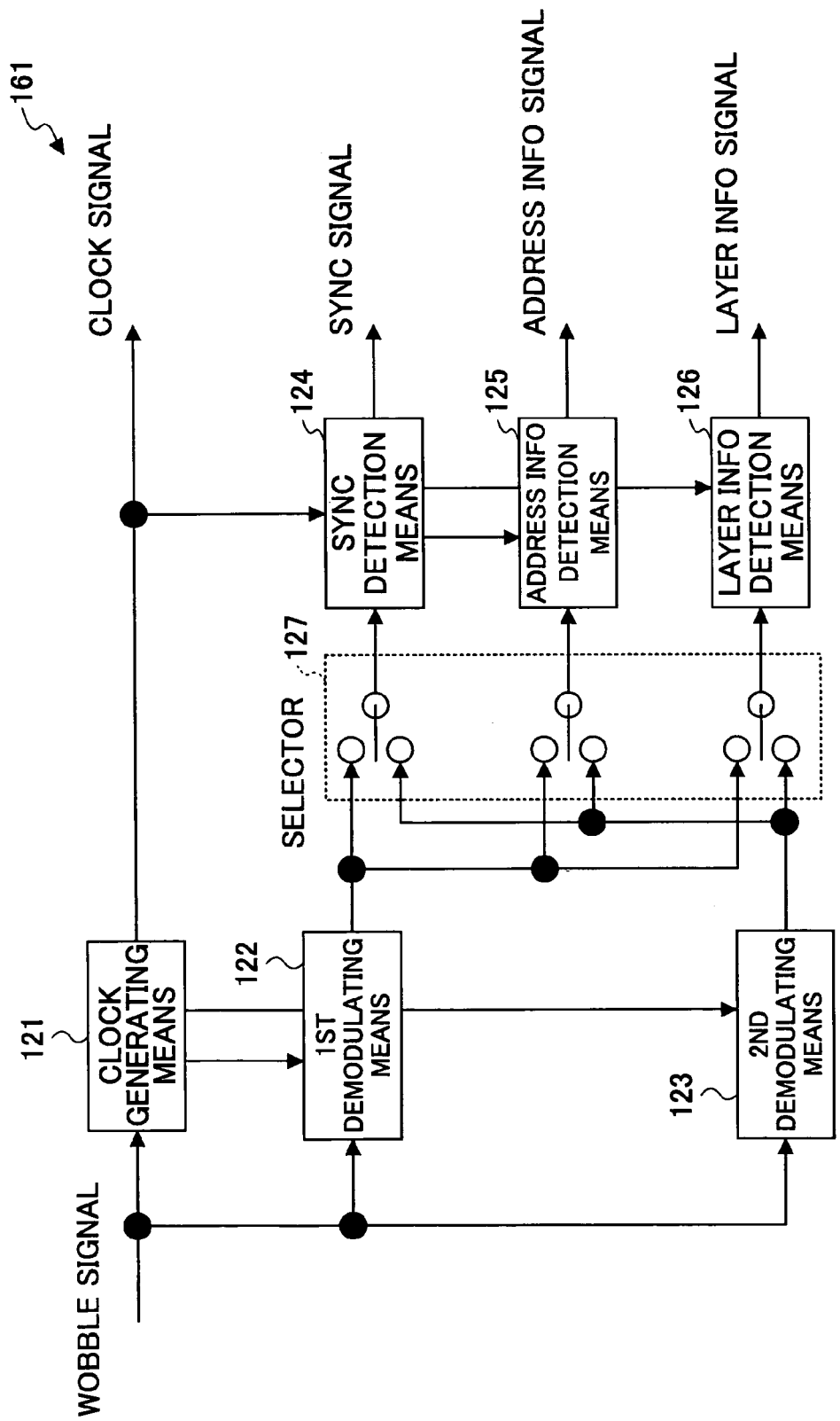
FIG. 28 is a diagram showing an example of a structure of a signal detecting unit.

FIG. 28 is a block diagram showing a structure of an information detecting apparatus 1161 that detects the address information and the layer information from the disk 101 employing the format described above. In this case, the synchronizing signal is also detected from the wobble modulation. First, the carrier wave component included in the wobble signal is extracted by a clock generating means 121 to generate a clock, and a reference clock signal having a frequency necessary for the demodulation is also generated. A particular example of the clock generating means 121 will be described later. Based on the reference clock signal, the modulated component included in the wobbles is demodulated and extracted in first and second demodulating means 122 and 123. For example, the first demodulating means 122 demodulates the PSK modulation part using a reference clock signal f1 having the same frequency as the carrier wave frequency, and the second demodulating means 123 demodulates the FSK modulation part having 2 times the carrier wave period or, the FSK+PSK modulation part, using a reference clock signal f2 having ½ the carrier wave frequency. A synchronization detection means 124 selects the input signal matching the modulation technique of the synchronizing information part via a selector 127. For example, if the synchronizing information part uses the PSK modulation, the output signal of the first demodulating means 122 is selected as the input signal. An interval of the selected input signal is counted based on the clock signal, and the periodic synchronizing information part is detected, so as to make the synchronization lock. After the synchronization lock, an error may be detected although it is rare (a case where no signal is found at the synchronization position where the signal should be found). When such an error is detected, a pseudo synchronizing signal is generated to correct the error, for example, and the count is continued in a normal manner. The clock signal is counted based on the generation timing of the synchronizing information part that is used as a reference, a timing signal is output to an address information detection means 125 at the timing with which the address information part is arranged on the disk 101 according to the format, and a timing signal is output to a layer information detection means 126 at the timing with which the layer information is arranged. The address information detection means 125 and the layer information detection means 126 select the input signal matching the modulation technique of the address information detection means 125 and the layer information detection means 126 via the selector 127. Hence, the address information signal and the layer information signal are detected based on the timing signals described above.

Figure 29:
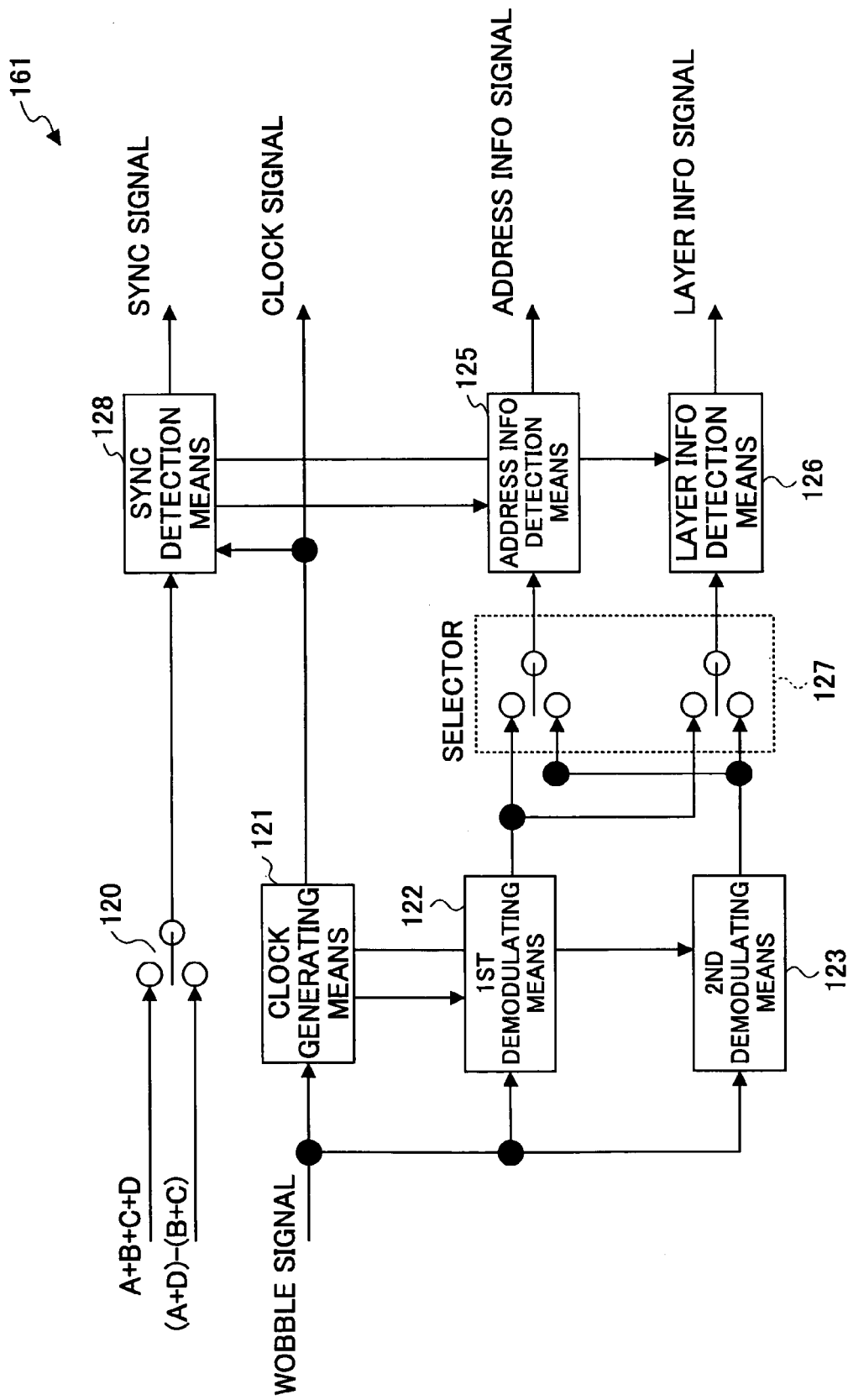
FIG. 29 is a diagram for explaining another example of the structure of the signal detecting unit.

FIG. 29 is a block diagram showing a structure of an information detecting apparatus 161 for detecting the layer information and the address information for a case where the pits or FCMs are used for the synchronizing information part. In FIG. 29, those parts which have the same functions as those corresponding parts in FIG. 28 are designated by the same reference numerals, and a detailed description thereof will be omitted. In the case where the groove pit 105 (FIG. 22A) is used, the information detection is made from the sum signal processing system, "A+B+C+D" is selected as the input signal by a selector 120. In the case where the land pit 106 (FIG. 22B) or the FCM (FIG. 22C) is used, the information detection is made from the difference signal processing system, and "(A+D)–(B+C)" is selected as the input signal by the selector 120. These input signals may be subjected to a signal processing, such as filtering, in advance. A synchronization detection means 128 samples the input signal based on the clock signal to find the synchronizing signal, and makes a synchronization lock after confirming the synchronization. If the signal delays are different between the wobble detection system and the synchronization detection system, a delay correction may be made within the synchronization detection means 128. The timing signal generation with respect to the address information detection means 125 and the layer information detection means 126, the first and second demodulating means 122 and 123, the address information detection means 125 and the layer information detection means 126 are the same as those in FIG. 28, and a description thereof will be omitted.

Figure 30:
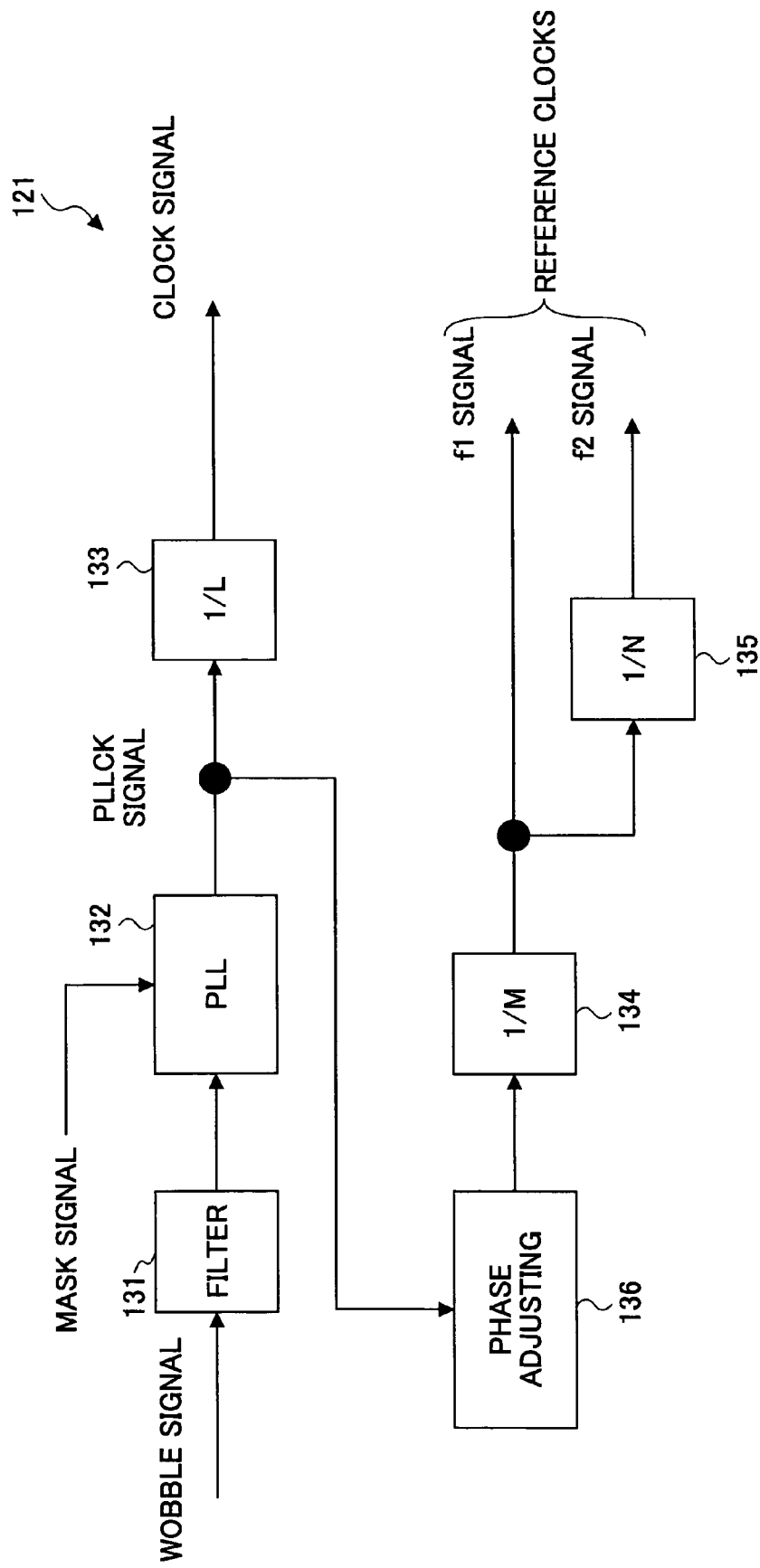
FIG. 30 is a block diagram showing an example of a particular circuit structure of a clock generating means.

FIG. 30 is a block diagram showing a detailed structure of the clock generating means 121. In FIG. 30, since the wobble signal includes the noise component and the modulation part, only the carrier wave component is extracted using a filter 131 such as a bandpass filter. Based on the signal of this carrier wave component, a PLL circuit 132 generates a PLLCK signal which follows a deviation in the rotation or the like, which is eliminated of the noise (jitter) in the time base direction, while maintaining a stable frequency characteristic. The input signal to the PLL circuit 132 may be binarized. Because the PLLCK signal does not necessarily have a duty of 50%, it is desirable to generate the clock signal having the duty of 50% and the frequency required by the system, by setting a frequency higher than the wobble frequency and frequency-dividing this frequency into 1/L the frequency by a frequency dividing means 133 in a subsequent stage. In addition, in order to generate the reference clock signal, the PLLCK signal is frequency-divided by 1/M in a frequency dividing means 134 to become the f1 signal frequency, and the f1 signal is frequency divided by 1/N in a frequency dividing means 135 to become the f2 signal frequency. The method of frequency-dividing the signals are of course not limited to the above, and all that is required is that the PLLCK signal is frequency-divided into the target frequencies of each of the outputs. For example, if the clock signal and the f1 signal have the same frequency, 1/L and 1/M may be the same. On the other hand, if the f2 signal has a frequency higher than that of the f1 signal, the f1 signal and the f2 signal may be interchanged. A phase adjusting means 136 adjusts the phase of the PLLCK signal for the purpose of matching the phase to the phase of the wobble signal used in the first modulating means 122 or the second modulating means 123, and the reference clock signal or a sinusoidal wave signal or the like that is generated based on the reference clock signal. The phase of the signal changes as it passes through various filters, the PLL circuit 132 and the like, but it is necessary that the wobble signal and the reference clock signal or the sinusoidal wave signal or the like generated based on the reference clock signal have the same phase in the first modulating means 122 or the second modulating means 123, in order to obtain a high demodulation performance. Hence, the phase of the reference clock signal is adjusted by adjusting the phase of the PLLCK signal in the phase adjusting means 136. Of course, the phase adjusting means 136 may be provided independently with respect to the f1 signal and the f2 signal, but in this example, the phase adjusting means 136 is provided at a position where the PLLCK signal is processed, for efficiency. In addition, the functions of the phase adjusting means 136 may be provided within the PLL circuit 132. Further, the phase adjusting means 136 may include the frequency dividing means 133 through 135 and the sinusoidal wave generating circuit that generates the sinusoidal wave signal.

Figure 31:
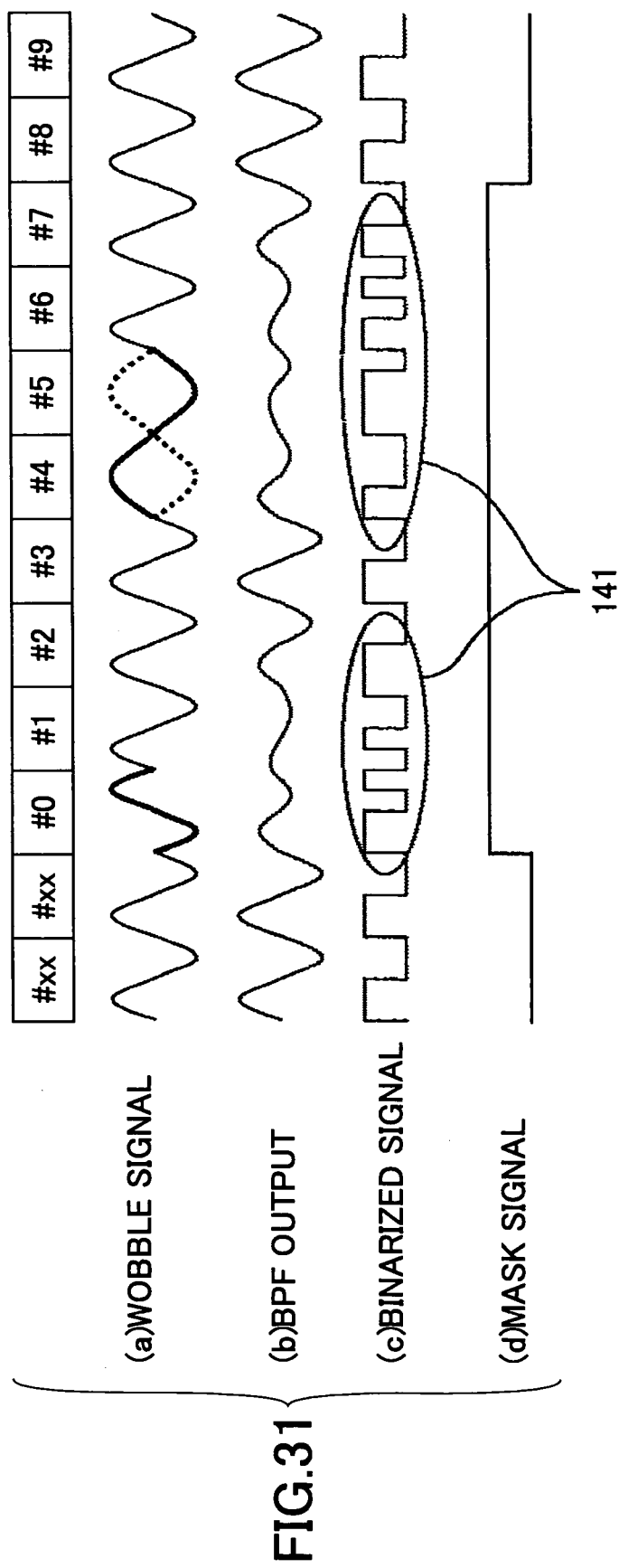
FIG. 31 is a diagram for explaining a signal distortion of a filtered output of the wobble signal at a modulating part.

On the other hand, when the wobble signal is passed through a filter, a signal distortion occurs at the modulation part of the filter output, as shown in FIG. 31. It is assumed for the sake of convenience that the filter is a bandpass filter and the bandpass filter output is distorted at the modulation part as shown in FIG. 31(*c*). When a signal obtained by binarizing the bandpass filter output shown in FIG. 31(*b*) is used as the input to the PLL circuit 132, the binarized signal shown in FIG. 31(*c*) is extremely distorted in a vicinity of the modulation part of the wobble signal shown in FIG. 31(*a*), that is, within a portion surrounded and indicated by a reference numeral 141. The operation of the PLL circuit 132 is likely to become unstable if this distortion continues. Hence, a mask signal shown in FIG. 31(*d*) that indicates the modulation part or the interval in which the filter output is distorted is used to stop the phase comparing operation of the PLL circuit 132, so as to stabilize the operation of the PLL circuit 132. This mask signal may easily be generated in the synchronization detection means 128.

Figure 32A:
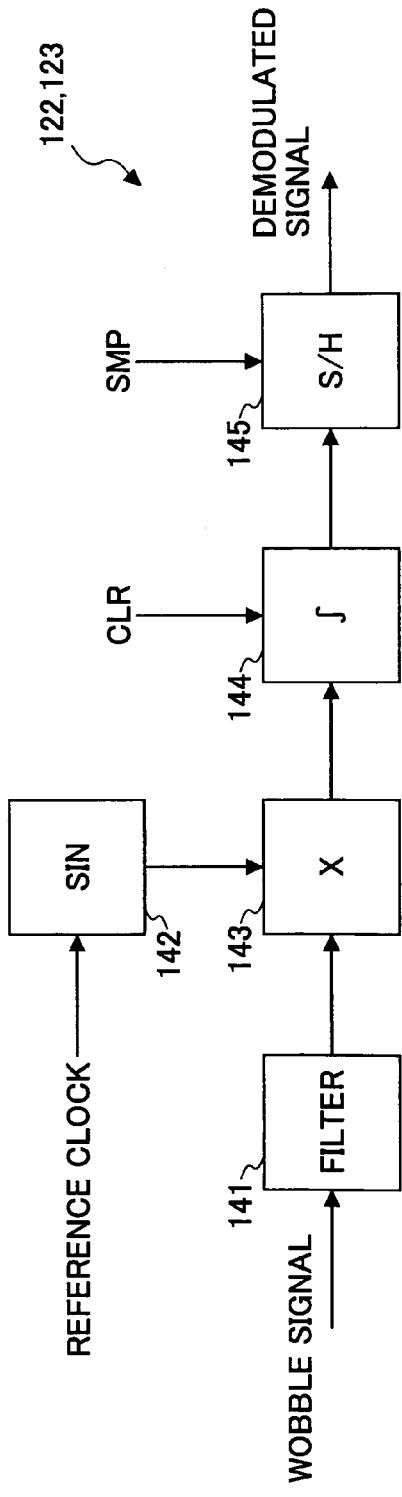
FIGS. 32A and 32B respectively are block diagrams showing an example of a particular circuit structure of first and second modulating means.
Figure 32B:
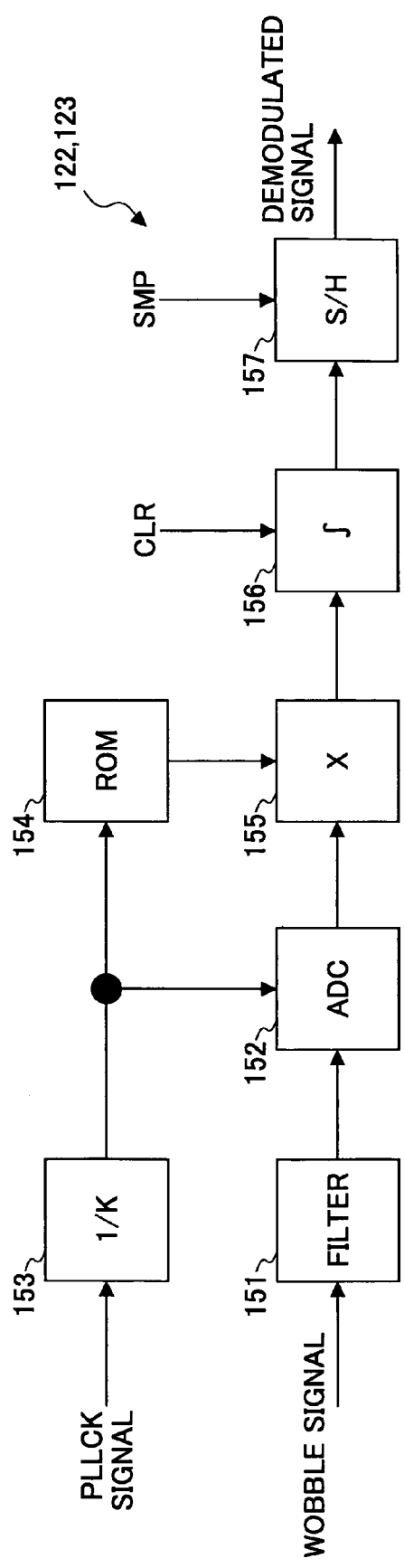

Next, a description will be given of the operation of the first and second demodulating means 122 and 123, by referring to FIGS. 32A, 32B, 33 and 34. FIGS. 32A and 32B are block diagrams showing structures of the first and second demodulating means 122 and 123. FIG. 32A shows the structure for an analog system, and FIG. 32B shows the structure for a digital system.

First, a description will be given of the analog system shown in FIG. 32A. The noise and the like superimposed on the wobble signal are eliminated by a filter 141 such as a bandpass filter. On the other hand, a signal generator (SIN) 142 generates a sinusoidal wave signal (SIN signal) having the same frequency as the reference clock signal, based on the reference clock signal. The wobble signal and the SIN signal are subjected to an operation process in a multiplier (X) 143. The SIN signal is used to improve the demodulation performance, but if a slight deterioration in the demodulation performance is tolerated, the reference clock signal may be used as it is or, a square wave signal having a duty changed from that of the reference clock signal or, an intermediate staircase signal between the reference clock signal (digital signal) and the SIN signal (analog signal) may be used. An output of the multiplier 143 is integrated for a specific interval (indicated by a signal CLR) in an integrator (∫) 144, and the signal level is held at a specific timing (indicated by a signal SMP) in a sample and hold (S/H) circuit 145. The signal CLR is generally output in a vicinity of a zero phase of the carrier wave for every carrier wave period, to initialize the integrator 144. The signal SMP is also output for every carrier wave period, but is output immediately before the signal CLR, so as to hold the output of the integrator 144 immediately before the initialization responsive to the signal CLR. In the case where the modulation part of the wobble signal is formed by a plurality of carrier wave periods, the signals CLR and SMP may be output at the discontinuity of the modulation part instead of being output for every carrier wave output. The signals CLR and SMP may be generated in the synchronization detection means 128, for example.

In the case of the digital system shown in FIG. 32B, the noise component superimposed on the wobble signal is eliminated in a filter 151, similarly as in the case of the analog system, and quantized in an analog-to-digital (A/D) converter 152. The A/D converter 152 may be on the order of approximately 8 bits. A sample clock of the A/D converter 152 is obtained by frequency-dividing the PLLCK signal by 1/k in a frequency divider 153, and from the point of view of the demodulation performance, the frequency of the sample clock is suitably 4 times that of the wobble signal. The data stored in a ROM 154 that is provided in a subsequent stage is output for every sample clock. Data representing the SIN signal by a staircase or, a square wave of the carrier wave period or modulation period, that is successively output, is obtained as the output data of the ROM 154. The data of the wobble signal obtained in the A/D converter 152 and the data output from the ROM 154 are multiplied in a multiplier 155, and then, an integration process is carried out in an integrator 156 and a sample and hold process is carried out in a sample and hold (S/H) circuit 157, similarly as in the case of the analog system. The above described circuits may form the first demodulating means 122 or the second demodulating means 123, by inputting the frequency of the reference clock signal and the frequency dividing ratio 1/k of the PLLCK signal to suit the carrier wave period or modulation period. In addition, by changing the output data of the ROM 154 depending on the reference SIN signal waveform at each modulation part, it is possible to realize the functions of the first modulating means 122 and the second modulating means 123 by a single modulating means. For example, the output data of the ROM 154 for the PSK modulation part may have the carrier wave waveform, and the output data of the ROM 154 for the FSK+PSK modulation part having 2 times the carrier wave period may have a waveform with 2 times the carrier wave period.

Figure 33:
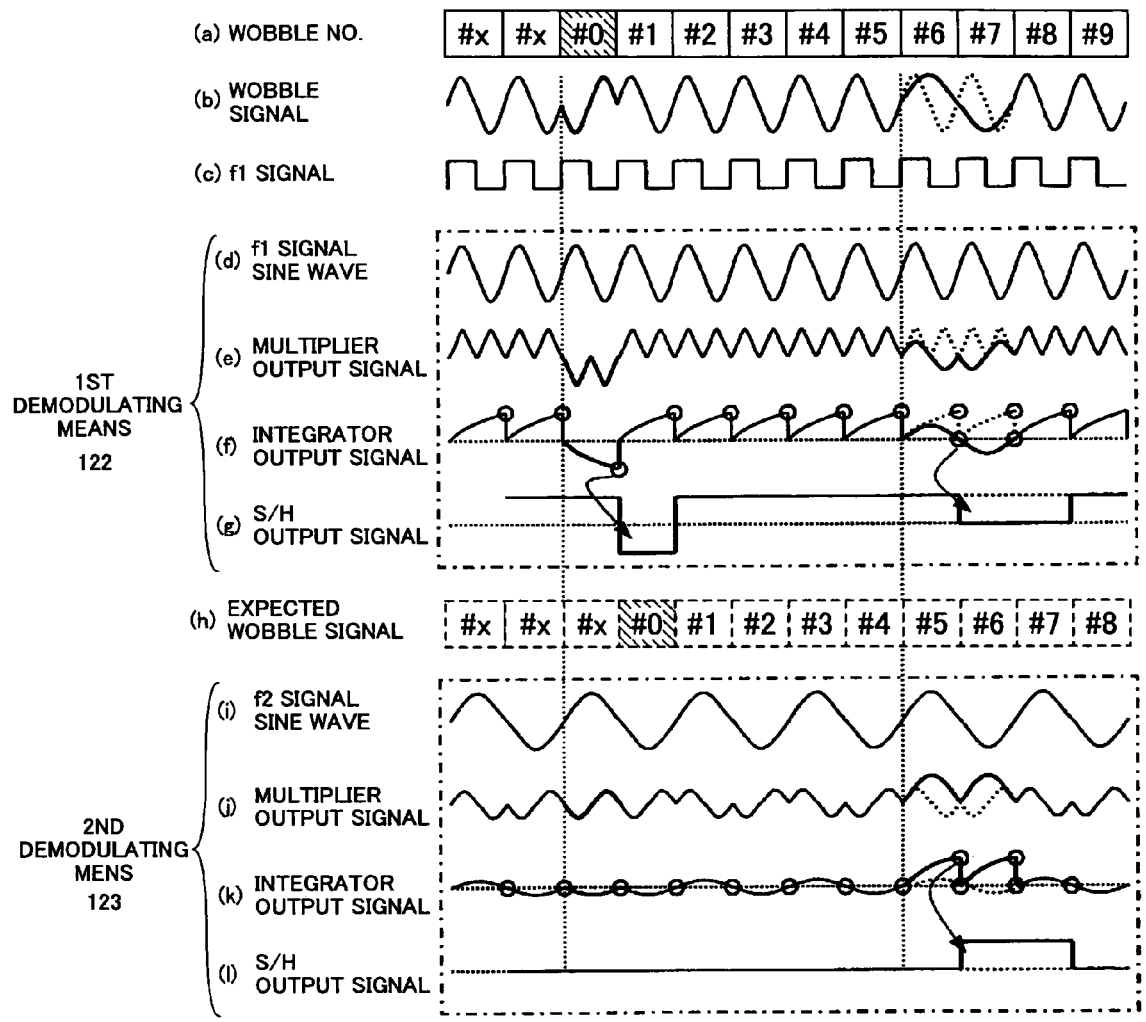
FIG. 33 is a timing chart showing various signals for a case where the wobble signal employing the FSK modulation is demodulated with respect to a second embodiment of a disk.

FIG. 33 is a timing chart for explaining the operation of the first demodulating means 122 and the second demodulating means 123. FIG. 33 shows the signals related to the first demodulating means 122 and the signal related to the second demodulating means 123 (description will be given for the analog system shown in FIG. 32A). FIG. 33(a) shows the waveform for a case where the wobble signal from the disk 101 in which the PSK modulation is used for the synchronizing information part (wobble #0) and the FSK modulation is used for the address information part (wobbles #6 and #7 and different from the case shown in FIG. 27) is demodulated by the analog system. FIG. 33(b) shows the wobble signal waveform, and FIG. 33(c) shows the f1 signal waveform.

First, a description will be given of the waveforms related to the first demodulating means 122 by referring to FIGS. 33(d) through 33(g) shown in the middle portion of FIG. 33. The reference clock signal, that is, the f1 signal shown in FIG. 33(c), is generated from the carrier wave component of the wobble signal shown in FIG. 33(b). The signal generator 142 generates the SIN signal shown in FIG. 33(d) based on the f1 signal. Thereafter, the multiplier 143 multiplies the wobble signal and the SIN signal as shown in FIG. 33(e). Of course, the wobble signal may be passed through a filter such as a highpass filter (HPF) beforehand. As shown in FIG. 33(f), the multiplied result from the multiplier 143 is integrated in the integrator 144 for every modulation period, that is, for every carrier wave period in this particular case. As shown in FIG. 33(g), the integrated result from the integrator 144 is sampled by the sample and hold (S/H) circuit 145 and held until the next sample. In this case, the sampled and held output indicates a large portion of the carrier wave part when on the positive (+) side, and indicates a position where the phase is 180 degrees different due to the PSK modulation when on the negative (−) side. Since the demodulation is carried out at the carrier wave period, the demodulated result is output with a delay of 1 carrier wave period. Accordingly, at the position where the wobble #0 is expected, the PSK modulation part is reproduced on the negative (−) side of the sampled and held output. The CLR signal to the integrator 144 and the SMP signal to the S/H circuit 145 operate approximately on the sampled and held output at timings indicate by "O" in FIG. 33(f). The wobble signal (wobble #0) includes the phase inversion part of the synchronizing information part, which can be identified by the demodulation technique, and thus, it is possible to output a signal indicating the position of the address information based on the obtained synchronizing signal, and a signal indicating the position of the layer information. In addition, the wobble signal (wobbles #6 and #7) includes the FSK modulation part. The FSK modulation makes the wobbles of the carrier wave period correspond to the data "0", and the wobbles of 2 times the carrier wave period correspond to the data "1". Hence, for the data "0" indicated by a dotted line, the same signal level (positive (+) side) as the carrier wave is detected for the sampled and held output which is the demodulated result. On the other hand, for the data "1" indicated by a bold solid line, the detection is possible because the sampled and held output changes to the zero level.

The demodulation may be made solely by the first demodulating means 122 if the format includes the PSK modulation and the FSK modulation. However, by providing the second demodulating means 123 in addition to the first demodulating means 122, it is possible to improve the reliability by judging that the demodulation result is correct if the demodulated results of the two demodulating means 122 and 123 are the same and by reading again if the demodulated results differ.

Next, a description will be given of the waveforms related to the second demodulating means 123 shown in FIGS. 33(i) through 33(l) by referring to the lower portion of FIG. 33. In order to demodulate the FSK modulation part having 2 times the carrier wave period, the second demodulating means 123 uses the f2 signal having 2 times the carrier wave period. Hence, as shown in FIG. 33(i), the SIN signal that is multiplied to the wobble signal also has 2 times the carrier wave period. The operation of the multiplier 143, the integrator 144 and the S/H circuit 145 is approximately the same as that of the first demodulating means 122 described above. The demodulated result in the carrier wave part is zero. FIGS. 33(j), 33(k) and 33(l) respectively show the output signal of the multiplier 143, the output signal of the integrator 144 and the output signal of the S/H circuit 145. When the waveform at a portion of the wobbles #5 and #6 shown in FIG. 33(l) is observed, the data "0", that is, the sampled and held output indicated by the dotted line has the zero level which is the same as the demodulated result of the carrier wave part. Since the sampled and held output for the data "1" indicated by the bold solid line is on the positive (+) side, and changes from zero, it is possible to detect the modulation part. The demodulated result of the PSK modulation part of the synchronizing information part in the second demodulating means 123 becomes the zero level which is the same as the demodulated result of the carrier wave part. For this reason, only the FSK part becomes the signal that changes, and it is relatively easy to find the data of the FSK part.

Figure 34:
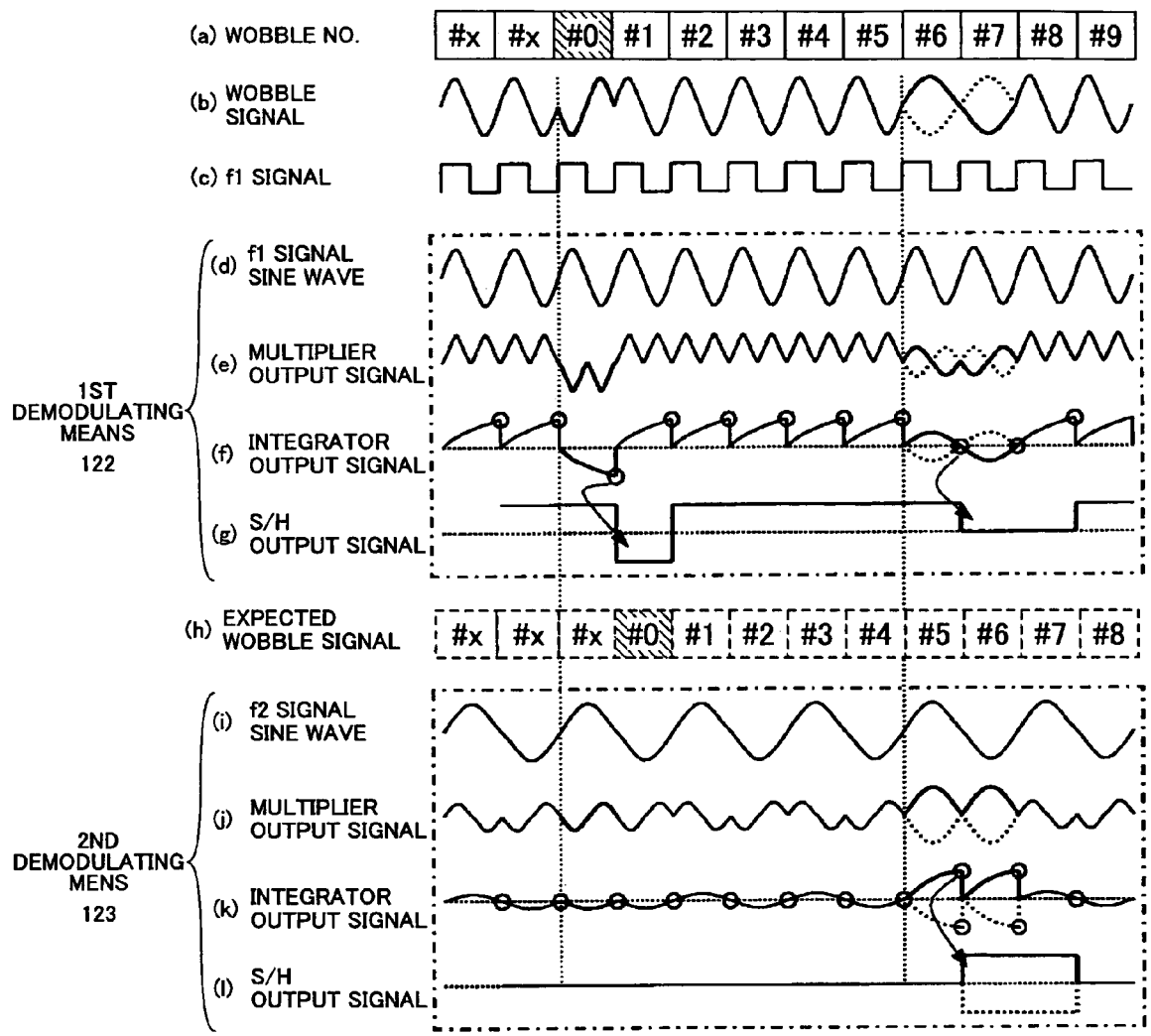
FIG. 34 is a timing chart showing various signals for a case where the wobble signal employing the FSK+PSK modulation is demodulated for the second embodiment of the disk.

FIG. 34 is a timing chart for explaining the operation of the first demodulating means 122 and the second demodulating means 123. FIG. 34 shows a case where the FSK+PSK modulation is used in the address information part. A description of those parts of FIG. 34 that are the same as those corresponding parts in FIG. 33 will be omitted. In FIG. 34, parts other than the address information part are the same as those shown in FIG. 33. The FSK+PSK modulation of the address information part makes the wobbles (indicated by the bold solid line) of 2 times the carrier wave period correspond to the data "0", and the wobbles (indicated by the dotted line) of 2 times the carrier wave period with the phase that is changed by 180 degrees (that is, inverted) correspond to the data "1". Hence, the demodulated result of the wobbles #6 and #7 from the first demodulating means 122 becomes zero regardless of whether the data is "0" or "1". On the other hand, the demodulated result from the second demodulating means 123 clearly changes to the positive (+) side with respect to the data "0", and to the negative (−) side with respect to the data "1". Hence, in the case of the FSK+PSK modulation, it is possible to obtain a demodulated result of a high quality from the second demodulating means 123. Of course, the relationship between the modulated waveform and the data "0" and "1" is not limited to that described above.

A description will now be given of the reason why the FSK modulation and the FSK+PSK modulation are less affected by the crosstalk. A large portion of the wobble component of the adjacent track on the disk 101 is the carrier wave frequency. Since the phase of the f1 signal frequency component, that is, the phase of the carrier wave component is detected in the first demodulating means 122, the crosstalk component is simultaneously superimposed on the demodulated result. According to the PSK modulation, the demodulation quality is high (S/N ratio is high) if the crosstalk is small since it is possible to separate the positive (+) and negative (−) components, but the demodulated result deteriorates due to the effects of the crosstalk if the crosstalk is large. On the other hand, the phase of the f2 signal frequency component is detected in the second demodulating means 123. The demodulated result of the carrier wave part is zero, but the demodulated result of the crosstalk component is similarly zero because a large portion of the crosstalk component is the carrier wave frequency. In other words, it means that the demodulated result of the FSK modulation part includes virtually no effects of the specific frequency where the crosstalk exists. Of course, if the crosstalk component includes a large amount of the f2 signal frequency component, the effect of the crosstalk cannot be neglected, and thus, it is desirable that the proportion of the FSK modulation part is as small as possible. Hence, the wobble information is not limited to the FSK modulation, and it is desirable to combine other modulation techniques thereto.

As described above, the modulation part of the synchronizing information part and the address information part may be demodulated by the circuits shown in FIGS. 32A and 32B. but it is also possible to similarly demodulate the information stored in the layer information part by the PSK modulation, the FSK modulation or the FSK+PSK modulation.

Although the circuits shown in FIGS. 32A and 32B employ the synchronization detection method, it is of course possible to realize the circuits by employing a known delay detection method used in the field of communication and the like.

Next, a description will be given of an optical disk forming apparatus 201, which is an embodiment of the information recording medium forming apparatus, and is suited for forming the disk 101 which is the multi-layer information recording medium having the plurality of recording layers each recordable with the data.

Figure 35:
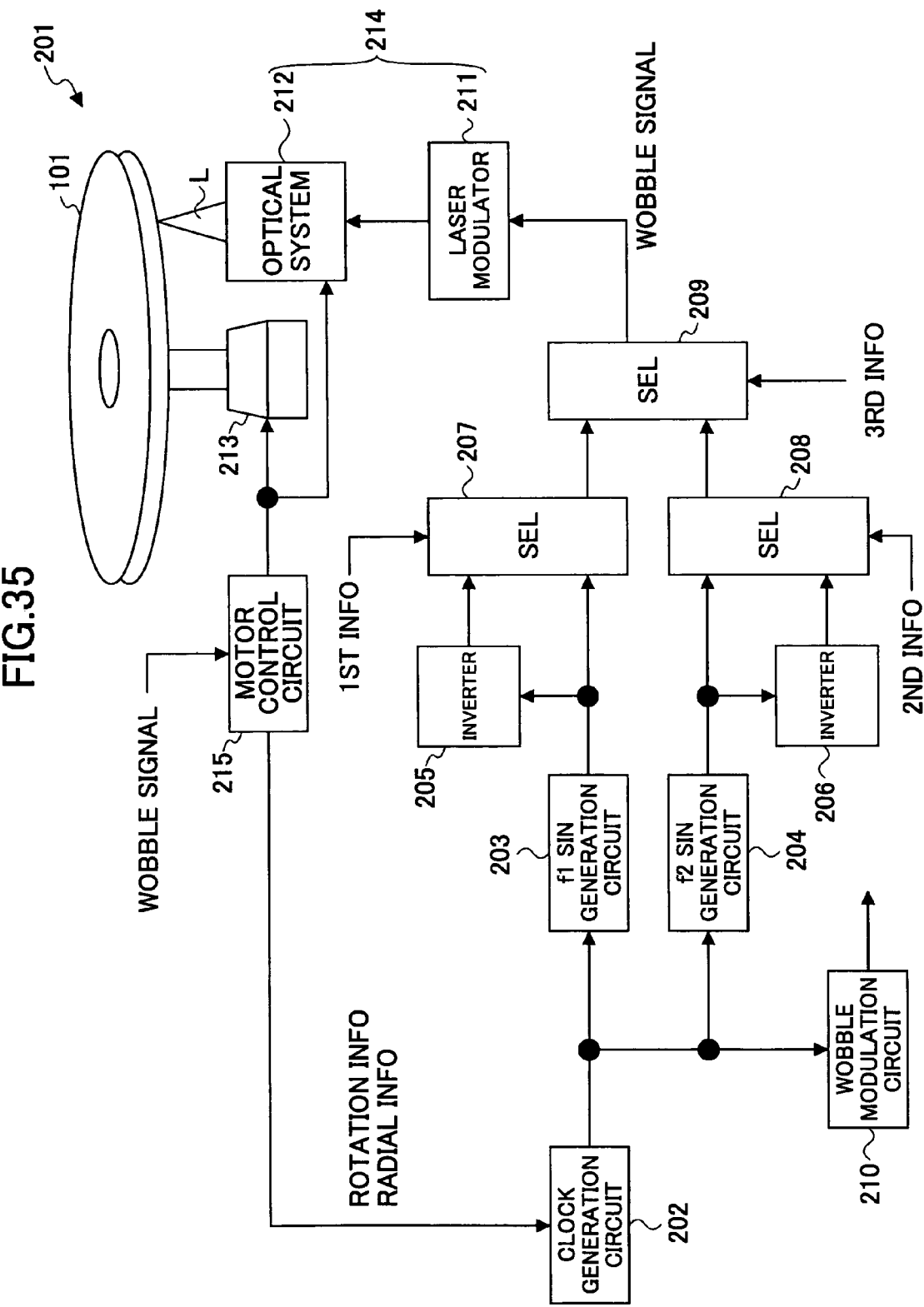
FIG. 35 is a block diagram showing electrical connections of a second embodiment of an optical disk forming apparatus.

FIG. 35 is a block diagram showing electrical connections of the optical disk forming apparatus 201 that forms the track 104 on the disk 101. First, a clock generating circuit 202 shown in FIG. 35 receives rotation information of the disk 101 and radial information indicating a radial position that is being accessed, from a motor control circuit 215 or a system controller (not shown) that controls the entire system, and generates appropriate reference clock signals for use in generating the wobble frequency. For example, when using the wobble format of Type 2 shown in FIG. 27(c), the clock generating circuit 202 generates 2 kinds of reference signals, namely, the f1 signal having the carrier wave frequency and the f2 signal having ½ the carrier wave frequency.

Based on the reference clock signals, sinusoidal wave (SIN) generating circuits 203 and 204 respectively generate sinusoidal wave signals (f1 signal sinusoidal wave and f2 signal sinusoidal wave). In addition, when generating the wobbles subjected to the PSK modulation or the FSK+PSK modulation having the phase of 0 degree and 180 degrees, inverted signals of the above sinusoidal wave signals are also generated in inverter circuits 205 and 206, respectively. When using other phases as in the case of the PSK modulation that uses 4 phases such as 0 degree, 90 degrees, 180 degrees and 270 degrees (particularly referred to as the QPSK modulation), for example, the inverter circuits 205 and 206 may be replaced by circuits (phase switching circuits) that not only invert the signals but also switch the phase to the required phase. The signals generated by the sinusoidal wave generating circuits 203 and 204 and the inverter circuits 205 and 206 (or phase switching circuits) are selectively output from selection circuits 207 through 209 provided at a subsequent stage, so that the appropriate signal is selectively output at the position where the carrier wave is to be modulated, such as at the synchronizing information part, the address information part and the layer information part. Predetermined first information signal, second information signal and third information signal are respectively used as selection signals that drive the selection circuits 207 through 209. In other words, the f1 signal sinusoidal wave or the inverted signal thereof (or with the switched phase) is selectively output in response to the first information signal, the f2 signal sinusoidal wave or the inverted signal thereof (or with the switched phase) is selectively output in response to the second information signal, and one of the output signals of the selection circuits 207 and 208 is selectively output in response to the third information signal.

For example, in the case of the wobble format of Type 2 shown in FIG. 27(c), the synchronizing information part and the layer information part use the PSK modulation of the carrier wave frequency, and the address information part uses the FSK+PSK modulation of ½ the carrier wave frequency. In this case, the first information signal is a signal that selects the inverted signal (or with the switched phase) of the f1 signal sinusoidal wave at the synchronizing information part and the layer information part (different depending on the data). The second information signal is a signal that selects the inverted signal (or with the switch phase) of the f2 signal sinusoidal wave at the address information part depending on the data. The third information signal is a signal that selects the f2 processing system (f2 signal sinusoidal wave or the inverted signal thereof (or with the switched phase)) at the address information part.

The first through third information signals are generated in a wobble modulation circuit 210. As will be described later, the information of the synchronizing information part, the address information part and the layer information part are prepared in advance in the wobble modulation circuit 210, and the first through third information signals are successively output depending on the information for every clock. The wobble signal that is finally selected by the third information signal is output to a laser modulator 211 and a motor control circuit 215.

A recording apparatus 214 includes the laser modulator 211, an optical system 212 and the motor control circuit 215. The wobble signal that is selected by the third information signal is supplied to the laser modulator 211 and the motor control circuit 215, and the optical system 212 which has a known structure made up of a combination of predetermined optical devices emits laser light L based on the wobble signal and converges the laser light L on the disk 101 so as to form the track 104 on the disk 101. The motor control circuit 215 adjusts positions of a spindle motor that is used as a driving source of a rotational driving system 213 for rotating the disk 101, and a motor that is used as a driving source for adjusting the light spot converged on the disk 101 by the optical system 212. The position of the light spot is changed by the optical system 212, so as to appropriately change the recording layer of the disk 101 on which the track 104 is to be formed. The optical system 212 can generate the wobbles of the track 104 that is formed on the disk 101. However, the wobbles may be formed by moving the centre of rotation of the disk 101 by the rotational driving system 213 or, by moving the optical system 212. In other words, any suitable method may be used to make the converging point of the laser light L (laser converging point) deviate from the center of the track 104 depending on a fluctuation width of the wobbles.

Generally, the light spot used in the optical disk forming apparatus that forms the optical disk is smaller than the light spot used in the information recording and reproducing apparatus that records information on and reproduces information from the optical disk. For this reason, the optical disk forming apparatus uses laser light having a shorter wavelength and a lens having a higher Numerical Aperture (NA) than the information recording and reproducing apparatus. The motor control circuit 215 controls the rotational speed of the disk 101 and moves the optical system. The motor control circuit 215 also outputs a signal (rotation information) indicating the rotational speed of the disk 101 and a signal (radial position information) indicating the radial position on the disk 101, and supplies these signals to the clock generating circuit 202 as reference signals.

The clock is generated based on the radial position information and the rotation information (rotational speed information of the spindle motor) of the rotational driving system 213 in the above described case, but the clock frequency may be changed depending on the radial position by maintaining the rotation of the spindle motor constant or, changing the rotational speed of the spindle motor depending on the radial position by maintaining the clock frequency constant. In addition, the clock generation does not necessarily have to be realized solely by analog circuits, and the functions of the sinusoidal wave generating circuits 203 and 204, the inverter circuits 205 and 206, the selection circuits 207 through 209 and the like may be realized by digital processes and the digital output to the laser modulator 211 may be converted into an analog signal by a digital-to-analog (D/A) converter or the like. Furthermore, the clock generation does not necessarily have to depend upon the wavelength of the laser and the parameters of the optical system used in the optical disk forming apparatus 201.

The optical disk forming apparatus 201 irradiates the light spot on the disk 101 and forms the track 104 having the wobbles on the disk 101 in the manner described above. If the disk 101 is a multi-layer information recording medium having a plurality of recording layers each recordable with information, the position of the light spot can be moved to each recording layer, and the track 104 can be formed on each recording layer. An irradiating position changing unit that generates the wobbles of the track 104 by changing the irradiating position of the light spot of the laser light L from the optical system 212 on the disk 101, can be realized by the optical system 212 that generates the wobbles or the motor of the rotational driving system 213, and the motor control circuit 215. A signal generator that generates the plurality of signals having different frequencies or having the same frequency with inverted phases, can be realized by the sinusoidal wave generating circuits 203 and 204 and the inverter circuits 205 and 206 (or the phase switching circuit). A selection unit that selectively outputs to the motor control circuit 215 the plurality of signals generated by the signal generator based on predetermined signals, that is, the first through third information signals, can be realized by the selection circuits 207 through 209.

Figure 36:
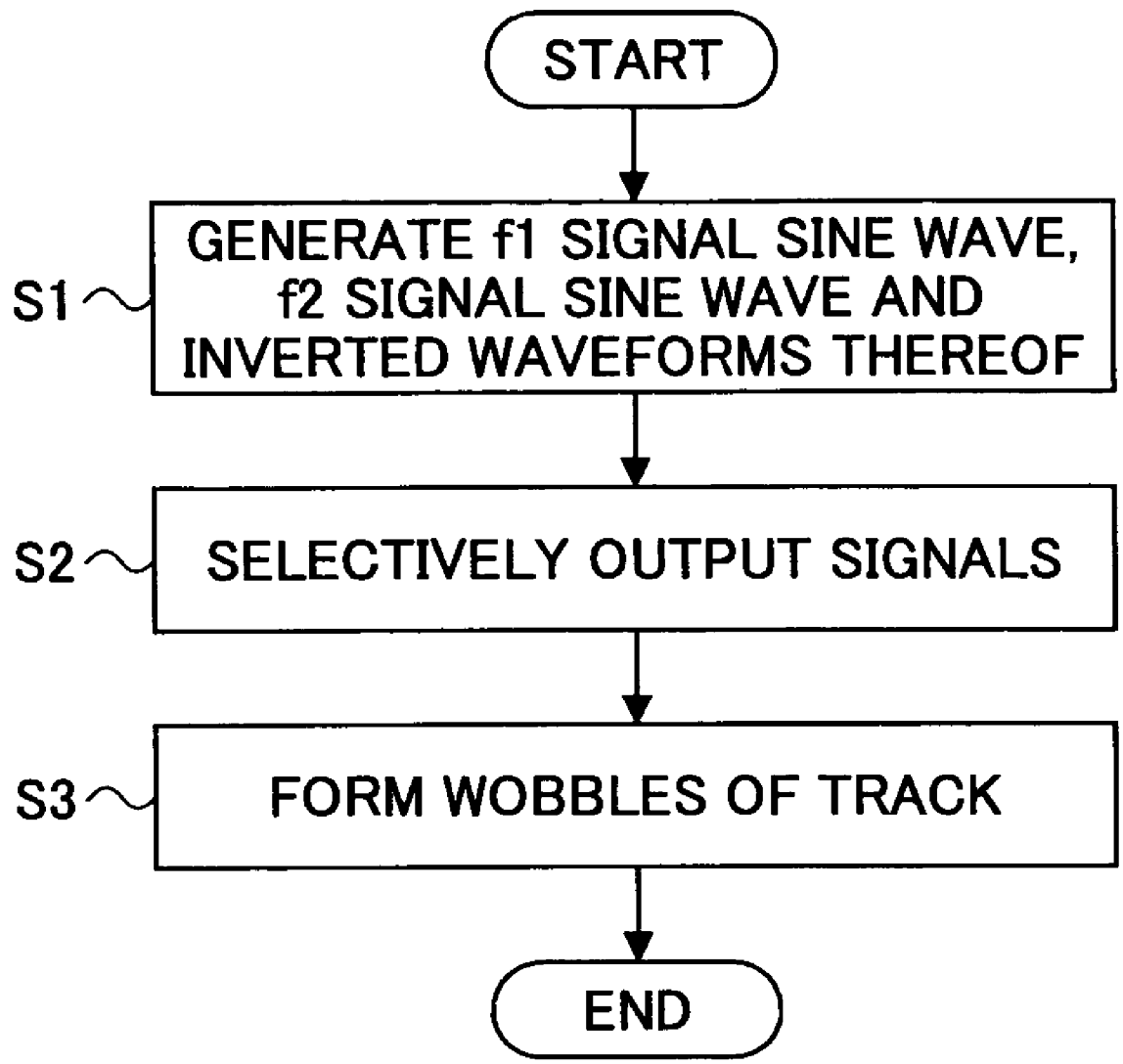
FIG. 36 is a flow chart for explaining an information recording medium forming method that is carried out by the optical disk forming apparatus.

Next, a description will be given of the information recording medium forming method that can be carried out on the optical disk forming apparatus 201 having the structure described above, by referring to FIG. 36. FIG. 36 is a flow chart for explaining the information recording medium forming method that is executed by the optical disk forming apparatus.

As shown in FIG. 36, the f1 signal sinusoidal wave, the f2 signal sinusoidal wave and the inverted waves of the f1 and f2 signal sinusoidal waves are generated (step S1), and these signals are selectively output by switching the selection circuits 207 through 209 by the first through third information signals (step S2). The irradiating position of the light spot on the rotating disk 101 is changed based on the selectively output signal described above, so as to form the wobbles of the track 104 (step S3).

Accordingly, even with respect to the modulation technique in which the frequency difference is set to 2 times or greater, the frequency shift can be made smoothly when modulating the wobble signal, and the wobbles subjected to the FSK modulation, the PSK modulation or the FSK+PSK modulation which is a combination of the FSK modulation and the PSK modulation can be accurately formed on the information recording medium based on the first through third information signals.

More particularly, by generating the f1 signal sinusoidal wave and the f2 signal sinusoidal wave having different frequencies (ratio of 2:1 in this example), and using as the third information signal the layer information that indicates the place or position of the recording layer (first recording layer, second recording layer and the like) in the disk 101 having the plurality of recording layers, it is possible to accurately create the disk 101 in which the layer information part is represented by the wobbles subjected to the FSK modulation.

In addition, by generating the f2 signal sinusoidal wave, the inverted signal of the f2 signal sinusoidal wave and the f1 signal sinusoidal wave, selectively outputting the f2 signal sinusoidal wave and the inverted signal thereof using the layer information as the second information signal, using the selectively output wave and the f1 signal sinusoidal wave as the third information signal, and using the position information that indicates the wobble numbers storing the layer information, it is possible to accurately create the disk 101 in which the layer information is represented by the wobbles subjected to the FSK+PSK modulation and the other carrier wave parts are constant frequency wobbles.

Moreover, by generating the f1 signal sinusoidal wave, the inverted signal of the f1 signal sinusoidal wave and the f2 signal sinusoidal wave, and selectively outputting the f1 signal sinusoidal wave and the inverted signal thereof using the layer information as the first information signal, it is possible to accurately create the disk 101 in which the layer information is represented by the modulated wobbles, the address information is represented by the PSK modulated wobbles and the other carrier wave parts are constant frequency wobbles.

Furthermore, by generating the f1 signal sinusoidal wave, the inverted signal of the f1 signal sinusoidal wave, the f2 signal sinusoidal wave and the inverted signal of the f2 signal sinusoidal wave, selectively outputting the f1 signal sinusoidal wave and the inverted signal thereof as the first information signal using the layer information, selectively outputting the f2 signal sinusoidal wave and the inverted signal thereof as the second information signal using the address information, and using the selectively output signals as the position information indicating the wobble numbers storing the address information, it is possible to accurately create the disk 101 in which the layer information is represented by the modulated wobbles, the address information is represented by the FSK+PSK modulated wobbles and the other carrier wave parts are constant frequency wobbles.

The disk 101 that is created in the above described manner is an information recordable multi-layer information recording medium having a plurality of recording layers, where the data is recordable on each of the recording layers by irradiating light thereon. The wobbles modulated with information are formed in the track 104 of this disk 101. In addition, the layer information indicating the place or position of each recording layer is recorded in the wobbles as FSK modulated information, PSK modulated information or FSK+PSK modulated information.

In the case where the layer information is recorded as the FSK+PSK modulated information, the address information may further be recorded in the wobbles as PSK modulated information. In addition, in the case where the layer information is recorded as the PSK modulated information, the address information may further be recorded in the wobbles as FSK+PSK modulated information.

Figure 37:
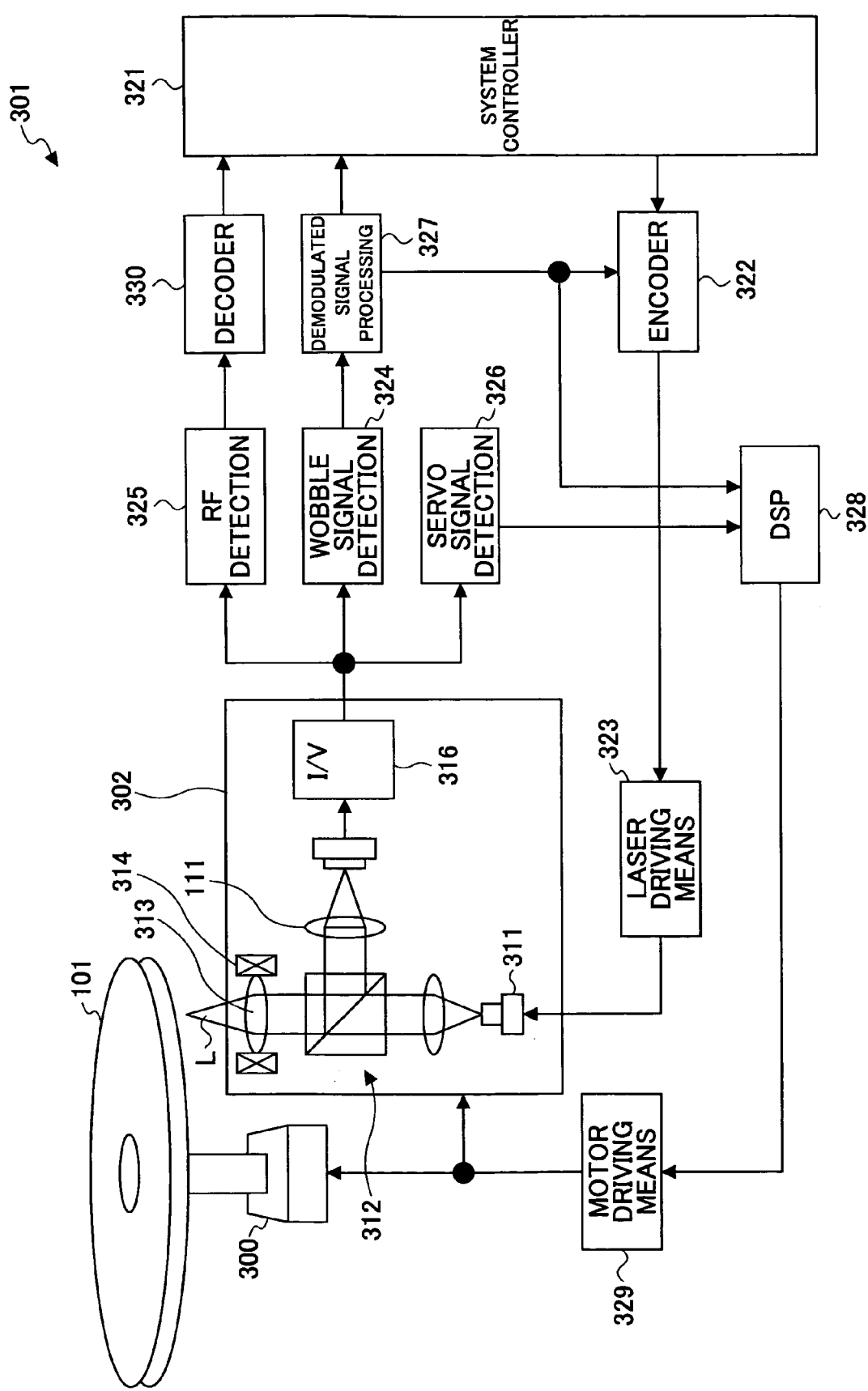
FIG. 37 is a block diagram showing electrical connections of a second embodiment of the optical disk apparatus.

Next, a description will be given of an optical disk apparatus 301, which forms an information recording medium apparatus that records information on and reproduces information from the disk 101, by referring to FIG. 37. FIG. 37 is a block diagram showing electrical connections of the optical disk apparatus 301 of the second embodiment.

The optical disk apparatus 301 includes a pickup mounted with a predetermined optical system that will be described later, a plurality of motors (only a spindle motor 300 shown) including a seek motor that moves the pickup 302 and the spindle motor 300 that rotates the disk 101, a mechanism part including a loading part (not shown) for loading or setting the disk 101, various electrical systems and the like.

The pickup 302 includes a laser generator 311, various optical parts 312 having known structures for guiding laser light L output from the laser generator 311 to various elements, an objective lens 313 for converging a light spot of the laser light L on the disk 101, an actuator 314 for controlling the position of the objective lens 313 so that the light spot follows a desired position on the disk 101, a 4-part photodetector (PD) 111 described above for receiving the laser light (reflected light) reflected from the disk 101, and an I/V converter circuit 316 for subjecting the output signal of the photodetector 111 to a current-to-voltage (I/V) conversion.

The electrical system has the following structure. That is, when recording information on the disk 101, a system controller 321 receives the recording information from an external apparatus, and an encoder 322 subjects the recording information sequence to an encoding, modulation and the like. A laser driving means 323 determines appropriate laser emission timing and intensity from the information sequence for the recording to the disk 101, and drives the laser generator 311 to emit the laser light.

When reproducing information from the disk 101, the laser driving means 323 drives the laser generator 311 to emit a stable laser light with an appropriate intensity for the reproduction from the disk 101. The reflected signal from the disk 101 is subjected to a photoelectric conversion in the photodetector 111, and the output of the photodetector 111 is converted by the I/V converter circuit 316 into a voltage signal to which an operation may easily be carried out. The photodetector 111 and the I/V converter circuit 316 may be formed integrally. Thereafter, the signal computations for the wobble signal, the RF signal, the servo signal and the like are carried out by a wobble signal detection means 324, an RF signal detection means 325 and a servo signal detection means 326 having known structures (the detection of the wobble signal, the RF signal and the like will be described later). Of course, the various signal computations may be made in the current signal state output from the photodetector 111, and the computation result may thereafter be converted into a voltage signal. Although the wobble signal detection is carried out independently in this case, the wobble signal may be generated from an internal signal of a servo signal detection means 326. The detected wobble signal is input to a demodulated signal processing means 327. The demodulated signal processing means 327 includes the information detecting apparatus 161 described above in conjunction with FIGS. 28 and 29, and detects the synchronizing signal, the address information, the clock signal, the layer information and the like. The address information and the layer information are used in the system controller 321 and the encoder 322 for the process of acquiring the present position on the disk 101. The clock signal is used in the encoder 322 and the digital signal processor (DSP) 328 to generate the reference signal. The servo signal is subjected to various operations in the servo signal detection means 326, the moving quantities of the pickup 302 and the actuator 315 are computed in the DSP 328 from an error between the position of the light spot of the laser light on and a target position, and the seek motor and the actuator more are operated so that the light spot follows the desired position. As a result, even when the disk 101 is the multi-layer information recording medium having the plurality of recording layers, the light spot can follow each recording layer. The rotational speed of the disk 101 is detected from the clock signal that is detected from wobble signal, and the rotational speed of the spindle motor 300 is controlled by a motor driving means 329 based on a comparison between the detected rotational speed and a target speed.

When reproducing information from the disk 101, the RF signal, which is a high-frequency signal component extracted by the RF detection means 325, is extracted using a filter and binarized. Various kinds of demodulation and decoding are carried out in the decoder 330 based on the RF signal, so as to convert the RF signal into the reproduced information. A PLL circuit may be provided so that the clock component is extracted from the RF signal in the RF detection means 325 or the decoder 330, and the extracted clock component is used as a reference signal in the reproducing system. The reproduced information is transferred to the outside via the system controller 321. The reproduced information does not necessarily have to depend upon the wavelength of the laser light and the parameters of the optical system used in the optical disk apparatus 301.

According to the optical disk apparatus 301 described above, it is possible to record information on and reproduce information from the recording layer by irradiating the laser light on the disk 101 that is an information recordable multi-layer information recording medium having a plurality of recording layers, where the data is recordable on each of the recording layers by irradiating light thereon. In addition, by irradiating the laser light on the disk 101 from the optical system of the pickup 302, it is possible to detect the wobble signal by the wobble signal detection means 324 from the wobbles that are formed in the track 104 on the disk 101 based on the reflected light from the disk 101. Since the demodulated signal processing means 327 includes the information detecting apparatus 161, it is possible to detect the synchronizing signal, the address information signal and the layer information signal, as described above. These signals that are detected are output to the system controller 321, the encoder 322 and the DSP 328, and the control is carried out based on these signals when recording information on and reproducing information from the disk 101.

Figure 38:
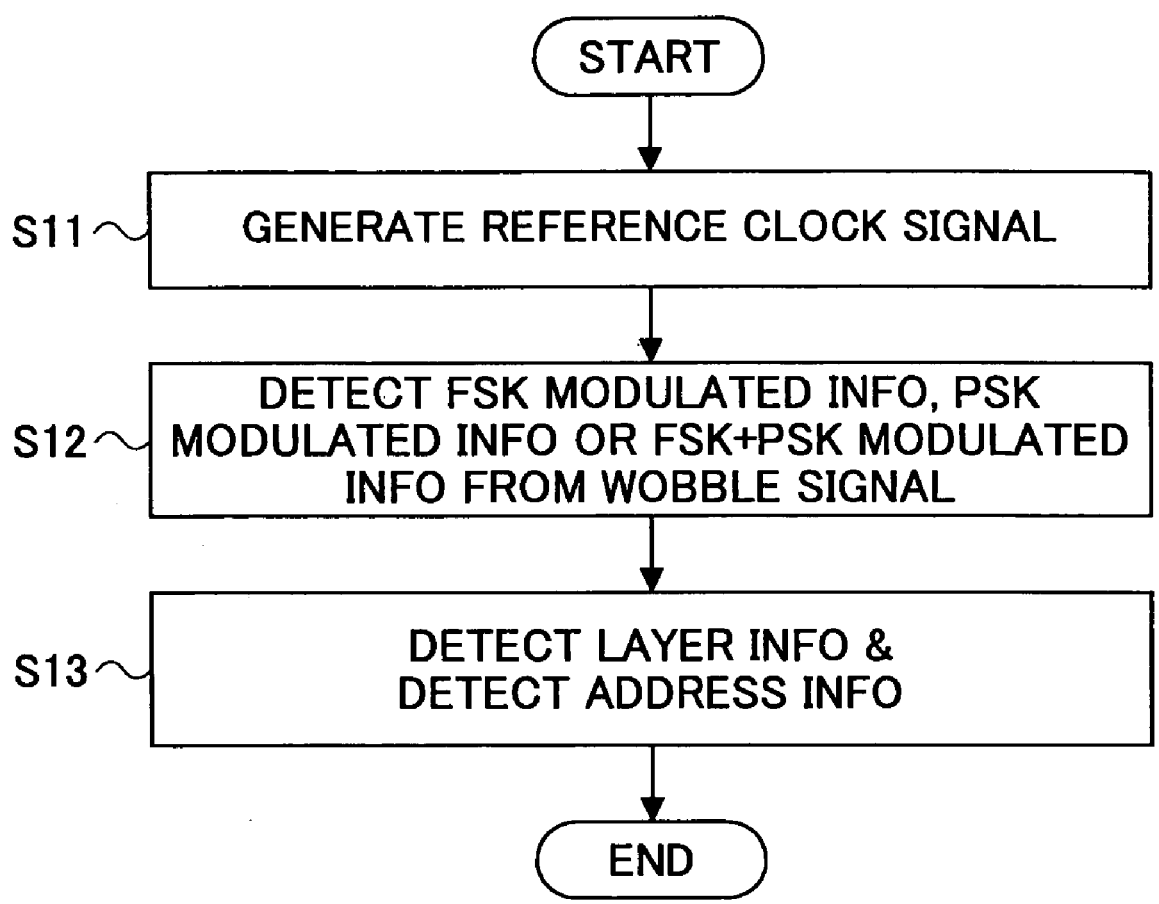
FIG. 38 is a flow chart for explaining an information detecting method that is carried out by the optical disk apparatus.

A description will be given of the information detecting method that is executed in the information detecting apparatus 161 of the optical disk apparatus 310, by referring to FIG. 38. FIG. 38 is a flow chart for explaining the information detecting method that is executed by the optical disk apparatus 310.

The information detecting apparatus 161 reads the information recorded in the wobbles, from the disk 101 in which the wobbles of the modulated information are formed in the track 104. More particularly, the clock generating means 121 generates the reference clock signal from the wobble signal (step S11), and the first and second demodulating means 122 and 123 detects the FSK modulated information, the PSK modulated information or the FSK+PSK modulated information from the wobble signal, based on the reference clock signal (step S12). The layer information detection means 126 holds the information detected from the wobble signal in the layer information detection means 126 and detects the layer information, based on a timing signal which is obtained from the synchronization detection means 124 and indicates the place or position of each recording layer when the disk 101 is an information recordable multi-layer information recording medium having a plurality of recording layers, where the data is recordable on each of the recording layers (step S13).

When detecting the FSK+PSK modulated information as the layer information, it is possible to also detect the PSK modulated information from the wobble signal based on the reference clock signal, and to detect the address information by holding the output PSK modulated information in the address information detection means 125 depending on the timing signal that is output from the synchronization detection means 124 and indicates the address information position (step S13).

When detecting the PSK modulated information as the layer information, it is possible to also detect the FSK+PSK modulated information from the wobble signal based on the reference clock signal, and to detect the address information by holding the output FSK+PSK modulated information in the address information detection means 125 depending on the timing signal that is output from the synchronization detection means 124 and indicates the address information position (step S13).

Accordingly, the layer information can be stored in the disk 101 using the FSK modulation, the PSK modulation or the FSK+PSK modulation that is uneasily affected by the crosstalk, and this layer information can be detected by the information detecting apparatus 161 of the optical disk apparatus 301. It is thus possible to appropriately record or reproduce the information because the recording layer that is being accessed in the optical disk apparatus 301 can be quickly and accurately discriminated.

If the disk 101 is formed by recording the layer information by the FSK+PSK modulation and the address information by the PSK modulation or, the layer information by the PSK modulation and the address information by the FSK+PSK modulation, and the layer information and the address information are detected by the information detecting apparatus 301 of the optical disk apparatus 301, it is possible to efficiently and accurately detect the layer information and the address information from the disk 101 because the disk 101 employs the modulation techniques suiting the characteristics of the layer information and the address information.

Of course, the disk of this embodiment does not necessarily need to depend upon the wavelength of the laser light and the parameters of the optical system used in the disk forming apparatus and the information recording and reproducing apparatus described above.

According to the disk of this embodiment, the track includes the wobbles, and the wobbles or wobbling may form the carrier wave part based on the constant frequency waveform, and the FSK modulation part based on the waveform of the layer information subjected to the FSK modulation, that are separate. Hence, it is possible to detect the layer information signal without being affected by the crosstalk, and the detection of the layer information can be made with a high reliability.

In addition, if the frequency used for the FSK modulation is ½ the carrier wave frequency, the modulation part has a low frequency and is separated from the frequency band of the recorded information, thereby making it possible to eliminate a leak component of the recorded information. Hence, when using the modulation part frequency lower than the carrier wave frequency, the frequency used can minimize the carrier wave interval required for the unit information, and undesirable effects on the clock generation can be effectively suppressed.

Furthermore, if the length of the unit information recorded by the FSK modulation amounts to 2 carrier wave periods, it is possible to easily eliminate the leak component of the recorded information. Thus, when using the modulation part frequency lower than the carrier wave frequency, the frequency used can minimize the carrier wave interval required for the unit information, and it is possible to bring out to a maximum the effect of suppressing the undesirable effects on the clock generation.

If the frequency used for the FSK modulation is 2 times the carrier wave frequency, the frequency used is a lowest frequency at which the phase of the FSK modulation part becomes zero in 1 carrier wave period, of the modulation part frequency higher than the carrier wave frequency, and the separation from the recorded information is relatively easy. Since the frequency higher than the carrier wave frequency is used, the carrier wave interval required for the unit information may be short, and the undesirable effects on the clock generation can be suppressed.

If the length of unit information recorded by the FSK modulation amounts to 1 carrier wave period, the separation from the recorded information is even more facilitated.

If the FSK modulation part is arranged between the carrier wave parts, the external disturbance of the modulation part is generated in a state where the clock generation is completely stable, and thus, a stable clock generation can be made without introducing clock problems.

If the wobbles of the track form the carrier wave part based on the constant frequency waveform, and the FSK+PSK modulation part of the layer information based on the PSK modulated waveform and with a period different from that of the carrier wave part, that are separate, it is possible to obtain a layer information signal that is uneasily affected by the crosstalk and has a high signal quality. As a result, it is possible to make a highly reliable layer information detection.

If the frequency used for the FSK+PSK modulation is ½ the carrier wave frequency, the modulation part has a low frequency and is separated from the frequency band of the recorded information, and it is easy to eliminate the leak component of the recorded information. When using the modulation part frequency lower than the carrier wave frequency, the frequency used can minimize the carrier wave interval required for the unit information, and undesirable effects on the clock generation can be effectively suppressed.

Furthermore, if the length of the unit information recorded by the FSK+PSK modulation amounts to 2 carrier wave periods, it is possible to more easily eliminate the leak component of the recorded information.

If the frequency used for the FSK+PSK modulation is 2 times the carrier wave frequency, the frequency used is a lowest frequency at which the phase of the FSK modulation part becomes zero in 1 carrier wave period, of the modulation part frequency higher than the carrier wave frequency, and the separation from the recorded information is relatively easy. Since the frequency higher than the carrier wave frequency is used, the carrier wave interval required for the unit information may be short, and the undesirable effects on the clock generation can be suppressed.

If the length of unit information recorded by the FSK+PSK modulation amounts to 1 carrier wave period, the separation from the recorded information is even more facilitated.

If the FSK+PSK modulation part is arranged between the carrier wave parts, the external disturbance of the modulation part is generated in a state where the clock generation is completely stable, and thus, a stable clock generation can be made without introducing clock problems.

According to the disk of this embodiment, the track includes the wobbles, and the wobbles or wobbling may form the carrier wave part based on the constant frequency waveform, the FSK+PSK modulation part based on the waveform of the first information subjected to the PSK modulation and having a period different from that of the carrier wave part, and the PSK modulation part based on the waveform of the second information subjected to the PSK modulation, that are separate. In this case, the first and second information may be detected by detection systems exclusively therefor, and the first and second information can be separated with ease. In addition, it is possible to selectively use the FSK+PSK modulation that is uneasily affected by the crosstalk and has a high demodulation quality, and the PSK modulation that is affected by the crosstalk but has a high demodulation quality, depending on the required characteristics such as the reliability.

If the first information is the address information and the second information is the layer information indicating the place or position of the recording layer, it is possible to provide detection systems exclusively for the address information and the layer information, and the address information and the layer information can be separated with ease.

It is desirable that a read error of the address information will not occur consecutively. But the address information can be detected positively because the FSK+PSK modulation employed enables stable detection of the address information regardless of the crosstalk of the carrier wave component.

Continuity is not required for the layer information. Hence, the layer information can be detected positively, without increasing the FSK+PSK modulation parts, because the PSK modulation employed basically has a high demodulation performance.

If the frequency used for the FSK+PSK modulation is ½ the carrier wave frequency, the modulation part has a low frequency and is separated from the frequency band of the recorded information, thereby making it possible to eliminate a leak component of the recorded information. Hence, when using the modulation part frequency lower than the carrier wave frequency, the frequency used can minimize the carrier wave interval required for the unit information, and undesirable effects on the clock generation can be effectively suppressed.

Furthermore, if the length of the unit information recorded by the FSK+PSK modulation amounts to 2 carrier wave periods, it is possible to easily eliminate the leak component of the recorded information.

If the frequency used for the FSK+PSK modulation is 2 times the carrier wave frequency, the frequency used is a lowest frequency at which the phase of the FSK+PSK modulation part becomes zero in 1 carrier wave period, of the modulation part frequency higher than the carrier wave frequency, and the separation from the recorded information is relatively easy. Since the frequency higher than the carrier wave frequency is used, the carrier wave interval required for the unit information may be short, and the undesirable effects on the clock generation can be suppressed.

If the length of unit information recorded by the FSK+PSK modulation amounts to 1 carrier wave period, the separation from the recorded information is even more facilitated.

If the length of unit information recorded by the PSK modulation amounts to 1 carrier wave period, the number of modulation parts can be minimized by taking advantage of the layer information which can be read again and does not require an extremely high reliability, and the undesirable effects on the clock generation can be suppressed.

According to the disk of this embodiment, the track includes the wobbles, and the wobbles or wobbling may form the carrier wave part based on the constant frequency waveform, the FSK+PSK modulation part based on the waveform of the address information subjected to the PSK modulation and having a period different from that of the carrier wave part, the first PSK modulation part based on the waveform of the layer information subjected to the PSK modulation, and the second PSK modulation part based on the periodic synchronizing information subjected to the PSK modulation, that are separate. In this case, advantages similar to those described above are obtainable, and in addition, it is possible to simply detect the synchronizing signal that determines the positions of the address information part and the layer information part without increasing the number of FSK+PSK modulation parts.

According to the disk of this embodiment, the track includes the wobbles, and the wobbles or wobbling may form the carrier wave part based on the constant frequency waveform, the FSK+PSK modulation part based on the waveform of the address information subjected to the PSK modulation and having a period different from that of the carrier wave part, and the PSK modulation part based on the waveform of the layer information subjected to the PSK modulation, that are separate, with the periodic synchronizing information that is additionally formed by the pits. In this case, advantages similar to those described above are obtainable, and in addition, it is possible to easily separate the signals because the synchronizing information can be detected by a detection system exclusively therefor.

If the relationship between the address information and the radial position is made the same for each of the recording layers of the recording medium, it is unnecessary to increase the amount of address information even when the number of recording layers becomes large, and the information stored in the wobbles can be utilized efficiently. In addition, the required computations can be simplified since the correlation between the target address and the radial position when making a seek is the same for each of the recording layers.

If the layer information is included in the recorded information of the recorded part or recorded region, it is possible to achieve layer information compatibility with the read-only disks.

According to the disk of this embodiment, the track includes the wobbles, and the wobbles or wobbling may form the FSK modulation part based on the waveform of the first information subjected to the FSK modulation, the PSK modulation part based on the waveform of the second information subjected to the PSK modulation, and the carrier wave part based on the constant frequency waveform, that are separate. The information can be separated with ease because the first information and the second information may be detected by detection systems exclusively therefor. The FSK modulation that is uneasily affected by the crosstalk but has a slightly lower demodulation quality, and the PSK modulation that is affected by the crosstalk but has a high demodulation quality, can be selectively used depending on characteristics of the information such as the reliability.

If the first information is the address information and the second information is the layer information indicating the place or position of the recording layer, it is possible to provide detection systems exclusively for the address information and the layer information, and the address information and the layer information can be separated with ease. Accordingly, the address information which needs to be positively detected can be detected stably regardless of the crosstalk of the carrier wave component. In addition, the layer information which has a small amount of information and can be read again, can be detected using the PSK modulation that enables a high demodulation performance, without increasing the number of FSK modulation parts.

If the frequency used for the FSK modulation is ½ the carrier wave frequency, the modulation part has a low frequency and is separated from the frequency band of the recorded information, thereby making it easy to eliminate the leak component of the recorded information. Since the continuity with the carrier wave is satisfactory at the boundary of the modulation part and the high-frequency component can be suppressed, it is possible to lower the band required by the detection circuit. Further, when using the modulation part frequency lower than the carrier wave frequency, the frequency used can minimize the carrier wave interval required for the unit information, and undesirable effects on the clock generation can be effectively suppressed. It is also possible to take advantage of the FSK modulation that is uneasily affected by the crosstalk.

Furthermore, if the length of the unit information recorded by the FSK modulation amounts to 2 carrier wave periods, it is possible to easily eliminate the leak component of the recorded information.

If the frequency used for the FSK modulation is 2 times the carrier wave frequency, the high-frequency component can be suppressed because the continuity with the carrier wave is satisfactory at the boundary of the modulation part, and the band required by the detection circuit can be lowered. The frequency used is a lowest frequency at which the continuity of the carrier wave boundary is secured, of the modulation part frequency higher than the carrier wave frequency, and the separation from the recorded information is relatively easy. Since the frequency higher than the carrier wave frequency is used, the carrier wave interval required for the unit information may be short, and the undesirable effects on the clock generation can be suppressed. It is also possible to take advantage of the FSK modulation that is uneasily affected by the crosstalk.

If the length of unit information recorded by the FSK modulation amounts to 1 carrier wave period, the separation from the recorded information is even more facilitated.

IF the length of the unit information recorded by the PSK modulation amounts to 1 carrier wave period, the number of modulation parts can be minimized by taking advantage of the layer information which can be read again and does not require an extremely high reliability, and undesirable effects on the clock generation can be suppressed.

If the PSK modulation part is arranged between the carrier wave parts, the external disturbance of the modulation part is generated in a state where the clock generation is completely stable, and thus, a stable clock generation can be made without introducing clock problems.

According to the disk of this embodiment, the track includes the wobbles, and the wobbles or wobbling may form the FSK modulation part based on the waveform of the address information subjected to the FSK modulation, the first PSK modulation part based on the waveform of the layer information subjected to the PSK modulation, the carrier wave part based on the constant frequency waveform, and the second PSK modulation part based on the waveform of the periodic synchronizing information subjected to the PSK modulation, that are separate. In this case, advantages similar to those described above are obtainable, and in addition, it is possible to simply detect the synchronizing signal that determines the positions of the address information part and the layer information part without increasing the number of FSK modulation parts.

According to the disk of this embodiment, the track includes the wobbles, and the wobbles or wobbling may form the FSK modulation part based on the waveform of the address information subjected to the FSK modulation, the PSK modulation part based on the waveform of the layer information subjected to the PSK modulation, the carrier wave part based on the constant frequency waveform, that are separate, with the periodic synchronizing information that is additionally formed by the pits. In this case, advantages similar to those described above are obtainable, and in addition, it is possible to easily separate the signals because the synchronizing information can be detected by a detection system exclusively therefor.

If the relationship between the address information and the radial position is made the same for each of the recording layers of the recording medium, it is unnecessary to increase the amount of address information even when the number of recording layers becomes large, and the information stored in the wobbles can be utilized efficiently. In addition, the required computations can be simplified since the correlation between the target address and the radial position when making a seek is the same for each of the recording layers.

If the layer information is included in the recorded information of the recorded part or recorded region, it is possible to achieve layer information compatibility with the read-only disks.

The recording medium and the optical disk of this embodiment is of course applicable to various recording media including write-once optical disks such as CD-R disks, DVD-R disks and DVD+R disks, rewritable type optical disks such as CD-RW disks, CD+RW disks, DVD-RW disks and DVD+RW disks, and magneto-optical disks.

Further, the present invention is not limited to these embodiments, but various variations and modifications may be made without departing from the scope of the present invention.

The invention claimed is:

1. An information recording medium having a plurality of recording layers recordable with data by irradiating light thereon, and a track on each recording layer includes wobbles of modulated information, wherein:
the wobbles are recorded with FSK+PSK modulated information as layer information indicating a place or position of each recording layer.

2. The information recording medium as claimed in claim 1, wherein the wobbles are further recorded with PSK modulated information as address information.

3. The information recording medium as claimed in claim 1, wherein the wobbles are further recorded with FSK+PSK modulated information as address information.

4. An information recording medium having a plurality of recording layers recordable with data by irradiating light thereon, and a track on each recording layer includes wobbles of modulated information, wherein:
the wobbles are recorded with FSK+PSK modulated information, as layer information indicating a place or position of each recording layer, which stores information in the wobbles by a wobble waveform having 2 times a carrier wave period or ½ a carrier wave frequency and changing a phase between 0 and 180 degrees.

* * * * *